United States Patent
Diel et al.

(10) Patent No.: US 12,514,917 B2
(45) Date of Patent: Jan. 6, 2026

(54) SENECAVIRUS A VIRUS STRAINS AND IMMUNOGENIC COMPOSITIONS THEREFROM

(71) Applicant: SOUTH DAKOTA BOARD OF REGENTS, Pierre, SD (US)

(72) Inventors: Diego G. Diel, Pierre, SD (US); Marcelo de Lima, Pierre, SD (US); Maureen H.V. Fernandes, Pierre, SD (US); Bishwas Sharma, Pierre, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 1010 days.

(21) Appl. No.: 17/626,337

(22) PCT Filed: Jul. 15, 2020

(86) PCT No.: PCT/US2020/042083
§ 371 (c)(1),
(2) Date: Jan. 11, 2022

(87) PCT Pub. No.: WO2021/011619
PCT Pub. Date: Jan. 21, 2021

(65) Prior Publication Data
US 2022/0249650 A1    Aug. 11, 2022

Related U.S. Application Data

(60) Provisional application No. 62/874,094, filed on Jul. 15, 2019.

(51) Int. Cl.
| | | |
|---|---|---|
| *A61K 39/125* | (2006.01) | |
| *A61K 39/39* | (2006.01) | |
| *A61P 31/14* | (2006.01) | |
| *C12N 7/00* | (2006.01) | |
| *C12N 15/85* | (2006.01) | |
| *A61K 39/00* | (2006.01) | |

(52) U.S. Cl.
CPC ............ *A61K 39/125* (2013.01); *A61K 39/39* (2013.01); *A61P 31/14* (2018.01); *C12N 7/00* (2013.01); *C12N 15/85* (2013.01); *A61K 2039/5252* (2013.01); *A61K 2039/5254* (2013.01); *A61K 2039/545* (2013.01); *A61K 2039/552* (2013.01); *A61K 2039/55505* (2013.01); *A61K 2039/55561* (2013.01); *C12N 2770/32022* (2013.01); *C12N 2770/32034* (2013.01); *C12N 2770/32061* (2013.01); *C12N 2800/107* (2013.01)

(58) Field of Classification Search
CPC ...... A61K 2039/5252; A61K 2039/552; A61K 39/39; A61K 39/125; A61K 2039/5254; A61K 2039/545; A61K 2039/55505; A61K 2039/55561; A61P 31/14; C12N 15/85; C12N 2770/32021; C12N 2770/32022; C12N 2770/32034; C12N 2770/32061; C12N 2770/32062
See application file for complete search history.

(56) References Cited

U.S. PATENT DOCUMENTS 11,179,457 B2 * 11/2021 Iyer ......................... A61P 31/14

FOREIGN PATENT DOCUMENTS

WO    2017181070 A1    10/2017

OTHER PUBLICATIONS

Chen et al. Virology, 2016, vol. 497, pp. 111-124.*
International Searching Authority in connection with PCT/US2020/042083 filed Jul. 15, 2020, "Written Opinion of the International Searching Authority", 12 pages, mailed Dec. 11, 2020.
Sharma et al., "A Novel Live Attenuated Vaccine Candidate Protects Against Heterologous Senecavirus A Challenge", Frontiers in Immunology, pp. 1-30, Nov. 26, 2019.

\* cited by examiner

*Primary Examiner* — Bao Q Li
(74) *Attorney, Agent, or Firm* — McKee, Voorhees & Sease, PLC

(57) ABSTRACT

The present invention is directed to novel nucleotide sequences of Senecavirus A ("SVA"), including novel genotypes thereof, which are useful as live attenuated and other vaccine compositions for treating and preventing diseases in swine and other animals. Vaccines provided according to the practice of the invention are effective against multiple swine SVA genotypes and isolates. Diagnostic and therapeutic sequences are also a feature of the present invention, as are infectious clones useful in the propagation of the virus and in the preparation of vaccines. Particularly important aspects of the invention include polynucleotide constructs that replicate in tissue culture and in host swine. The invention also provides for novel full length SVA genomes that can replicate efficiently in host animals and tissue culture.

21 Claims, 23 Drawing Sheets
Specification includes a Sequence Listing.

FIG. 1C wt SVA SD15-26 rSVA mSacII

*FIG. 2A*

Total clinical score

→ wt SVA SD15-26
→ rSVA mSacII

Days post-infection

*FIG. 2B*

Serum

FIG. 2C

Oral swab

FIG. 2D

Viral load in tissues

Legend: wt SVA SD15-26; rSVA mSacII

Y-axis: log$_{10}$ (genome copy number/mL)

X-axis: Heart, Lungs, Kidney, Liver, S. Intestine, L. Intestine, Spleen, Thymus, Tonsil, Mesent. LN, Mediast. LN

*FIG. 3A*

Virus Neutralizing antibody titers

Legend: wt SVA SD15-26; rSVA mSacII

Y-axis: log$_2$ VN titer

X-axis: Days post-infection (0, 3, 7, 10, 14)

*FIG. 3B*

>T7-rSVA-SD15-26-S'UTR (Nhel + Sfil)

*GCTAGCTAATACGACTCACTATAGGG*TTTGAAAGGAAGGACTGGGCATGAGGGCCCAG*TCCTT*

CCTTTCCCCTTCCGGGGGGTAAACCGGCTGTGTTTGCTAGAGGCACAGAGGAGCAACATCCAACCTGCTTTTGTGG
GGAACGGTGCGGCTCCAATTCCTGCGTCGCCAAAGGTGTTAGCGCACCCAAACGGCGCATCTACCAATGCTATTG
GTGTGGTCTGCGAGTTCTAGCCTACTCGTTTCTCCCCTACTCACTCATTCACACACAAAAACTGTGTTGTAACTACAA
GATTTGGCCCTCGCACGGGATGTGCGATAACCGCAAGATTGACTCAAGCGCGGAAAGCGCTGTAACCACATGCTG
TTAGTCCCTTTATGGCTGCGAGATGGCTATCCACCTCGGATCACTGAACTGGAGCTCGACCCTCCTTAGTAAGGGA
ACCGAGAGGCCTTCCTGCAACAAGCTCCGACACAGAGTCCACGTGATTGCTACCACCATGAGTACATGGTTCTCCC
CTCTCGACCCAGGACTTCTTTTTGAATATCCACGGCTCGATCCAGAGGGTGGGGCATGATCCCCCTAGCATAGCGA
GCTACAGCGGGAACTGTAGCTAGGCCTTAGCGTGCCTTGGATACTGCCTGATAGGGCGACGGCCTAGTCGTGTCG
GTTCTATAGGTAGCACATACAAATATGCAGAACTCTCATTTTTCTTTCGATACAGCCTCTGGCACCTTTGAAGACGT
AACCGGAACAAAAGTCAAGATCGTTGAATACCCCAGATCGGTGAACAATGGTGTTTACGATTCGTCCACTCATTTA
GAGATACTGAACCTACAGGGTGAAATTGAAATTTTAAAGTCTTTCAACGAATACCAAATTCGCGCCGCCAAACAAC
AACTTGGACTGGACATCGTATACGAACTACAGGGTAATGTTCAGACAACCTCAAAGAATGATTTTGATTC

*CCGAGG*

CAATAATGGTAACATGACCTTCAATTACTACGCAAACACTTACCAGAATTCAGTAGACTTCTCGACCTCCTCGTCGG
CGTCAGGCGCCGGACCCGGGAACTCCCGGGGCGGATTAGCGGGTCTCCTCACAAATTTCAGTGGAATCTTGAACC
CTCTTGGCTACCTCAAAGATCACAATACCGAAGAAATGGAAAACTCTGCTGATCGAGTCATAACGCAAACGGCGG
GCAACACTGCCATAAACACGCAATCATCACTGGGTGTGTTGTGTGCCTACGTTGAAGACCCGACCAAATCTGACCC
TCCGTCCAGCAGCACAGATCAACCCACCACCACTTTTACTGCCATCGACAGGTGGTACACTGGACGCCTCAATTCTT
GGACAAAAGCTGTAAAAACCTTCTCTTTTCAGGCCGTCCCGCTCCCTGGAGCCTTCCTGTCTAGACAGGGAGGCCT
CAACGGAGGGGCCTTCACGGCC

T7-FL-SVAΔSD15-26 (SacIImutant)

SEQUENCE LISTING

```
<160> NUMBER OF SEQ ID NOS: 7

<210> SEQ ID NO 1
<211> LENGTH: 7270
<212> TYPE: DNA
<213> ORGANISM: Artificial Sequence
<220> FEATURE:
<223> OTHER INFORMATION: rSVA-SD15-26

<400> SEQUENCE: 1
tttgaaagga aggactgggc atgagggccc agcccccct ttccccttcc ggggggtaaa     60
ccggctgtgt ttgctagagg cacagaggag caacatccaa cctgcttttg tggggaacgg    120
tgcggctcca attcctgcgt cgccaaaggt gttagcgcac ccaaacggcg catctaccaa    180
tgctattggt gtggtctgcg agttctagcc tactcgtttc tcccctactc actcattcac    240
acacaaaaac tgtgttgtaa ctacaagatt tggccctcgc acgggatgtg cgataaccgc    300
aagattgact caagcgcgga aagcgctgta accacatgct gttagtccct ttatggctgc    360
gagatggcta tccacctcgg atcactgaac tggagctcga ccctccttag taagggaacc    420
gagaggcctt cctgcaacaa gctccgacac agagtccacg tgattgctac caccatgagt    480
acatggttct cccctctcga cccaggactt ctttttgaat atccacggct cgatccagag    540
ggtggggcat gatcccccta gcatagcgag ctacagcggg aactgtagct aggccttagc    600
gtgccttgga tactgcctga tagggcgacg gcctagtcgt gtcggttcta taggtagcac    660
atacaaatat gcagaactct catttttctt tcgatacagc ctctggcacc tttgaagacg    720
taaccggaac aaaagtcaag atcgttgaat accccagatc ggtgaacaat ggtgtttacg    780
attcgtccac tcatttagag atactgaacc tacagggtga aattgaaatt ttaaagtctt    840
tcaacgaata ccaaattcgc gccgccaaac aacaacttgg actggacatc gtatacgaac    900
tacagggtaa tgttcagaca acctcaaaga atgattttga ttcccgcggc aataatggta    960
acatgacctt caattactac gcaaacactt accagaattc agtagacttc tcgacctcct   1020
cgtcggcgtc aggcgccgga cccgggaact cccggggcgg attagcgggt ctcctcacaa   1080
atttcagtgg aatcttgaac cctcttggct acctcaaaga tcacaatacc gaagaaatgg   1140
aaaactctgc tgatcgagtc ataacgcaaa cggcgggcaa cactgccata aacacgcaat   1200
catcactggg tgtgttgtgt gcctacgttg aagacccgac caaatctgac cctccgtcca   1260
gcagcacaga tcaacccacc accactttta ctgccatcga caggtggtac actggacgcc   1320
tcaattcttg gacaaaagct gtaaaaacct tctcttttca ggccgtcccg ctccctggag   1380
ccttcctgtc tagacaggga ggcctcaacg gaggggcctt cacggccacc ctacatagac   1440
atttcttaat gaagtgcggg tggcaggtgc aggttcaatg caatttgacg caattccacc   1500
```

```
aaggtgctct tcttgttgcc atggtccccg aaaccaccct tgatgtcaaa cctgacggca   1560
aggcaaagag cttacaggag ctgaatgaag agcagtgggt ggaaatgtct gacgactacc   1620
ggaccgggaa aaacatgcct tttcagtctc ttggtacata ctaccgaccc cctaactgga   1680
cttggggccc caatttcatc aaccccctatc aagtaacagt tttcccacac caaattctga   1740
```
```
acgcgagaac ctctacctcg gtagacataa gtgtcccgta catcggggag actcctacac   1800
aatcctcaga gacacagaac tcctggaccc tccttgttat ggtgcttgtc cccctggact   1860
acaaggaggg agccacaact gacccagaaa ttacattttc tgtaaggcct acaagtccct   1920
acttcaatgg gcttcgtaac cgtttcacga ccgggacgga cgaggaacag gggcccattc   1980
ccacagcacc cagagaaaat tcgcttatgt ttctctcaac catccctgat gacactgttc   2040
ctgcttacgg gaatgtgcgt accctcccg tcaattacct ccccggtgaa ataaccgacc   2100
tcttacaact ggcccgtata cccactctca tggcgtttgg gcgggcgtcc gaacccgagc   2160
ctgcctcaga cgcatatgtg ccctacgttg ccgttcctgc ccagttcgac dacaagcctc   2220
tcatctcctt cccgatcacc ctttcagatc ctgtctacca gaacactctg gtaggcgcca   2280
tcagttcgaa cttcgccaac taccggggt gtatccaaat cactttgaca tttttgtggac   2340
ccatgatggc aagagggaaa ttcctgctct cgtattctcc cccaaatgga gcacaaccac   2400
agaccctttc tgaagctatg cagtgcacat actctatttg ggatataggc ttgaactcta   2460
gttggacctt tgtcatcccc tacatctcgc ccagtgatta ccgtgaaact cgggctatta   2520
ccaactcagt ttattctgct gatggttggt ttagcttgca caagctgacc aaaattactc   2580
taccacctga ctgcccgcag agtccctgta ttctcttttt cgcctctgct ggtgaggatt   2640
acaccctccg tctccctgtt gattgtaatc cttcctacgt gttccactcc accgacaacg   2700
ccgagactgg ggttattgag gcaggtaaca ctgacaccga ttttctggt gaactggcgg   2760
ctcctggctc taaccatact aatgtcaaat tcctgtttga ccgatctcga ctactgaatg   2820
taattaaggt actggagaag gacgccgtct ccccccgtcc tttccccaca gcaacaggtg   2880
cacagcagga cgatggttac ttttgtcttc taacaccccg cccaacagtc gcttcccgac   2940
ccgccactcg tttcggcctg tacgtcaacc cgtctgacag tggcgttctc gctaacactt   3000
cactggattt caattttac agtttggcct gtttcactta ctttagatca gaccttgaag   3060
tcacggtggt ctcactggag ccagatttgg aattcgccgt ggggtggttc ccctctggca   3120
gtgagtacca ggcttctagc tttgtttacg accaactgca tgtaccctac cactttactg   3180
ggcgcactcc ccgcgctttc accagcaagg gtggaaaggt atctttcgtg ctcccttgga   3240
actctgtctc ttccgtgctt cccgtgcgct ggggggggcgc ctccaagctt tcttctgcca   3300
cgcggggtct gccggctcat gctgactggg ggaccattta cgcctttatc cccgtcctta   3360
acgagaagaa aagcaccgct gtaaagcacg tggcggtgta cgttcggtac aagaacgcgc   3420
gtgcctggtg cccagcatg cttccctttc gcagctacaa gcagaagatg ctgatgcaat   3480
caggcgacgt cgagaccaac cctggccctg cttctgacaa cccgatcttg gagtttcttg   3540
aagcggaaaa cgatctagtc actctggcct ctctctggaa gatggtacac tctgttcaac   3600
agacctggag aaagtatgtg aagaacgaca atttttggcc caacttgctc agtgagctag   3660
tgggggaagg ctccatcgcc ttggccgcca cgctatctaa ccaagcttca gtgaaagctc   3720
tcttgggcct gcattttctc tctcgagggc tcaattacac agattttac tctttactga   3780
tagagaaatg ctctagttc tttactgtag aaccgcctcc tccaccagct gaaaatctga   3840
```

```
tgaccaagcc ctccgtgaag tcgaaattcc gaaagctgtt taagatgcaa ggacccatgg    3900
acacagtcaa agactggaac caaatagccg ccggcttgaa gaatttccaa tttgttcgtg    3960
acctagtcaa agaggtggtc gactggctcc aggcctggat caataaagag aaagccagcc    4020
ctgtcctcca gtaccagctg gagatgaaga agctcgggcc cgtggctttg gctcatgatg    4080
ccttcatggc cggttccggg cccctcttg gtgacgacca gattgaatac ctccagaacc    4140
tcaaatctct tgccctaaca ctgggaaaga ctaatttggc ccaaagtctc accactatga    4200
tcaatgccaa gcagagctcc gcccaacgag tcgaacccgt tgtggtggtc ctcagaggca    4260
agccgggatg cggcaaaagc ttggcctcca cgttgattgc ccaggctgtg tccaagcgtc    4320
tctacggctc gcaaagtgtg tattctcttc ctccggaccc agacttcttc gacggatata    4380
aaggacagtt tgtaaccttg atggacgatc tgggacaaaa cccggatggg caagatttct    4440 ccacctttg tcagatggtg tcgaccgccc aatttcttcc caacatggcg gaccttgcag    4500 agaagggcg tcccttcacc tccaatctta tcattgcaac tacaaacctc cctcactta    4560 gccctgtcac cattgctgat ccttctgcag tctctcggcg tatcaactac gacctgactc    4620
tagaagtatc tgaggcctac aagaagcaca cacggctgaa tttcgacctg gctttcagac    4680
gcactgacgc cccccccatt tatccttttg ctgcccatgt gcccttcgtg gacgtggctg    4740
tgcgcttcaa aaatggtcat caaagcttca atctcctaga gttggtcgac tccatttgtg    4800
cagacattcg ggccaagcaa caaggtgccc gaaatatgca gactctggtt ctacagaatc    4860
ctaacgagaa cgacgacacc cccgtcgacg aggcgttggg tagagttctc accccgctg    4920 cggtcgacga ggcgcttgtc gacctcgctc cagatgccga cccggttggc cgcttggcta    4980
ttctcgccaa gctaggtctt gccctagctg cggtcacccc tggtttgata atcttggcag    5040
tgggactcta caagtacttc tctggctctg atacagacca agaagaaaca gaaagtgagg    5100
agcctgctaa agcgcctagg agcgagaatg cttatgatgg cccgaagaaa aactccaagc    5160
cccctggagc gctctctctt atggaaatgc aacagcccaa cgtggacatg gctttgagg    5220 ctgcagttgc taagaaagtg gtcgtcccca ttaccttcat ggttcccaac agaccttctg    5280
gacttacaca gtccgctctt cttgtggccg gccggacctt cctaatcaat gagcatacat    5340
ggtccaaccc ctcctggacc agcttcacaa tccgtggtga ggtgcacact cgtgatgagc    5400
cttcccaaac ggttcatttt actcaccatg gtcttcccac agatctgatg atggtacgtc    5460
tcggaccggg caactctttc cctaacaatc tagacaagtt tggacttgac cagatgccgg    5520
cacgtaactc ccgtgtggtt ggcgtttcgg ctagttacgg taacttcttc ttctctggga    5580
acttcctcgg gtttgttgac tccatcacct ctgaccaagg aacctatgcg agacttttca    5640
ggtacagggt gacgacttac aagggatggt gcggttcggc cctggtctgt gaggccggtg    5700
gtgtccgacg catcattggc atgcattctg ctggtgccgc tggtatcggc gccgggactt    5760
acatctcaaa attaggactg atcaaagccc ttaaacacct cggtgagcct ctggctacaa    5820
tgcaaggact gatgactgag ctagagcctg gagtcaccgt acatgtaccc cgaaaatcta    5880
aattgagaaa gacgaccgca cacgcggtgt acaaaccgga gtttgaacct gctgtgttgt    5940
caaaatttga tccagactg aacaaggatg ttgacctaga tgaggtaatt tggtctaaac    6000
acaccgccaa cgtcccttat caacctcctt tgttctacac atacatgtca gagtacgctc    6060
atcgggtttt ctcctttttg ggaaaagaca atgacattct gaccgtcaaa gaagcaatcc    6120
tgggcatccc tggactagac cctatggatc cccacacagc tccggtttg ccctacgcca    6180 ttagcggtct tcgacgtact gatctcgtcg attttgcgaa cggcacggta gacccggcac    6240
```

```
tggccatgca gatccagaaa ttcttagacg gtgactactc tgatcatgtc ttccaaactt    6300
ttctaaaaga tgaaatcaga ccctcagaga aggtccgggc gggaaaaacc cgcattgtcg    6360
atgtgccctc cctggcgcac tgcattgtgg gcagaatgct gcttgggcgc tttgccgcca    6420
agtttcaatc ccatcctggc tttctccttg gctccgctat cgggtctgac cccgatgtct    6480
tctggaccgt catagggggct cagctcgagg gaagaaagaa cacgtatgac gtggactaca    6540
gtgcctttga ctcttcacac ggcactggct ccttcgaggc tctcatctct cacttttttca   6600 ccgtggacaa tggtttcagc cctgcgctgg gaccgtatct cagatccctg ctgtctcgg    6660 tgcacgctta cggcgagcgt cgcatcaaga ttaccgagg cctcccctct ggttgtgccg    6720
cgaccagcct gctgaacaca gtgctcaaca atgtgatcat caggactgct ctggcattga    6780
cctacaagga attgaatat gacatggttg atatcatcgc ctacggtgac gaccttctgg    6840
ttggtacgga ttacgatctg gacttcaatg aggtggcgcg gcgcgctgcc aaactggggt    6900
ataagatgac tcctgccaac aagggttctg tcttccctcc gacttcctct ctctccgatg    6960
ctgttttcct aaaacgcaaa ttcgtccaaa acaatgacgg cttatataaa ccagttatgg    7020
atttaaagaa tttggaagcc atgctctcct acttcaaacc aggaacacta ctcgagaagc    7080
tgcaatctgt ttctatgttg gctcaacatt ctggaaaaga agaatatgat agattgatgc    7140
accccttcgc tgactacggt gccgtaccga gtcacgagta cctgcaggca agatggaggg    7200
ccttgttcga ctgacctgga tagcccaacg cgcttcggtg ctgccggcga ttctgggaga    7260
acccagtcgg                                                            7270

<210> SEQ ID NO 2
<211> LENGTH: 7270
<212> TYPE: DNA
<213> ORGANISM: Artificial Sequence
<220> FEATURE:
<223> OTHER INFORMATION: rSVAmSacII

<400> SEQUENCE: 2
tttgaaagga aggactgggc atgagggccc agtccttcct ttccccttcc ggggggtaaa      60
ccggctgtgt ttgctagagg cacagaggag caacatccaa cctgcttttg tggggaacgg     120
tgcggctcca attcctgcgt cgccaaaggt gttagcgcac ccaaacggcg catctaccaa     180
tgctattggt gtggtctgcg agttctagcc tactcgtttc tccccctactc actcattcac    240 acacaaaaac tgtgttgtaa ctacaagatt tggccctcgc acgggatgtg cgataaccgc     300
aagattgact caagcgcgga aagcgctgta accacatgct gttagtccct ttatggctgc     360
gagatggcta ccacctcgg atcactgaac tggagctcga ccctccttag taagggaacc      420
gagaggcctt cctgcaacaa gctccgacac agagtccacg tgattgctac caccatgagt     480
acatggttct cccctctcga cccaggactt cttttttgaat atccacggct cgatccagag    540 ggtgggcat gatcccccta gcatagcgag ctacagcggg aactgtagct aggccttagc      600
gtgccttgga tactgcctga tagggcgacg gcctagtcgt gtcggttcta taggtagcac      660
atacaaatat gcagaactct cattttttctt tcgatacagc ctctggcacc tttgaagacg    720
taaccggaac aaaagtcaag atcgttgaat accccagatc ggtgaacaat ggtgtttacg     780
attcgtccac tcatttagag atactgaacc tacagggtga aattgaaatt ttaaagtctt     840
tcaacgaata ccaaattcgc gccgccaaac aacaacttgg actggacatc gtatacgaac     900
tacagggtaa tgttcagaca acctcaaaga atgatttga ttcccgaggc aataatggta     960
```

```
acatgacctt caattactac gcaaacactt accagaattc agtagacttc tcgacctcct    1020
cgtcggcgtc aggcgccgga cccgggaact cccggggcgg attagcgggt ctcctcacaa    1080
atttcagtgg aatcttgaac cctcttggct acctcaaaga tcacaatacc gaagaaatgg    1140
aaaactctgc tgatcgagtc ataacgcaaa cggcgggcaa cactgccata aacacgcaat    1200
catcactggg tgtgttgtgt gcctacgttg aagacccgac caaatctgac cctccgtcca    1260
gcagcacaga tcaacccacc accactttta ctgccatcga caggtggtac actggacgcc    1320
tcaattcttg acaaaagct gtaaaaacct tctcttttca ggccgtcccg ctccctggag     1380
ccttcctgtc tagacaggga ggcctcaacg gaggggcctt cacggccacc ctacatagac    1440
atttcttaat gaagtgcggg tggcaggtgc aggttcaatg caatttgacg caattccacc    1500
aaggtgctct tcttgttgcc atggtccccg aaaccaccct tgatgtcaaa cctgacggca    1560
aggcaaagag cttacaggag ctgaatgaag agcagtgggt ggaaatgtct gacgactacc    1620
ggaccgggaa aaacatgcct tttcagtctc ttggtacata ctaccgaccc cctaactgga    1680
cttgggccc caatttcatc aacccctatc aagtaacagt tttcccacac caaattctga    1740
acgcgagaac ctctacctcg gtagacataa gtgtcccgta catcggggag actcctacac    1800
aatcctcaga gacacagaac tcctggaccc tccttgttat ggtgcttgtc cccctggact    1860
acaaggaggg agccacaact gacccagaaa ttacattttc tgtaaggcct acaagtccct    1920
acttcaatgg gcttcgtaac cgtttcacga ccggacgga cgaggaacag gggcccattc     1980
ccacagcacc cagagaaaat tcgcttatgt ttctctcaac catccctgat gacactgttc    2040
ctgcttacgg gaatgtgcgt acccctcccg tcaattacct ccccggtgaa ataaccgacc    2100
tcttacaact ggcccgtata cccactctca tggcgtttgg gcgggcgtcc gaacccgagc    2160
ctgcctcaga cgcatatgtg ccctacgttg ccgttcctgc ccagtcgac gacaagcctc     2220
tcatctcctt cccgatcacc ctttcagatc ctgtctacca gaacactctg gtaggcgcca    2280
tcagttcgaa cttcgccaac taccgggggt gtatccaaat cactttgaca ttttgtggac    2340
ccatgatggc aagagggaaa ttcctgctct cgtattctcc cccaaatgga gcacaaccac    2400
agacccttt ctgaagctatg cagtgcacat actctatttg ggatataggc ttgaactcta     2460
gttggacctt tgtcatcccc tacatctcgc ccagtgatta ccgtgaaact cgggctatta    2520
ccaactcagt ttattctgct gatggttggt ttagcttgca caagctgacc aaaattactc    2580
taccacctga ctgcccgcag agtccctgta ttctcttttt cgcctctgct ggtgaggatt    2640
acaccctccg tctccctgtt gattgtaatc cttcctacgt gttccactcc accgacaacg    2700
ccgagactgg ggttattgag gcaggtaaca ctgacaccga ttttctggt gaactggcgg     2760
ctcctggctc taaccatact aatgtcaaat tcctgtttga ccgatctcga ctactgaatg    2820
taattaaggt actggagaag gacgccgtct tccccgtcc ttcccaca gcaacaggtg       2880
cacagcagga cgatggttac ttttgtcttc taacaccccg cccaacagtc gcttcccgac    2940
ccgccactcg tttcggcctg tacgtcaacc cgtctgacag tggcgttctc gctaacactt    3000
cactggattt caattttttac agtttggcct gtttcactta ctttagatca gaccttgaag   3060
tcacggtggt ctcactggag ccagatttgg aattcgccgt ggggtggttc ccctctggca    3120
gtgagtacca ggcttctagc tttgtttacg accaactgca tgtaccctac cactttactg    3180
ggcgcactcc ccgcgctttc accagcaagg gtggaaaggt atctttcgtg ctcccttgga    3240
actctgtctc ttccgtgctt cccgtgcgct gggggggcgc ctccaagctt tcttctgcca    3300
cgcggggtct gccggctcat gctgactggg ggaccattta cgcctttatc ccccgtccta   3360
```

```
acgagaagaa aagcaccgct gtaaagcacg tggcggtgta cgttcggtac aagaacgcgc    3420
gtgcctggtg ccccagcatg cttccctttc gcagctacaa gcagaagatg ctgatgcaat    3480
caggcgacgt cgagaccaac cctggccctg cttctgacaa cccgatcttg gagtttcttg    3540
aagcggaaaa cgatctagtc actctggcct ctctctggaa gatggtacac tctgttcaac    3600
agacctggag aaagtatgtg aagaacgaca atttttggcc caacttgctc agtgagctag    3660
tgggggaagg ctccatcgcc ttggccgcca cgctatctaa ccaagcttca gtgaaagctc    3720
tcttgggcct gcattttctc tctcgagggc tcaattacac agattttac tctttactga    3780 tagagaaatg ctctagtttc tttactgtag aaccgcctcc tccaccagct gaaaatctga    3840
tgaccaagcc ctccgtgaag tcgaaattcc gaaagctgtt taagatgcaa ggacccatgg    3900
acacagtcaa agactggaac caaatagccg ccggcttgaa gaatttccaa tttgttcgtg    3960
acctagtcaa agaggtggtc gactggctcc aggcctggat caataaagag aaagccagcc    4020
ctgtcctcca gtaccagctg gagatgaaga agctcgggcc cgtggctttg gctcatgatg    4080
ccttcatggc cggttccggg cccccctctt g gtgacgacca gattgaatac ctccagaacc    4140
tcaaatctct tgccctaaca ctgggaaaga ctaatttggc ccaaagtctc accactatga    4200
tcaatgccaa gcagagctcc gcccaacgag tcgaacccgt tgtggtggtc ctcagaggca    4260
agccgggatg cggcaaaagc ttggcctcca cgttgattgc ccaggctgtg tccaagcgtc    4320
tctacggctc gcaaagtgtg tattctcttc ctccggaccc agacttcttc gacggatata    4380
aaggacagtt tgtaaccttg atggacgatc tgggacaaaa cccggatggg caagatttct    4440 ccacctttg tcagatggtg tcgaccgccc aatttcttcc caacatggcg gaccttgcag    4500
agaaggggcg tcccttcacc tccaatctta tcattgcaac tacaaacctc cctcacttta    4560
gccctgtcac cattgctgat ccttctgcag tctctcggcg tatcaactac gacctgactc    4620
tagaagtatc tgaggcctac aagaagcaca cacggctgaa tttcgacctg gctttcagac    4680
gcactgacgc cccccccatt tatcctttg ctgcccatgt gcccttcgtg gacgtggctg    4740
tgcgcttcaa aaatggtcat caaagcttca atctcctaga gttggtcgac tccatttgtg    4800
cagacattcg ggccaagcaa caaggtgccc gaaatatgca gactctggtt ctacagaatc    4860
ctaacgagaa cgacgacacc cccgtcgacg aggcgttggg tagagttctc acccccgctg    4920
cggtcgacga ggcgcttgtc gacctcgctc cagatgccga cccggttggc cgcttggcta    4980
ttctcgccaa gctaggtctt gccctagctg cggtcacccc tggtttgata atcttggcag    5040
tgggactcta caagtacttc tctggctctg atacagacca agaagaaaca gaaagtgagg    5100
agcctgctaa agcgcctagg agcgagaatg cttatgatgg cccgaagaaa aactccaagc    5160
cccctggagc gctctctctt atggaaatgc aacagcccaa cgtggacatg ggctttgagg    5220
ctgcagttgc taagaaagtg gtcgtcccca ttaccttcat ggttcccaac agaccttctg    5280
gacttacaca gtccgctctt cttgtggccg gccggacctt cctaatcaat gagcatacat    5340
ggtccaaccc ctcctggacc agcttcacaa tccgtggtga ggtgcacact cgtgatgagc    5400 cttttccaaac ggttcatttt actcaccatg gtcttcccac agatctgatg atggtacgtc    5460
tcggaccggg caactctttc cctaacaatc tagacaagtt tggacttgac cagatgccgg    5520
cacgtaactc ccgtgtggtt ggcgtttcgg ctagttacgg taacttcttc ttctctggga    5580
acttcctcgg gtttgttgac tccatcacct ctgaccaagg aacctatgcg agacttttca    5640
ggtacagggt gacgacttac aagggatggt gcggttcggc cctggtctgt gaggccggtg    5700
```

| | |
|---|---|
| gtgtccgacg catcattggc atgcattctg ctggtgccgc tggtatcggc gccgggactt | 5760 |
| acatctcaaa attaggactg atcaaagccc ttaaacacct cggtgagcct ctggctacaa | 5820 |
| tgcaaggact gatgactgag ctagagcctg gagtcaccgt acatgtaccc cgaaaatcta | 5880 |
| aattgagaaa gacgaccgca cacgcggtgt acaaaccgga gtttgaacct gctgtgttgt | 5940 |
| caaaatttga tcccagactg aacaaggatg ttgacctaga tgaggtaatt tggtctaaac | 6000 |
| acaccgccaa cgtcccttat caacctcctt tgttctacac atacatgtca gagtacgctc | 6060 |
| atcgggtttt ctcctttttg ggaaaagaca atgacattct gaccgtcaaa gaagcaatcc | 6120 |
| tgggcatccc tggactagac cctatggatc cccacacagc tccgggtttg ccctacgcca | 6180 |
| ttagcggtct tcgacgtact gatctcgtcg attttgcgaa cggcacggta gacccggcac | 6240 |
| tggccatgca gatccagaaa ttcttagacg gtgactactc tgatcatgtc ttccaaactt | 6300 |
| ttctaaaaga tgaaatcaga ccctcagaga aggtccgggc gggaaaaacc cgcattgtcg | 6360 |
| atgtgccctc cctggcgcac tgcattgtgg gcagaatgct gcttgggcgc tttgccgcca | 6420 |
| agtttcaatc ccatcctggc tttctccttg gctccgctat cgggtctgac cccgatgtct | 6480 |
| tctggaccgt catagggct cagctcgagg aagaaagaa cacgtatgac gtggactaca | 6540 |
| gtgcctttga ctcttcacac ggcactggct ccttcgaggc tctcatctct cactttttca | 6600 |
| ccgtggacaa tggtttcagc cctgcgctgg gaccgtatct cagatccctg gctgtctcgg | 6660 |
| tgcacgctta cggcgagcgt cgcatcaaga ttaccgagg cctccctct ggttgtgccg | 6720 |
| cgaccagcct gctgaacaca gtgctcaaca atgtgatcat caggactgct ctggcattga | 6780 |
| cctacaagga atttgaatat gacatggttg atatcatcgc ctacggtgac gaccttctgg | 6840 |
| ttggtacgga ttacgatctg gacttcaatg aggtggcgcg gcgcgctgcc aaactggggt | 6900 |
| ataagatgac tcctgccaac aagggttctg tcttccctcc gacttcctct ctctccgatg | 6960 |
| ctgttttct aaaacgcaaa ttcgtccaaa acaatgacgg cttatataaa ccagttatgg | 7020 |
| atttaaagaa tttggaagcc atgctctcct acttcaaacc aggaacacta ctcgagaagc | 7080 |
| tgcaatctgt ttctatgttg gctcaacatt ctggaaaaga agaatatgat agattgatgc | 7140 |
| accccttcgc tgactacggt gccgtaccga gtcacgagta cctgcaggca agatggaggg | 7200 |
| ccttgttcga ctgacctgga tagcccaacg cgcttcggtg ctgccggcga ttctgggaga | 7260 |
| acccagtcgg | 7270 |

<210> SEQ ID NO 3
<211> LENGTH: 1453
<212> TYPE: DNA
<213> ORGANISM: Artificial Sequence
<220> FEATURE:
<223> OTHER INFORMATION: T7-rSVA-SD15-26-5'UTR (NheI + SfiI)

<400> SEQUENCE: 3

| | |
|---|---|
| gctagctaat acgactcact atagggtttg aaaggaagga ctgggcatga gggcccagtc | 60 |
| cttcctttcc ccttccgggg ggtaaaccgg ctgtgtttgc tagaggcaca gaggagcaac | 120 |
| atccaacctg cttttgtggg gaacggtgcg gctccaattc ctgcgtcgcc aaaggtgtta | 180 |
| gcgcacccaa acggcgcatc taccaatgct attggtgtgg tctgcgagtt ctagcctact | 240 |
| cgtttctccc ctactcactc attcacacac aaaaactgtg ttgtaactac aagatttggc | 300 |
| cctcgcacgg gatgtgcgat aaccgcaaga ttgactcaag cgcggaaagc gctgtaacca | 360 |
| catgctgtta gtcccttat ggctgcgaga tggctatcca cctcggatca ctgaactgga | 420 |
| gctcgaccct ccttagtaag ggaaccgaga ggccttcctg caacaagctc cgacacagag | 480 |

```
tccacgtgat tgctaccacc atgagtacat ggttctcccc tctcgaccca ggacttcttt      540
ttgaatatcc acggctcgat ccagagggtg gggcatgatc cccctagcat agcgagctac      600
agcgggaact gtagctaggc cttagcgtgc cttggatact gcctgatagg gcgacggcct      660
agtcgtgtcg gttctatagg tagcacatac aaatatgcag aactctcatt tttcttcga       720 tacagcctct ggcacctttg aagacgtaac cggaacaaaa gtcaagatcg ttgaataccc      780
cagatcggtg aacaatggtg tttacgattc gtccactcat ttagagatac tgaacctaca      840
gggtgaaatt gaaattttaa agtctttcaa cgaataccaa attcgcgccg ccaaacaaca      900
acttggactg gacatcgtat acgaactaca gggtaatgtt cagacaacct caaagaatga      960
ttttgattcc cgaggcaata atggtaacat gaccttcaat tactacgcaa acacttacca     1020
gaattcagta gacttctcga cctcctcgtc ggcgtcaggc gccggacccg ggaactcccg     1080
gggcggatta gcgggtctcc tcacaaattt cagtggaatc ttgaaccctc ttggctacct     1140
caaagatcac aataccgaag aaatggaaaa ctctgctgat cgagtcataa cgcaaacggc     1200
gggcaacact gccataaaca cgcaatcatc actgggtgtg ttgtgtgcct acgttgaaga     1260
cccgaccaaa tctgaccctc cgtccagcag cacagatcaa cccaccacca cttttactgc     1320
catcgacagg tggtacactg gacgcctcaa ttcttggaca aaagctgtaa aaaccttctc     1380 tttcaggcc gtcccgctcc ctggagcctt cctgtctaga cagggaggcc tcaacggagg      1440
ggccttcacg gcc                                                        1453

<210> SEQ ID NO 4
<211> LENGTH: 13353
<212> TYPE: DNA
<213> ORGANISM: Artificial Sequence
<220> FEATURE:
<223> OTHER INFORMATION: pUCBrick-rSVAmSacII

<400> SEQUENCE: 4
tcttcattcc gtaactcttc taccttcttt atttactttc taaaatccaa atacaaaaca       60
taaaaataaa taaacacaga gtaaattccc aaattattcc atcattaaaa gatacgaggc      120
gcgtgtaagt tacaggcaag cgatccgtcc cctcagccta tgcggatccg attagttatt      180
aatagtaatc aattacgggg tcattagttc atagcccata tatggagttc cgcgttacat      240
aacttacggt aaatggcccg cctggctgac cgcccaacga cccccgccca ttgacgtcaa      300
taatgacgta tgttcccata gtaacgccaa tagggacttt ccattgacgt caatgggtgg      360
agtatttacg gtaaactgcc cacttggcag tacatcaagt gtatcatatg ccaagtacgc      420
cccctattga cgtcaatgac ggtaaatggc ccgcctggca ttatgcccag tacatgacct      480
tatgggactt tcctacttgg cagtacatct acgtattagt catcgctatt accatggtga      540
tgcggttttg gcagtacatc aatgggcgtg gatagcggtt tgactcacgg ggatttccaa      600
gtctccaccc cattgacgtc aatgggagtt tgttttggca ccaaaatcaa cgggactttc      660
caaaatgtcg taacaactcc gccccattga cgcaaatggg cggtaggcgt gtacggtggg      720
aggtctatat aagcagagct ggtttagtga accgtcagat cgctagctaa tacgactcac      780
tatagggttt gaaggaagg actgggcatg agggcccagt ccttcctttc cccttccggg       840
gggtaaaccg gctgtgtttg ctagaggcac agaggagcaa catccaacct gcttttgtgg      900
ggaacggtgc ggctccaatt cctgcgtcgc caaaggtgtt agcgcaccca aacgcgcat       960 ctaccaatgc tattggtgtg gtctgcgagt tctagcctac tcgtttctcc cctactcact     1020
```

```
cattcacaca caaaaactgt gttgtaacta caagatttgg ccctcgcacg ggatgtgcga   1080
taaccgcaag attgactcaa gcgcggaaag cgctgtaacc acatgctgtt agtcccttta   1140
tggctgcgag atggctatcc acctcggatc actgaactgg agctcgaccc tccttagtaa   1200
gggaaccgag aggccttcct gcaacaagct ccgacacaga gtccacgtga ttgctaccac   1260
catgagtaca tggttctccc ctctcgaccc aggacttctt tttgaatatc cacggctcga   1320
tccagagggt ggggcatgat cccccctagca tagcgagcta cagcgggaac tgtagctagg   1380
ccttagcgtg ccttggatac tgcctgatag ggcgacggcc tagtcgtgtc ggttctatag   1440
gtagcacata caaatatgca gaactctcat ttttctttcg atacagcctc tggcaccttt   1500
gaagacgtaa ccggaacaaa agtcaagatc gttgaatacc ccagatcggt gaacaatggt   1560
gtttacgatt cgtccactca tttagagata ctgaacctac agggtgaaat tgaaatttta   1620
aagtctttca acgaatacca aattcgcgcc gccaaacaac aacttggact ggacatcgta   1680
tacgaactac agggtaatgt tcagacaacc tcaaagaatg attttgattc ccgaggcaat   1740
aatggtaaca tgaccttcaa ttactacgca aacacttacc agaattcagt agacttctcg   1800
acctcctcgt cggcgtcagg cgccggaccc gggaactccc ggggcggatt agcgggtctc   1860
ctcacaaatt tcagtggaat cttgaaccct cttggctacc tcaaagatca caataccgaa   1920
gaaatggaaa actctgctga tcgagtcata cgcaaacgg cgggcaacac tgccataaac   1980
acgcaatcat cactgggtgt gttgtgtgcc tacgttgaag acccgaccaa atctgaccct   2040
ccgtccagca gcacagatca acccaccacc actttactg ccatcgacag gtggtacact   2100
ggacgcctca attcttggac aaaagctgta aaaaccttct cttttcaggc cgtcccgctc   2160
cctggagcct tcctgtctag acagggaggc ctcaacggag gggccttcac ggccacccta   2220
catagacatt tcttaatgaa gtgcgggtgg caggtgcagg ttcaatgcaa tttgacgcaa   2280
ttccaccaag gtgctcttct tgttgccatg gtccccgaaa ccaccccttga tgtcaaacct   2340 gacggcaagg caaagagctt acaggagctg aatgaagagc agtgggtgga aatgtctgac   2400
gactaccgga ccgggaaaaa catgccttttt cagtctcttg gtacatacta ccgaccccct   2460
aactggactt ggggccccaa tttcatcaac ccctatcaag taacagtttt cccacaccaa   2520
attctgaacg cgagaaccctc tacctcggta gacataagtg tcccgtacat cggggagact   2580
cctacacaat cctcagagac acagaactcc tggacccctcc ttgttatggt gcttgtcccc   2640
ctggactaca aggagggagc cacaactgac ccagaaatta cattttctgt aaggcctaca   2700
agtccctact tcaatgggct tcgtaaccgt ttcacgaccg ggacggacga ggaacagggg   2760
cccattccca cagcacccag agaaaattcg cttatgtttc tctcaaccat ccctgatgac   2820
actgttcctg cttacgggaa tgtgcgtacc cctcccgtca attacctccc cggtgaaata   2880
accgacctct tacaactggc ccgtataccc actctcatgg cgtttgggcg ggcgtccgaa   2940
cccgagcctg cctcagacgc atatgtgccc tacgttgccg ttcctgccca gttcgacgac   3000
aagcctctca tctccttccc gatcacccctt tcagatcctg tctaccagaa cactctggta   3060
ggcgccatca gttcgaactt cgccaactac cggggggtgta tccaaatcac tttgacattt   3120
tgtggaccca tgatggcaag agggaaattc ctgctctcgt attctccccc aaatggagca   3180
caaccacaga cccctttctga agctatgcag tgcacatact ctatttggga tataggcttg   3240
aactctagtt ggacctttgt catccctac atctcgccca gtgattaccg tgaaactcgg   3300
gctattacca actcagttta ttctgctgat ggttggttta gcttgcacaa gctgaccaaa   3360
attactctac cacctgactg cccgcagagt ccctgtattc tcttttttcgc ctctgctggt   3420
```

| | | | | | |
|---|---|---|---|---|---|
| gaggattaca | ccctccgtct | ccctgttgat | tgtaatcctt | cctacgtgtt | ccactccacc | 3480
| gacaacgccg | agactggggt | tattgaggca | ggtaacactg | acaccgattt | ttctggtgaa | 3540
| ctggcggctc | ctggctctaa | ccatactaat | gtcaaattcc | tgtttgaccg | atctcgacta | 3600
| ctgaatgtaa | ttaaggtact | ggagaaggac | gccgtcttcc | cccgtccttt | ccccacagca | 3660
| acaggtgcac | agcaggacga | tggttacttt | tgtcttctaa | caccccgccc | aacagtcgct | 3720
| tcccgacccg | ccactcgttt | cggcctgtac | gtcaacccgt | ctgacagtgg | cgttctcgct | 3780
| aacacttcac | tggatttcaa | ttttacagt | ttggcctgtt | tcacttactt | tagatcagac | 3840
| cttgaagtca | cggtggtctc | actggagcca | gatttggaat | tcgccgtggg | gtggttcccc | 3900
| tctggcagtg | agtaccaggc | ttctagcttt | gtttacgacc | aactgcatgt | accctaccac | 3960
| tttactgggc | gcactccccg | cgctttcacc | agcaagggtg | aaaggtatc | tttcgtgctc | 4020
| ccttggaact | ctgtctcttc | cgtgcttccc | gtgcgctggg | ggggcgcctc | caagctttct | 4080
| tctgccacgc | ggggtctgcc | ggctcatgct | gactgggga | ccatttacgc | ctttatcccc | 4140
| cgtcctaacg | agaagaaaag | caccgctgta | aagcacgtgg | cggtgtacgt | tcggtacaag | 4200
| aacgcgcgtg | cctggtgccc | cagcatgctt | ccctttcgca | gctacaagca | gaagatgctg | 4260
| atgcaatcag | gcgacgtcga | gaccaaccct | ggccctgctt | ctgacaaccc | gatcttggag | 4320
| tttcttgaag | cggaaaacga | tctagtcact | ctggcctctc | tctggaagat | ggtacactct | 4380
| gttcaacaga | cctggagaaa | gtatgtgaag | aacgacaatt | tttggcccaa | cttgctcagt | 4440
| gagctagtgg | gggaaggctc | catcgccttg | gccgccacgc | tatctaacca | agcttcagtg | 4500
| aaagctctct | tgggcctgca | ttttctctct | cgagggctca | attacacaga | ttttactct | 4560
| ttactgatag | agaaatgctc | tagtttcttt | actgtagaac | cgcctcctcc | accagctgaa | 4620
| aatctgatga | ccaagccctc | cgtgaagtcg | aaattccgaa | agctgtttaa | gatgcaagga | 4680
| cccatggaca | cagtcaaaga | ctggaaccaa | atagccgccg | gcttgaagaa | tttccaattt | 4740
| gttcgtgacc | tagtcaaaga | ggtggtcgac | tggctccagg | cctggatcaa | taagagaaa | 4800
| gccagccctg | tcctccagta | ccagctggag | atgaagaagc | tcgggcccgt | ggctttggct | 4860
| catgatgcct | tcatggccgg | ttccgggccc | cctcttggtg | acgaccagat | tgaatacctc | 4920
| cagaacctca | aatctcttgc | cctaacactg | ggaaagacta | atttggccca | aagtctcacc | 4980
| actatgatca | atgccaagca | gagctccgcc | caacagtcg | aaccgttgt | ggtggtcctc | 5040
| agaggcaagc | cgggatgcgg | caaaagcttg | gcctccacgt | tgattgccca | ggctgtgtcc | 5100
| aagcgtctct | acgctcgca | aagtgtgtat | tctcttcctc | cggacccaga | cttcttcgac | 5160
| ggatataaag | gacagtttgt | aaccttgatg | gacgatctgg | gacaaaaccc | ggatgggcaa | 5220
| gatttctcca | cctttttgtca | gatggtgtcg | accgcccaat | ttcttcccaa | catggcggac | 5280
| cttgcagaga | agggcgtcc | cttcacctcc | aatcttatca | ttgcaactac | aaacctccct | 5340
| cactttagcc | ctgtcaccat | tgctgatcct | tctgcagtct | ctcggcgtat | caactacgac | 5400
| ctgactctag | aagtatctga | ggcctacaag | aagcacacac | ggctgaattt | cgacctggct | 5460
| ttcagacgca | ctgacgcccc | ccccatttat | ccttttgctg | cccatgtgcc | cttcgtggac | 5520
| gtggctgtgc | gcttcaaaaa | tggtcatcaa | agcttcaatc | tcctagagtt | ggtcgactcc | 5580
| atttgtgcag | acattcgggc | caagcaacaa | ggtgcccgaa | atatgcagac | tctggttcta | 5640
| cagaatccta | acgagaacga | cgacaccccc | gtcgacgagg | cgttgggtag | agttctcacc | 5700
| cccgctgcgg | tcgacgaggc | gcttgtcgac | ctcgctccag | atgccgaccc | ggttggccgc | 5760

```
ttggctattc tcgccaagct aggtcttgcc ctagctgcgg tcacccctgg tttgataatc    5820
ttggcagtgg gactctacaa gtacttctct ggctctgata cagaccaaga agaaacagaa    5880
agtgaggagc ctgctaaagc gcctaggagc gagaatgctt atgatggccc gaagaaaaac    5940
tccaagcccc ctggagcgct ctctcttatg gaaatgcaac agcccaacgt ggacatgggc    6000
tttgaggctg cagttgctaa gaaagtggtc gtccccatta ccttcatggt tcccaacaga    6060
ccttctggac ttacacagtc cgctcttctt gtggccggcc ggaccttcct aatcaatgag    6120
catacatggt ccaacccctc ctggaccagc ttcacaatcc gtggtgaggt gcacactcgt    6180
gatgagcctt tccaaacggt tcattttact caccatggtc ttcccacaga tctgatgatg    6240
gtacgtctcg gaccgggcaa ctctttccct aacaatctag acaagtttgg acttgaccag    6300
atgccggcac gtaactcccg tgtggttggc gtttcggcta gttacggtaa cttcttcttc    6360
tctgggaact tcctcgggtt tgttgactcc atcacctctg accaaggaac ctatgcgaga    6420
cttttcaggt acagggtgac gacttacaag ggatggtgcg gttcggccct ggtctgtgag    6480
gccggtggtg tccgacgcat cattggcatg cattctgctg gtgccgctgg tatcggcgcc    6540
gggacttaca tctcaaaatt aggactgatc aaagccctta acacctcgg tgagcctctg    6600 gctacaatgc aaggactgat gactgagcta gagcctggag tcaccgtaca gtaccccga    6660 aaatctaaat tgagaaagac gaccgcacac gcggtgtaca aaccggagtt tgaacctgct    6720
gtgttgtcaa aatttgatcc cagactgaac aaggatgttg acctagatga ggtaatttgg    6780
tctaaacaca ccgccaacgt cccttatcaa cctcctttgt tctacacata catgtcagag    6840
tacgctcatc gggttttctc ctttttggga aagacaatg acattctgac cgtcaaagaa    6900
gcaatcctgg gcatccctgg actagaccct atggatcccc acacagctcc gggtttgccc    6960
tacgccatta gcgtcttcg acgtactgat ctcgtcgatt ttgcgaacgg cacgtagac    7020 ccggcactgg ccatgcagat ccagaaattc ttagacggtg actactctga tcatgtcttc    7080 caaactttc taaagatga aatcagaccc tcagagaagg tccgggcggg aaaaacccgc    7140
attgtcgatg tgccctccct ggcgcactgc attgtgggca gaatgctgct tgggcgcttt    7200
gccgccaagt ttcaatccca tcctggcttt tccttggct ccgctatcgg gtctgacccc    7260
gatgtcttct ggaccgtcat aggggctcag ctcgagggaa gaaagaacac gtatgacgtg    7320
gactacagtg cctttgactc ttcacacggc actggctcct tcgaggctct catctctcac    7380
tttttcaccg tggacaatgg tttcagccct gcgctgggac cgtatctcag atccctggct    7440
gtctcggtgc acgcttacgg cgagcgtcgc atcaagatta ccggaggcct cccctctggt    7500
tgtgccgcga ccagcctgct gaacacagtg ctcaacaatg tgatcatcag gactgctctg    7560
gcattgacct acaaggaatt tgaatatgac atggttgata tcatcgccta cggtgacgac    7620
cttctggttg gtacggatta cgatctggac ttcaatgagg tggcgcggcg cgctgccaaa    7680
ctggggtata agatgactcc tgccaacaag ggttctgtct ccctccgac ttcctctctc    7740 tccgatgctg tttttctaaa acgcaaattc gtccaaaaca atgacggctt atataaacca    7800
gttatggatt taagaatttt ggaagccatg ctctcctact tcaaaccagg aacactactc    7860
gagaagctgc aatctgtttc tatgttggct caacattctg gaaagaaga atatgataga    7920 ttgatgcacc ccttcgctga ctacggtgcc gtaccgagtc acgagtacct gcaggcaaga    7980
tggagggcct tgttcgactg acctggatag cccaacgcgc ttcggtgctg ccggcgattc    8040
tgggagaacc cagtcggaaa aaaaaaaaaa aaaaaaaaa aaaaaaaact cgtgcggccg    8100
catctagatg cattcgcgag gtaccgagct cgaattcact ggccgtcgtt ttacaacgtc    8160
```

```
gtgactggga aaaccctggc gttacccaac ttaatcgcct tgcagcacat ccccctttcg   8220
ccagctggcg taatagcgaa gaggcccgca ccgatcgccc ttcccaacag ttgcgcagcc   8280
tgaatggcga atggcgcctg atgcggtatt ttctccttac gcatctgtgc ggtatttcac   8340
accgcatatg gtgcactctc agtacaatct gctctgatgc cgcatagtta agccagcccc   8400
gacacccgcc aacacccgct gacgcgccct gacgggcttg tctgctcccg gcatccgctt   8460
acagacaagc tgtgaccgtc tccgggagct gcatgtgtca gaggttttca ccgtcatcac   8520
cgaaacgcgc gagacgaaag gcctcgtga tacgcctatt tttataggtt aatgtcatga   8580
taataatggt ttcttagacg tcaggtggca cttttcgggg aaatgtgcgc ggaaccccta   8640
tttgtttatt tttctaaata cattcaaata tgtatccgct catgagacaa taaccctgat   8700
aaatgcttca ataatattga aaaggaaga gtatgagtat tcaacatttc cgtgtcgccc   8760
ttattccctt ttttgcggca ttttgccttc ctgtttttgc tcacccagaa acgctggtga   8820
aagtaaaaga tgctgaagat cagttgggtg cacgagtggg ttacatcgaa ctggatctca   8880
acagcggtaa gatccttgag agttttcgcc ccgaagaacg ttttccaatg atgagcactt   8940
ttaaagttct gctatgtggc gcggtattat cccgtattga cgccgggcaa gagcaactcg   9000
gtcgccgcat acactattct cagaatgact tggttgagta ctcaccagtc acagaaaagc   9060
atcttacgga tggcatgaca gtaagagaat atgcagtgc tgccataacc atgagtgata   9120
acactgcggc caacttactt ctgacaacga tcggaggacc gaaggagcta accgcttttt   9180
tgcacaacat gggggatcat gtaactcgcc ttgatcgttg ggaaccggag ctgaatgaag   9240
ccataccaaa cgacgagcgt gacaccacga tgcctgtagc aatggcaaca acgttgcgca   9300
aactattaac tggcgaacta cttactctag cttcccggca acaattaata gactggatgg   9360
aggcggataa agttgcagga ccacttctgc gctcggccct tccggctggc tggtttattg   9420
ctgataaatc tggagccggt gagcgtgggt ctcgcggtat cattgcagca ctggggccag   9480
atggtaagcc ctcccgtatc gtagttatct acacgacggg gagtcaggca actatggatg   9540
aacgaaatag acagatcgct gagataggtg cctcactgat taagcattgg taactgtcag   9600
accaagttta ctcatatata ctttagattg atttaaaact tcatttttaa tttaaaagga   9660
tctaggtgaa gatcctttt gataatctca tgaccaaaat cccttaacgt gagttttcgt   9720
tccactgagc gtcagacccc gtagaaaaga tcaaaggatc ttcttgagat cctttttttc   9780
tgcgcgtaat ctgctgcttg caaacaaaaa aaccaccgct accagcggtg tttgtttgc   9840 cggatcaaga gctaccaact ctttttccga aggtaactgg cttcagcaga gcgcagatac   9900
caaatactgt tcttctagtg tagccgtagt taggccacca cttcaagaac tctgtagcac   9960
cgcctacata cctcgctctg ctaatcctgt taccagtggc tgctgccagt ggcgataagt  10020
cgtgtcttac cgggttggac tcaagacgat agttaccgga taaggcgcag cggtcgggct  10080
gaacgggggg ttcgtgcaca cagcccagct tggagcgaac gacctacacc gaactgagat  10140
acctacagcg tgagctatga gaaagcgcca cgcttcccga agggagaaag gcggacaggt  10200
atccggtaag cggcagggtc ggaacaggag agcgcacgag ggagcttcca gggggaaacg  10260
cctggtatct ttatagtcct gtcgggtttc gccacctctg acttgagcgt cgatttttgt  10320
gatgctcgtc aggggggcgg agcctatgga aaaacgccag caacgcggcc tttttacggt  10380
tcctggcctt ttgctggcct tttgctcaca tgttctttcc tgcgttatcc cctgattctg  10440
tggataaccg tattaccgcc tttgagtgag ctgataccgc tcgccgcagc cgaacgaccg  10500
```

```
agcgcagcga gtcagtgagc gaggaagcgg aagagcgccc aatacgcaaa ccgcctctcc    10560
ccgcgcgttg gccgattcat taatgcagct ggcacgacag gtttcccgac tggaaagcgg    10620
gcagtgagcg caacgcaatt aatgtgagtt agctcactca ttaggcaccc caggctttac    10680
actttatgct tccggctcgt atgttgtgtg gaattgtgag cggataacaa tttcacacag    10740
gaaacagcta tgaccatgat tacgccaagc ttgcatgcta ttttttttcct caacataacg    10800 agaacacaca ggggcgctat cgcacagaat caaattcgat gactggaaat ttttttgttaa    10860 tttcagaggt cgcctgacgc atataccttt ttcaactgaa aaattgggag aaaaaggaaa    10920
ggtgagaggc cggaaccggc ttttcatata gaatagagaa gcgttcatga ctaaatgctt    10980
gcatcacaat acttgaagtt gacaatatta tttaaggacc tattgttttt tccaataggt    11040
ggttagcaat cgtcttactt tctaactttt cttaccttttt acatttcagc aatatatata    11100
tatatttcaa ggatatacca ttctaatgtc tgcccctatg tctgcccta agaagatcgt    11160 cgttttgcca ggagaccacg ttggtcaaga aatcacagcc gaagccatta aggttcttaa    11220
agctatttct gatgttcgtt ccaatgtcaa gttcgatttc gaaaatcatt taattggtgg    11280
tgctgctatc gatgctacag gtgtcccact tccagatgag gcgctggaag cctccaagaa    11340
ggttgatgcc gttttgttag gtgctgtggg tggtcctaaa tggggtaccg gtagtgttag    11400
acctgaacaa ggtttactaa aaatccgtaa agaacttcaa ttgtacgcca acttaagacc    11460
atgtaacttt gcatccgact ctcttttaga cttatctcca atcaagccac aatttgctaa    11520
aggtactgac ttcgttgttg tcagagaatt agtgggaggt atttactttg gtaagagaaa    11580
ggaagacgat ggtgatggtg tcgcttggga tagtgaacaa tacaccgttc cagaagtgca    11640
aagaatcaca agaatggccg cttttcatggc cctacaacat gagccaccat tgcctatttg    11700
gtccttggat aaagctaatg ttttggcctc ttcaagatta tggagaaaaa ctgtggagga    11760
aaccatcaag aacgaattcc ctacattgaa ggttcaacat caattgattg attctgccgc    11820
catgatccta gttaagaacc caacccacct aaatggtatt ataatcacca gcaacatgtt    11880
tggtgatatt atctccgatg aagcctccgt tatcccaggt tccttgggtt tgttgccatc    11940
tgcgtccttg gcctctttgc cagacaagaa caccgcattt ggtttgtacg aaccatgtca    12000
cggttctgct ccagatttgc caaagaataa ggttgaccct atcgccacta tcttgtctgc    12060
tgcaatgatg ttgaaattgt cattgaactt gcctgaagaa ggtaaggcca ttgaagatgc    12120
agttaaaaag gttttggatg caggtatcag aactggtgat ttaggtggtt ccaacagtac    12180
caccgaagtc ggtgatgctg tcgccgaaga agttaagaaa atccttgctt aaaaagattc    12240
tcttttttta tgatatttgt acataaactt tataaatgaa attcataata gaaacgacac    12300
gaaattacaa aatggaatat gttcataggg tagacgaaac tatatacgca atctacatac    12360
atttatcaag aaggagaaaa aggaggatag taaaggaata caggtaagca aattgatact    12420
aatggctcaa cgtgataagg aaaaagaatt gcactttaac attaatattg acaaggagga    12480
gggcaccaca caaaaagtta ggtgtaacag aaaatcatga aactacgatt cctaatttga    12540
tattggagga ttttctctaa aaaaaaaaaa atacgacgtc taagaaacca ttattatcat    12600
gacattaacc tataaaaata ggcgtatcac gaggcccttt cgtctcgcgc gtttcggtga    12660
tgacggtgaa aacctctgac acatgcagct cccggagacg gtcacagctt gtctgtaagc    12720
ggatgccggg agcagacaag cccgtcaggg cgcgtcagcg ggtgttggcg ggtgtcgggg    12780
ctggcttaaa gctgtttcct gtgtgaaatt gttatccgct cacaattcca cacaacatac    12840
gagccggaag cataaagtgt aaagcctggg gtgcctaatg agtgagctaa ctcacattaa    12900
```

```
ttgcgttgcg ctcactgccc gctttccagt cgggaaacct gtcgtgccag ctgcattaat    12960
gaatcggcca acgcgcgggg agagggtcct tttcatcacg tgctataaaa ataattataa    13020
tttaaatttt ttaatataaa tatataaatt aaaaatagaa agtaaaaaaa gaaattaaag    13080
aaaaaatagt ttttgttttc cgaagatgta aaagactcta gggggatcgc caacaaatac    13140 tacctttat  cttgctcttc ctgctctcag gtattaatgc cgaattgttt catcttgtct    13200
gtgtagaaga ccacacacga aaatcctgtg attttacatt ttacttatcg ttaatcgaat    13260
gtatatctat ttaatctgct tttcttgtct aataaatata tatgtaaagt acgcttttg     13320 ttgaaatttt ttaaaccttt gtttattttt ttt                                 13353

<210> SEQ ID NO 5
<211> LENGTH: 26
<212> TYPE: DNA
<213> ORGANISM: Artificial Sequence
<220> FEATURE:
<223> OTHER INFORMATION: Probe

<400> SEQUENCE: 5
caggaacact actcgagaag ctgcaa                                             26

<210> SEQ ID NO 6
<211> LENGTH: 21
<212> TYPE: DNA
<213> ORGANISM: Artificial Sequence
<220> FEATURE:
<223> OTHER INFORMATION: Primer

<400> SEQUENCE: 6
gaagccatgc tctcctactt c                                                  21

<210> SEQ ID NO 7
<211> LENGTH: 26
<212> TYPE: DNA
<213> ORGANISM: Artificial Sequence
<220> FEATURE:
<223> OTHER INFORMATION: Primer

<400> SEQUENCE: 7
gggtgcatca atctatcata ttcttc                                             26
```

SENECAVIRUS A VIRUS STRAINS AND IMMUNOGENIC COMPOSITIONS THEREFROM

CROSS REFERENCE TO RELATED APPLICATIONS

This application claims priority to U.S. provisional patent application U.S. Ser. No. 62/874,094, filed Jul. 15, 2019. The U.S. provisional patent application is herein incorporated by reference in its entirety, including without limitation, the specification, claims, and abstract, as well as any figures, tables, appendices, or drawings thereof.

FIELD OF THE INVENTION

The present invention is directed to novel immunogenic compositions that protect swine from disease caused by Senecavirus A (SVA).

BACKGROUND OF THE INVENTION

Senecavirus A causes vesicular disease similar to that of Foot and Mouth Disease, swine vesicular disease, vesicular stomatitis or vesicular exanthema (12). The clinical signs in pigs include vesicles or lesions on snouts and feet (dewclaw, coronary band and sole), anorexia, cutaneous hyperemia, fever, lethargy and lameness (12, 19, 20). Infection with SVA occurs via oronasal route and after incubation period of about 3 to 5 days, lameness and lethargy develops, followed by development of vesicles (19). Commercial vaccine to SVA have not been developed yet. Vaccines used for Foot and Mouth Disease, a related picornavirus, are mostly inactivated, however they lack long term protection, require multiple vaccinations, have short shelf life (22), so the need of novel approach for vaccine development for SVA is essential.

SUMMARY OF THE INVENTION

The present invention encompasses immunogenic compositions comprising variant SVA strains. The variant strains are less virulent that traditional SVA strains and may be used, in one embodiment for whole virus, attenuated live vaccines. The novel strains have one or more modifications in nucleic acid sequence from currently known SVA strains and pigs infected with live attenuated serially passaged variant strains of the invention do not cause disease when administered to piglets. Thus, the invention comprises an immunogenic composition, suitable to be used as a vaccine, which comprises a variant SVA strain of the invention, preferably live and attenuated, or an immunogenic fragment thereof, one or more adjuvants, and optionally one or more excipients, in an amount effective to elicit production of neutralizing antibodies in swine. The adjuvant preferably provides an oil-in-water emulsion with additional components. The immunogenic compositions of the invention protect swine from infection by SVA, and are effective in single doses, in two-dose programs, or in vaccination programs involving multiple doses, which may be spread apart by at least a week, and optionally at greater intervals of time, such as one to several months. It should be noted that depending on the level of epidemic threat in a swine population, the vaccine dose program of one, two, or multiple doses may be repeated, from time to time, as a precautionary measure. Additionally, it should be noted that vaccinating a mother sow during pregnancy will provide protection to a young piglet, via maternal transfer of antibodies and T-cells in milk, although such protection may need to be followed up with additional vaccination doses to the piglet. Vaccination of all swine, including piglets and adults is contemplated.

The variant strains include several nucleic acid modifications from traditional SVA strains, including primarily variations in the 5'UTR, also an additional variation was identified in the VP4 coding region. Accordingly, the vaccinating compositions of the present invention are useful to protect swine from disease or challenge by SVA generally, including recent isolates, and other isolates that show homology with SD 15-26 SVA variants. It has surprisingly been found that the variant strain of the invention includes three modifications in the 5' UTR plus the single silent nucleotide change in the VP4 coding region that results in a less virulent strain and thus is useful as an attenuated live vaccine. Several additional variants have been introduced to help further distinguish the strains. The modification includes a C to T change at position 33 of the 5'UTR of strain SD 15-26. It expected that the analogous change in other wild type strains will have similar attenuation effects. Additional modifications introduced for identification only include changes from C to T at positions 36 and 37 in the 5' UTR and a silent change of C to A at position 947 of the VP4 coding region. Accordingly, the vaccinating compositions of the present invention are useful to protect swine from disease or challenge by SVA generally, including recent isolates, and other isolates that show homology SVA SD15-26.

The present invention includes novel nucleotide sequences of SVA, including novel genotypes thereof, all of which are useful in the preparation of vaccines for treating and preventing diseases in swine and other animals. Vaccines provided according to the practice of the invention are effective against multiple swine SVA genotypes and isolates. Diagnostic and therapeutic polyclonal and monoclonal antibodies are also a feature of the present invention, as are infectious clones useful in the propagation of the virus and in the preparation of vaccines. Of importance, there are disclosed vaccines that comprise, as antigen, a whole virus (live or attenuated) or a single antigenic protein of an SVA open reading frame, most particularly from the 5'UTR, and fragments of the full-length sequence encoding the SVA proteins. The invention also provides for novel variant full length SVA genomes that can replicate efficiently in host animals and tissue culture.

The present invention provides a method of treating or preventing a disease or disorder in an animal caused by infection with Senecavirus A (SVA), including disease states that are directly caused by SVA, and disease states contributed to or potentiated by SVA. Disease states in swine that may be potentiated by SVA, and which may also be treated or prevented according to the practice of the invention, include those caused by or associated with SVA such as Foot and Mouth Disease.

The present invention also includes the option to administer a combination vaccine, that is, a bivalent or multivalent combination of antigens, which may include live, modified live, or inactivated antigens against the non-SVA pathogen, with appropriate choice of adjuvant.

Based in part upon the unique SVA sequences as disclosed herein, the present invention also provides a diagnostic kit for differentiating between porcine animals vaccinated with the above described SVA vaccines and porcine animals infected with field strains of SVA.

Representative embodiments of the invention include an isolated polynucleotide sequence that includes a polynucleotide selected from:
  (a) SEQ ID NO: 1, 2, 3, or 4 or a fragment thereof than encodes the SVA VP proteins or a fragment of said protein SVA 5" UTR wherein position 33, 36, and/or 37 is not C; or position 947 of the VP4 coding region with reference to SEQ ID NO: 1;
  (b) the complement of any sequence in (a);
  (c) a polynucleotide that hybridizes with a sequence of (a) or (b) under stringent conditions defined as hybridizing to filter bound DNA in 0.5M NaHPO4, 7% SDS, 1 mM EDTA at 65° C., and washing in 0.1×SSC/0.1% SDS at 68° C.
  (d) a polynucleotide that is at least 70% identical to the polynucleotide of (a) or (b);
  (e) a polynucleotide that is at least 80% identical to the polynucleotide of (a) or (b);
  (f) a polynucleotide that is at least 90% identical to the polynucleotide of (a) or (b); and
  (g) a polynucleotide that is at least 95% identical to the polynucleotide of (a) or (b)
Preferably in combination with a second heterologous sequence.

The invention further provides RNA and DNA molecules, their complements, fragments and vectors and plasmids for the expression of any such RNA or DNA polynucleotides, and for SVA virus that is expressed from such nucleotide sequences, wherein said virus is live, or fully or partially attenuated.

The invention also provides a vaccine that comprises a polynucleotide sequence as aforementioned, and corresponding nucleotide sequences that may function as infectious clones. The invention also includes polynucleotides which encode additional otherwise identical amino acids are replaced by conservative substitutions and further preferably including fusion proteins or other modifications such that the proteins are not naturally occurring.

The invention also provides for novel full length variant SVA genome sequence that can replicate efficiently in host animals and tissue culture, and can be used virus live, preferably attenuated vaccine composition.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIGS. 3 (A) and (B) depict (A) Viral load in tissue 14 days post-infection and (B) Neutralizing antibody titer in both virus

FIG. 11 is the T7-rSVA-SD15-26-5'UTR (NheI+SfiI) sequence.

DETAILED DESCRIPTION OF THE INVENTION

Figure 1D:
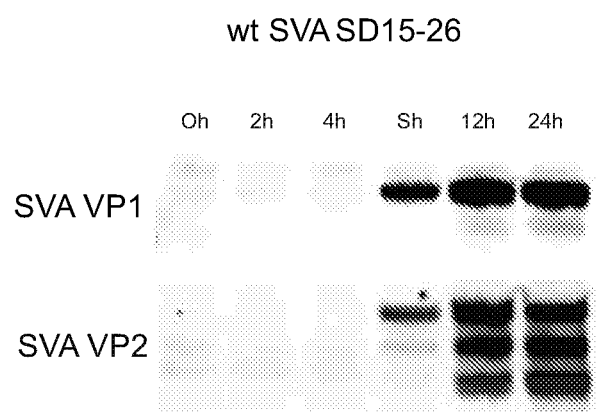
FIGS. 1 (A)-(E) depict In vitro characterization of live attenuated vaccine rSVA mSacII. H1299 cells were infected with (A) 0.1 and (B) 10 MOI of wt SVA SD15-26 and rSVA mSacII and virus titer were measured at 2, 4, 8, 12- and 24-hours post-infection. Western blot to detect SVA-VP1 and VP2 protein in (C) wt SVA SD15-26 and (D) rSVA mSacII. (E) Restriction digestion by SacII to show SacII restriction site in wt SVA SD15-26 but not in rSVA mSacII.

The following definitions and introductory matters are applicable in the specification.

The singular terms "a", "an", and "the" include plural referents unless context clearly indicates otherwise. Similarly, the word "or" is intended to include "and" unless the context clearly indicate otherwise. The word "or" means any one member of a list and also includes any combination of members of that list.

The term "adjuvant" refers to a compound that enhances the effectiveness of the vaccine and may be added to the formulation that includes the immunizing agent. Adjuvants provide enhanced immune response even after administration of only a single dose of the vaccine. Adjuvants may include, for example, muramyl dipeptides, pyridine, aluminum hydroxide, dimethyldioctadecyl ammonium bromide (DDA), oils, oil-in-water emulsions, saponins, cytokines, and other substances known in the art. Examples of suitable adjuvants are described in U.S. Patent Application Publication No. US2004/0213817 A1. "Adjuvanted" refers to a composition that incorporates or is combined with an adjuvant.

"Antibodies" refers to polyclonal and monoclonal antibodies, chimeric, and single chain antibodies, as well as Fab fragments, including the products of a Fab or other immunoglobulin expression library. With respect to antibodies, the term, "immunologically specific" refers to antibodies that bind to one or more epitopes of a protein of interest, but which do not substantially recognize and bind other molecules in a sample containing a mixed population of antigenic biological molecules.

An "attenuated" SVA as used herein refers to an SVA which is capable of infecting and/or replicating in a susceptible host but is non-pathogenic or less pathogenic to the susceptible host. For example, the attenuates ed virus may cause no observable/detectable clinical manifestations, or less clinical manifestations, or less severe clinical manifestations, or exhibit a reduction in virus replication efficiency and/or infectivity, as compared with the related field isolated strains. The clinical manifestations of SVA infection can include, without limitation, vesicles or lesions on snouts and feet (dewclaw, coronary band and sole), anorexia, cutaneous hyperemia, fever, lethargy and lameness.

An "epitope" is an antigenic determinant that is immunologically active in the sense that once administered to the host, it can evoke an immune response of the humoral (B cells) and/or cellular type (T cells). These are chemical groups or peptide sequences on a molecule that are antigenic. An antibody specifically binds an antigenic epitope on a polypeptide. In the animal most antigens will present several or even many antigenic determinants simultaneously. Such a polypeptide may also be qualified as an immunogenic polypeptide and the epitope may be identified as described further.

The term "immunogenic fragment" as used herein refers to a polypeptide or a fragment of a polypeptide, or a nucleotide sequence encoding the same which comprises an allele-specific motif, an epitope or other sequence such that the polypeptide or the fragment will bind an MHC molecule and induce a cytotoxic T lymphocyte ("CTL") response, and/or a B cell response (for example, antibody production), and/or T-helper lymphocyte response, and/or a delayed type hypersensitivity (DTH) response against the antigen from which the immunogenic polypeptide or the immunogenic fragment is derived. A DTH response is an immune reaction in which T cell-dependent macrophage activation and inflammation cause tissue injury. A DTH reaction to the subcutaneous injection of antigen is often used as an assay for cell-mediated immunity.

With the term "induction of an immunoprotective response" is meant a (humoral and/or cellular) immune response that reduces or eliminates one or more of the symptoms of disease, i.e. clinical signs, lesions, bacterial excretion and bacterial replication in tissues in the infected subject compared to a healthy control. Preferably said reduction in symptoms is statistically significant when compared to a control.

An "infectious DNA molecule", for purposes of the present invention, is a DNA molecule that encodes the necessary elements for viral replication, transcription, and translation into a functional virion in a suitable host cell.

The term "isolated" is used to indicate that a cell, peptide or nucleic acid is separated from its native environment. Isolated peptides and nucleic acids may be substantially pure, i.e. essentially free of other substances with which they may bound in nature.

For purposes of the present invention, the nucleotide sequence of a second polynucleotide molecule (either RNA or DNA) is "homologous" to the nucleotide sequence of a first polynucleotide molecule, or has "identity" to said first polynucleotide molecule, where the nucleotide sequence of the second polynucleotide molecule encodes the same polyaminoacid as the nucleotide sequence of the first polynucleotide molecule as based on the degeneracy of the genetic code, or when it encodes a polyaminoacid that is sufficiently similar to the polyaminoacid encoded by the nucleotide sequence of the first polynucleotide molecule so as to be useful in practicing the present invention. Homologous polynucleotide sequences also refer to sense and antisense strands, and in all cases to the complement of any such strands. For purposes of the present invention, a polynucleotide molecule is useful in practicing the present invention, and is therefore homologous or has identity, where it can be used as a diagnostic probe to detect the presence of SVA or viral polynucleotide in a fluid or tissue sample of an infected pig, e.g. by standard hybridization or amplification techniques. Generally, the nucleotide sequence of a second polynucleotide molecule is homologous to the nucleotide sequence of a first polynucleotide molecule if it has at least about 70% nucleotide sequence identity to the nucleotide sequence of the first polynucleotide molecule as based on the BLASTN algorithm (National Center for Biotechnology Information, otherwise known as NCBI, (Bethesda, Md., USA) of the United States National Institute of Health). In a specific example for calculations according to the practice of the present invention, reference is made to BLASTP 2.2.6 [Tatusova TA and TL Madden, "BLAST 2 sequences—a new tool for comparing protein and nucleotide sequences." (1999) FEMS Microbiol Lett. 174:247-250.]. Briefly, two amino acid sequences are aligned to optimize the alignment scores using a gap opening penalty of 10, a gap extension penalty of 0.1, and the "blosum62" scoring matrix of Henikoff and Henikoff (Proc. Nat. Acad. Sci. USA 325 89:10915-10919. 1992). The percent identity is then calculated as: Total number of identical matches X 100/divided by the length of the longer sequence+number of gaps introduced into the longer sequence to align the two sequences.

Preferably, a homologous nucleotide sequence has at least about 75% nucleotide sequence identity, even more preferably at least about 80%, 85%, 90% and 95% nucleotide sequence identity. Since the genetic code is degenerate, a homologous nucleotide sequence can include any number of "silent" base changes, i.e. nucleotide substitutions that nonetheless encode the same amino acid.

A homologous nucleotide sequence can further contain non-silent mutations, i.e. base substitutions, deletions, or additions resulting in amino acid differences in the encoded polyaminoacid, so long as the sequence remains at least about 70% identical to the polyaminoacid encoded by the first nucleotide sequence or otherwise is useful for practicing the present invention. In this regard, certain conservative amino acid substitutions may be made which are generally recognized not to inactivate overall protein function: such as in regard of positively charged amino acids (and vice versa), lysine, arginine and histidine; in regard of negatively charged amino acids (and vice versa), aspartic acid and glutamic acid; and in regard of certain groups of neutrally charged amino acids (and in all cases, also vice versa), (1) alanine and serine, (2) asparagine, glutamine, and histidine, (3) cysteine and serine, (4) glycine and proline, (5) isoleucine, leucine and valine, (6) methionine, leucine and isoleucine, (7) phenylalanine, methionine, leucine, and tyrosine, (8) serine and threonine, (9) tryptophan and tyrosine, (10) and for example tyrosine, tyrptophan and phenylalanine.

Homologous nucleotide sequences can be determined by comparison of nucleotide sequences, for example by using BLASTN, above. Alternatively, homologous nucleotide sequences can be determined by hybridization under selected conditions. For example, the nucleotide sequence of a second polynucleotide molecule is homologous to SEQ ID NO:1 (or any other particular polynucleotide sequence) if it hybridizes to the complement of SEQ ID NO:1 under moderately stringent conditions, e.g., hybridization to filter-bound DNA in 0.5 M $NaHPO_4$, 7% sodium dodecyl sulfate (SDS), 1 mM EDTA at 65° C., and washing in 0.2×SSC/0.1% SDS at 42° C. (see Ausubel et al editors, Protocols in Molecular Biology, Wiley and Sons, 1994, pp. 6.0.3 to 6.4.10), or conditions which will otherwise result in hybridization of sequences that encode a SVA virus as defined below. Modifications in hybridization conditions can be empirically determined or precisely calculated based on the length and percentage of guanosine/cytosine (GC) base pairing of the probe. The hybridization conditions can be calculated as described in Sambrook, et al., (Eds.), Molecular Cloning: A Laboratory Manual, Cold Spring Harbor Laboratory Press: Cold Spring Harbor, N.Y. (1989), pp. 9.47 to 9.51.

In another embodiment, a second nucleotide sequence is homologous to SEQ ID NO: 1 (or any other sequence of the invention) if it hybridizes to the complement of SEQ ID NO: 1 under highly stringent conditions, e.g. hybridization to filter-bound DNA in 0.5 M $NaHPO_4$, 7% SDS, 1 mM EDTA at 65° C., and washing in 0.1×SSC/0.1% SDS at 68° C., as is known in the art.

"Mammals" include any warm-blooded vertebrates of the Mammalia class, including humans.

A "pharmaceutically acceptable carrier" means any conventional pharmaceutically acceptable carrier, vehicle, or excipient that is used in the art for production and administration of vaccines. Pharmaceutically acceptable carriers are typically non-toxic, inert, solid or liquid carriers.

The terms "porcine" and "swine" are used interchangeably herein and refer to any animal that is a member of the family Suidae such as, for example, a pig.

A "susceptible" host as used herein refers to a cell or an animal that can be infected by SVA. When introduced to a susceptible animal, an attenuated SVA may also induce an immunological response against the SVA or its antigen, and thereby render the animal immunity against SVA infection.

The term "vaccine" refers to an antigenic preparation used to produce immunity to a disease, to prevent or ameliorate the effects of infection. Vaccines are typically prepared using a combination of an immunologically effective amount of an immunogen together with an adjuvant effective for enhancing the immune response of the vaccinated subject against the immunogen.

Vaccine formulations will contain a "therapeutically effective amount" of the active ingredient, that is, an amount capable of eliciting an induction of an immunoprotective response in a subject to which the composition is administered. In the treatment and prevention of SVA disease, for example, a "therapeutically effective amount" would preferably be an amount that enhances resistance of the vaccinated subject to new infection and/or reduces the clinical severity of the disease. Such protection will be demonstrated by either a reduction or lack of symptoms normally displayed by a subject infected with SVA, a quicker recovery time and/or a lowered count of virus particles. Vaccines can be administered prior to infection, as a preventative measure against SVA. Alternatively, vaccines can be administered after the subject already has contracted a disease. Vaccines given after exposure to SVA may be able to attenuate the disease, triggering a superior immune response than the natural infection itself.

Vaccine Formulations/Immunogenic Compositions

The invention also relates to an immunogenic composition, suitable to be used as a vaccine, which comprises a variant SVA strain according to the invention. The immunogenic compositions according to the invention elicit a specific humoral immune response toward the SVA comprising neutralizing antibodies.

The preferred immunogenic compositions based upon the variant strains disclosed herein can provide live, attenuated viruses which exhibit high immunogenicity while at the same time not producing dangerous pathogenic or lethal effects.

The immunogenic compositions of this invention are not, however, restricted to any particular type or method of preparation. These include, but are not limited to, infectious DNA vaccines (i.e., using plasmids, vectors or other conventional carriers to directly inject DNA into pigs), live vaccines, modified live vaccines, inactivated vaccines, subunit vaccines, attenuated vaccines, genetically engineered vaccines, etc. These vaccines are prepared by standard methods known in the art.

The present invention preferably includes vaccine compositions comprising a live, attenuated variant SVA of the invention and a pharmaceutically acceptable carrier. As used herein, the expression "live, attenuated SVA of the invention" encompasses any live, attenuated SVA strain that includes one or more of the variations described herein. The pharmaceutically acceptable carrier can be, e.g., water, a stabilizer, a preservative, culture medium, or a buffer. Vaccine formulations comprising the attenuated SVA of the invention can be prepared in the form of a suspension or in a lyophilized form or, alternatively, in a frozen form. If frozen, glycerol or other similar agents may be added to enhance stability when frozen. The advantages of live attenuated vaccines, in general, include the presentation of all the relevant immunogenic determinants of an infectious agent in its natural form to the host's immune system, and the need for relatively small amounts of the immunizing agent due to the ability of the agent to multiply in the vaccinated host.

Attenuation of the virus for a live vaccine, so that it is insufficiently pathogenic to substantially harm the vaccinated target animal, may be accomplished by known procedures, including preferably by serial passaging. The following references provide various general methods for attenuation of coronaviruses, and are suitable for attenuation or further attenuation of any of the strains useful in the practice of the present invention: B. Neuman et al., Journal of Virology, vol. 79, No. 15, pp. 9665-9676, 2005; J. Netland et al., Virology, v 399(1), pp. 120-128, 2010; Y-P Huang et al., "Sequence changes of infectious bronchitis virus isolates in the 3' 7.3 kb of the genome after attenuating passage in embryonated eggs, Avian Pathology, v. 36 (1), (Abstract), 2007; and S. Hingley et al., Virology, v. 200(1) 1994, pp. 1-10; see U.S. Pat. No. 3,914,408; and Ortego et al., Virology, vol. 308 (1), pp. 13-22, 2003.

Additional genetically engineered vaccines, which are desirable in the present invention, are produced by techniques known in the art. Such techniques involve, but are not limited to, further manipulation of recombinant DNA, modification of or substitutions to the amino acid sequences of the recombinant proteins and the like.

Genetically engineered vaccines based on recombinant DNA technology are made, for instance, by identifying alternative portions of the viral gene encoding proteins responsible for inducing a stronger immune or protective response in pigs (e.g., proteins derived from VP1, VP2, VP3, or VP4, etc.). Various subtypes or isolates of the viral protein genes can be subjected to the DNA-shuffling method. The resulting heterogeneous chimeric viral proteins can be used broad protecting subunit vaccines. Alternatively, such chimeric viral genes or immuno-dominant fragments can be cloned into standard protein expression vectors, such as the baculovirus vector, and used to infect appropriate host cells (see, for example, O'Reilly et al., "Baculovirus Expression Vectors: A Lab Manual," Freeman & Co., 1992). The host cells are cultured, thus expressing the desired vaccine proteins, which can be purified to the desired extent and formulated into a suitable vaccine product.

If the clones retain any undesirable natural abilities of causing disease, it is also possible to pinpoint the nucleotide sequences in the viral genome responsible for any residual virulence, and genetically engineer the virus avirulent through, for example, site-directed mutagenesis. Site-directed mutagenesis is able to add, delete or change one or more nucleotides (see, for instance, Zoller et al., DNA 3:479-488, 1984). An oligonucleotide is synthesized containing the desired mutation and annealed to a portion of single stranded viral DNA. The hybrid molecule, which results from that procedure, is employed to transform bacteria. Then double-stranded DNA, which is isolated containing the appropriate mutation, is used to produce full-length DNA by ligation to a restriction fragment of the latter that is subsequently transfected into a suitable cell culture. Ligation of the genome into the suitable vector for transfer may be accomplished through any standard technique known to those of ordinary skill in the art. Transfection of the vector into host cells for the production of viral progeny may be done using any of the conventional methods such as calcium-phosphate or DEAE-dextran mediated transfection, electroporation, protoplast fusion and other well-known techniques (e.g., Sambrook et al., "Molecular Cloning: A Laboratory Manual," Cold Spring Harbor Laboratory Press, 1989). The cloned virus then exhibits the desired mutation. Alternatively, two oligonucleotides can be synthesized which contain the appropriate mutation. These may be annealed to form double-stranded DNA that can be inserted in the viral DNA to produce full-length DNA.

An immunologically effective amount of the vaccines of the present invention is administered to a pig in need of protection against viral infection. The immunologically effective amount or the immunogenic amount that inoculates the pig can be easily determined or readily titrated by routine testing. An effective amount is one in which a sufficient immunological response to the vaccine is attained to protect the pig exposed to the SVA virus. Preferably, the pig is protected to an extent in which one to all of the adverse physiological symptoms or effects of the viral disease are significantly reduced, ameliorated or totally prevented.

Vaccines of the present invention can be formulated following accepted convention to include acceptable carriers for animals, such as standard buffers, stabilizers, diluents, preservatives, and/or solubilizers, and can also be formulated to facilitate sustained release. Diluents include water, saline, dextrose, ethanol, glycerol, and the like. Additives for isotonicity include sodium chloride, dextrose, mannitol, sorbitol, and lactose, among others. Stabilizers include albumin, among others. Other suitable vaccine vehicles and additives, including those that are particularly useful in formulating modified live vaccines, are known or will be apparent to those skilled in the art. See, e.g., Remington's Pharmaceutical Science, 18th ed., 1990, Mack Publishing, which is incorporated herein by reference.

Vaccines of the present invention may further comprise one or more additional immunomodulatory components such as, e.g., an adjuvant or cytokine, among others. Non-limiting examples of adjuvants that can be used in the vaccine of the present invention include the RIBI adjuvant system (Ribi Inc., Hamilton, Mont.), alum, mineral gels such as aluminum hydroxide gel, oil-in-water emulsions, water-in-oil emulsions such as, e.g., Freund's complete and incomplete adjuvants, Block copolymer (CytRx, Atlanta Ga.), QS-21 (Cambridge Biotech Inc., Cambridge Mass.), SAF-M (Chiron, Emeryville Calif), AMPHIGEN® adjuvant, saponin, Quil A or other saponin fraction, monophosphoryl lipid A, ionic polysaccharides, and Avridine lipid-amine adjuvant. Non-limiting examples of oil-in-water emulsions useful in the vaccine of the invention include modified SEAM62 and SEAM 1/2 formulations. Modified SEAM62 is an oil-in-water emulsion containing 5% (v/v) squalene (Sigma), 1% (v/v) SPAN® 85 detergent (ICI Surfactants), 0.7% (v/v) TWEEN® 80 detergent (ICI Surfactants), 2.5% (v/v) ethanol, 200 µg/ml Quil A, 100 µg/ml cholesterol, and 0.5% (v/v) lecithin. Modified SEAM 1/2 is an oil-in-water emulsion comprising 5% (v/v) squalene, 1% (v/v) SPAN® 85 detergent, 0.7% (v/v) Tween 80 detergent, 2.5% (v/v) ethanol, 100 µg/ml Quil A, and 50 µg/ml cholesterol. Other immunomodulatory agents that can be included in the vaccine include, e.g., one or more interleukins, interferons, or other known cytokines.

Additional adjuvant systems permit for the combination of both T-helper and B-cell epitopes, resulting in one or more types of covalent T-B epitope linked structures, with may be additionally lipidated, such as those described in WO2006/084319, WO2004/014957, and WO2004/014956.

In a preferred embodiment of the present invention, ORFI SVA protein, or other SVA proteins or fragments thereof, is formulated with 5% AMPHIGEN® as discussed hereinafter.

Adjuvant Components

The vaccine compositions of the invention may or may not include adjuvants. In particular, as based on an orally infective virus, the modified live vaccines of the invention may be used adjuvant free, with a sterile carrier. Adjuvants that may be used for oral administration include those based on CT-like immune modulators (rmLT, CT-B, i.e. recombinant-mutant heat labile toxin of *E. coli*, Cholera toxin-B subunit); or via encapsulation with polymers and alginates, or with mucoadhesives such as chitosan, or via liposomes. A preferred adjuvanted or non adjuvanted vaccine dose at the minimal protective dose through vaccine release may provide between approximately 10 and approximately $10^6$ $\log_{10}$ $TCID_{50}$ of virus per dose, or higher. Adjuvants, if present, may be provided as emulsions, more commonly if non-oral administration is selected, but should not decrease starting titer by more than 0.7 logs (80% reduction.

In one example, adjuvant components are provided from a combination of lecithin in light mineral oil, and also an aluminum hydroxide component. Details concerning the composition and formulation of Amphigen® (as representative lecithin/mineral oil component) are as follows.

A preferred adjuvanted may be provided as a 2 ML dose in a buffered solution further comprising about 5% (v/v) Rehydragel® (aluminum hydroxide gel) and "20% Amphigen"® at about 25% final (v/v). Amphigen® is generally described in U.S. Pat. No. 5,084,269 and provides de-oiled lecithin (preferably soy) dissolved in a light oil, which is then dispersed into an aqueous solution or suspension of the antigen as an oil-in-water emulsion. Amphigen has been improved according to the protocols of U.S. Pat. No. 6,814,971 (see columns 8-9 thereof) to provide a so-called "20% Amphigen" component for use in the final adjuvanted vaccine compositions of the present invention. Thus, a stock mixture of 10% lecithin and 90% carrier oil (DRAKEOL®, Penreco, Karns City, PA) is diluted 1:4 with 0.63% phosphate buffered saline solution, thereby reducing the lecithin and DRAKEOL components to 2% and 18% respectively (i.e. 20% of their original concentrations). Tween 80 and Span 80 surfactants are added to the composition, with representative and preferable final amounts being 5.6% (v/v) Tween 80 and 2.4% (v/v) Span 80, wherein the Span is originally provided in the stock DRAKEOL component, and the Tween is originally provided from the buffered saline component, so that mixture of the saline and DRAKEOL components results in the finally desired surfactant concentrations. Mixture of the DRAKEOL/lecithin and saline solutions can be accomplished using an In-Line Slim Emulsifier apparatus, model 405, Charles Ross and Son, Hauppauge, NY, USA.

The vaccine composition also may include Rehydragel® LV (about 2% aluminum hydroxide content in the stock material), as additional adjuvant component (available from Reheis, NJ, USA, and ChemTrade Logistics, USA). With further dilution using 0.63% PBS, the final vaccine composition contains the following compositional amounts per 2 ML dose; 5% (v/v) Rehydragel® LV; 25% (v/v) of "20% Amphigen", i.e. it is further 4-fold diluted); and 0.01% (w/v) of merthiolate.

As is understood in the art, the order of addition of components can be varied to provide the equivalent final vaccine composition. For example, an appropriate dilution of virus in buffer can be prepared. An appropriate amount of Rehydragel® LV (about 2% aluminum hydroxide content) stock solution can then be added, with blending, in order to permit the desired 5% (v/v) concentration of Rehydragel® LV in the actual final product. Once prepared, this intermediate stock material is combined with an appropriate amount of "20% Amphigen" stock (as generally described above, and already containing necessary amounts of Tween 80 and Span 80) to again achieve a final product having 25% (v/v) of "20% Amphigen". An appropriate amount of 10% merthiolate can finally be added.

The vaccinate compositions of the invention permit variation in all of the ingredients, such that the total dose of antigen may be varied preferably by a factor of 100 (up or down) compared to the antigen dose stated above, and most preferably by a factor of 10 or less (up or down). Similarly, surfactant concentrations (whether Tween or Span) may be varied by up to a factor of 10, independently of each other, or they may be deleted entirely, with replacement by appropriate concentrations of similar materials, as is well understood in the art.

Rehydragel® concentrations in the final product may be varied, first by the use of equivalent materials available from many other manufacturers (i.e. Alhydrogel®, Brenntag; Denmark), or by use of additional variations in the Rehydragel® line of products such as CG, HPA or HS. Using LV as an example, final useful concentrations thereof including from 0% to 20%, with 2-12% being more preferred, and 4-8% being most preferred, Similarly, the although the final concentration of Amphigen (expressed as % of "20% Amphigen") is preferably 25%, this amount may vary from 5-50%, preferably 20-30% and is most preferably about 24-26%.

According to the practice of the invention, the oil used in the adjuvant formulations of the instant invention is prefer- ably a mineral oil. As used herein, the term "mineral oil" refers to a mixture of liquid hydrocarbons obtained from petrolatum via a distillation technique. The term is synonymous with "liquefied paraffin", "liquid petrolatum" and "white mineral oil." The term is also intended to include "light mineral oil," i.e., oil which is similarly obtained by distillation of petrolatum, but which has a slightly lower specific gravity than white mineral oil. See, e.g., Remington's Pharmaceutical Sciences, 18th Edition (Easton, Pa.: Mack Publishing Company, 1990, at pages 788 and 1323). Mineral oil can be obtained from various commercial sources, for example, J. T. Baker (Phillipsburg, Pa.), USB Corporation (Cleveland, Ohio). Preferred mineral oil is light mineral oil commercially available under the name DRAKEOL®.

Typically, the oily phase is present in an amount from 50% to 95% by volume; preferably, in an amount of greater than 50% to 85%; more preferably, in an amount from greater than 50% to 60%, and more preferably in the amount of greater than 50-52% v/v of the vaccine composition. The oily phase includes oil and emulsifiers (e.g., SPAN® 80, TWEEN® 80 etc), if any such emulsifiers are present.

Non-natural, synthetic emulsifiers suitable for use in the adjuvant formulations of the present invention also include sorbitan-based non-ionic surfactants, e.g. fatty-acid-substituted sorbitan surfactants (commercially available under the name SPAN® or ARLACEL®), fatty acid esters of polyethoxylated sorbitol (TWEEN®), polyethylene glycol esters of fatty acids from sources such as castor oil (EMULFOR®); polyethoxylated fatty acid (e.g., stearic acid available under the name SIMULSOL® M-53), polyethoxylated isooctylphenol/formaldehyde polymer (TYLOXAPOL®), polyoxyethylene fatty alcohol ethers (BRIJ®); polyoxyethylene nonphenyl ethers (TRITON® N), polyoxyethylene isooctylphenyl ethers (TRITON® X). Preferred synthetic surfactants are the surfactants available under the name SPAN® and TWEEN®, such as TWEEN®-80 (Polyoxyethylene (20) sorbitan monooleate) and SPAN®-80 (sorbitan monooleate). Generally speaking, the emulsifier(s) may be present in the vaccine composition in an amount of 0.010% to 40% by volume, preferably, 0.1% to 15%, more preferably 2% to 10%.

In an alternative embodiment of the invention, the final vaccine composition contains SP-Oil® and Rehydragel® LV as adjuvants (or other Rehydragel® or Alhydrogel® products), with preferable amounts being about 5-20% SP-Oil (v/v) and about 5-15% Rehydragel LV (v/v), and with 5% and 12%, respectively, being most preferred amounts. In this regard it is understood that % Rehydragel refers to percent dilution from the stock commercial product. (SP-Oil® is a fluidized oil emulsion with includes a polyoxyethylene-polyoxypropylene block copolymer (Pluronic® L121, BASF Corporation, squalene, polyoxyethylene sorbitan monooleate (Tween®80, ICI Americas) and a buffered salt solution.)

It should be noted that the present invention may also be successfully practiced using wherein the adjuvant component is only Amphigen®.

In another embodiment of the invention, the final vaccine composition contains TXO as an adjuvant; TXO is generally described in WO 2015/042369. All TXO compositions disclosed therein are useful in the preparation of vaccines of the invention. In TXO, the immunostimulatory oligonucleotide ("T"), preferably an ODN, preferably containing a palindromic sequence, and optionally with a modified backbone, is present in the amount of 0.1 to 5 ug per 50 ul of the vaccine composition (e.g., 0.5-3 ug per 50 ul of the composition, or more preferably 0.09-0.11 ug per 50 ul of the composition). A preferred species thereof is SEQ ID NO: 8 as listed (page 17) in the WO2015/042369 publication (PCT/US2014/056512). The polycationic carrier ("X") is present in the amount of 1-20 ug per 50 ul (e.g., 3-10 ug per 50 ul, or about 5 ug per 50 ul). Light mineral oil ("O") is also a component of the TXO adjuvant.

In certain embodiments, TXO adjuvants are prepared as follows:
a) Sorbitan monooleate, MPL-A and cholesterol are dissolved in light mineral oil. The resulting oil solution is sterile filtered;
b) The immunostimulatory oligonucleotide, Dextran DEAE and Polyoxyethylene (20) sorbitan monooleate are dissolved in aqueous phase, thus forming the aqueous solution; and
c) The aqueous solution is added to the oil solution under continuous homogenization thus forming the adjuvant formulation TXO.

All the adjuvant compositions of the invention can be used with any of the SVA strains and isolates covered by the present Specification.

Additional adjuvants useful in the practice of the invention include Prezent-A (see generally United States published patent application US20070298053; and "QCDCRT" or "QCDC"-type adjuvants (see generally United States published patent application US20090324641.

Excipients

The immunogenic and vaccine compositions of the invention can further comprise pharmaceutically acceptable carriers, excipients and/or stabilizers (see e.g. Remington: The Science and practice of Pharmacy, 2005, Lippincott Williams), in the form of lyophilized formulations or aqueous solutions. Acceptable carriers, excipients, or stabilizers are nontoxic to recipients at the dosages and concentrations, and may comprise buffers such as phosphate, citrate, and other organic acids; antioxidants including ascorbic acid and methionine; preservatives (such as Mercury((o-carboxyphenyl)thio)ethyl sodium salt (THIOMERSAL), octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrans; chelating agents such as EDTA; sugars such as sucrose, mannitol, trehalose or sorbitol; salt-forming counter-ions such as sodium; metal complexes (e.g. Zn-protein complexes); and/or non-ionic surfactants such as polyethylene glycol (PEG), TWEEN or PLURONICS.

Vaccines of the present invention can optionally be formulated for sustained release of the virus, infectious DNA molecule, plasmid, or viral vector of the present invention. Examples of such sustained release formulations include virus, infectious DNA molecule, plasmid, or viral vector in combination with composites of biocompatible polymers, such as, e.g., poly (lactic acid), poly (lactic-co-glycolic acid), methylcellulose, hyaluronic acid, collagen and the like. The structure, selection and use of degradable polymers in drug delivery vehicles have been reviewed in several publications, including A. Domb et al., 1992, Polymers for Advanced Technologies 3: 279-292, which is incorporated herein by reference. Additional guidance in selecting and using polymers in pharmaceutical formulations can be found in texts known in the art, for example M. Chasin and R. Langer (eds), 1990, "Biodegradable Polymers as Drug Delivery Systems" in: Drugs and the Pharmaceutical Sciences, Vol. 45, M. Dekker, NY, which is also incorporated herein by reference. Alternatively, or additionally, the virus, plasmid, or viral vector can be microencapsulated to improve administration and efficacy. Methods for microencapsulating antigens are well-known in the art, and include techniques described, e.g., in U.S. Pat. Nos. 3,137,631; 3,959,457; 4,205,060; 4,606,940; 4,744,933; 5,132,117; and International Patent Publication WO 95/28227, all of which are incorporated herein by reference.

Liposomes can also be used to provide for the sustained release of virus, plasmid, viral protein, or viral vector. Details concerning how to make and use liposomal formulations can be found in, among other places, U.S. Pat. Nos. 4,016,100; 4,452,747; 4,921,706; 4,927,637; 4,944,948; 5,008,050; and 5,009,956, all of which are incorporated herein by reference.

An effective amount of any of the above-described vaccines can be determined by conventional means, starting with a low dose of virus, viral protein plasmid or viral vector, and then increasing the dosage while monitoring the effects. An effective amount may be obtained after a single administration of a vaccine or after multiple administrations of a vaccine. Known factors can be taken into consideration when determining an optimal dose per animal. These include the species, size, age and general condition of the animal, the presence of other drugs in the animal, and the like. The actual dosage is preferably chosen after consideration of the results from other animal studies.

One method of detecting whether an adequate immune response has been achieved is to determine seroconversion and antibody titer in the animal after vaccination. The timing of vaccination and the number of boosters, if any, will preferably be determined by a doctor or veterinarian based on analysis of all relevant factors, some of which are described above.

The effective dose amount of virus, protein, infectious nucleotide molecule, plasmid, or viral vector, of the present invention can be determined using known techniques, taking into account factors that can be determined by one of ordinary skill in the art such as the weight of the animal to be vaccinated. The dose amount of virus of the present invention in a vaccine of the present invention preferably ranges from about $10^1$ to about $10^9$ pfu (plaque forming units), more preferably from about $10^2$ to about $10^8$ pfu, and most preferably from about $10^3$ to about $10^7$ pfu. The dose amount of a plasmid of the present invention in a vaccine of the present invention preferably ranges from about 0.1 µg to about 100 mg, more preferably from about 1 µg to about 10 mg, even more preferably from about 10 µg to about 1 mg. The dose amount of an infectious DNA molecule of the present invention in a vaccine of the present invention preferably ranges from about 0.1 µg to about 100 mg, more preferably from about 1 µg to about 10 mg, even more preferably from about 10 µg to about 1 mg. The dose amount of a viral vector of the present invention in a vaccine of the present invention preferably ranges from about $10^1$ pfu to about $10^9$ pfu, more preferably from about $10^2$ pfu to about $10^8$ pfu, and even more preferably from about $10^3$ to about $10^7$ pfu. A suitable dosage size ranges from about 0.5 ml to about 10 ml, and more preferably from about 1 ml to about 5 ml.

Suitable doses for viral protein or peptide vaccines according to the practice of the present invention range generally from 1 to 50 micrograms per dose, or higher amounts as may be determined by standard methods, with the amount of adjuvant to be determined by recognized methods in regard of each such substance. In a preferred example of the invention relating to vaccination of swine, an optimum age target for the animals is between about 1 and 21 days, which at pre-weening, may also correspond with other scheduled vaccinations such as against *Mycoplasma hyopneumoniae*. Additionally, a preferred schedule of vaccination for breeding sows would include similar doses, with an annual revaccination schedule.

Dosing

A preferred clinical indication is for treatment, control and prevention in both breeding sows and gilts pre-farrowing, followed by vaccination of piglets. In a representative example (applicable to both sows and gilts), two 2-ML doses of vaccine will be used, although of course, actual volume of the dose is a function of how the vaccine is formulated, with actual dosing amounts ranging from 0.1 to 5 ML, taking also into account the size of the animals. Single dose vaccination is also appropriate.

The first dose may be administered as early as pre-breeding to 5-weeks pre-farrowing, with the second dose administered preferably at about 1-3 weeks pre-farrowing. Doses vaccine preferably provide an amount of viral material that corresponds to a $TCID_{50}$ (tissue culture infective dose) of between about $10^6$ and $10^8$, more preferably between about $10^7$ and $10^{7.5}$, and can be further varied, as is recognized in the art. Booster doses can be given two to four weeks prior to any subsequent farrowings. Intramuscular vaccination (all doses) is preferred, although one or more of the doses could be given subcutaneously. Oral administration is also preferred. Vaccination may also be effective in naïve animals, and non-naïve animals as accomplished by planned or natural infections.

In a further preferred example, the sow or gilt is vaccinated intramuscularly or orally at 5-weeks pre-farrowing and then 2-weeks pre-farrowing. Under these conditions, a protective immune response can be demonstrated in SVA-negative vaccinated sows in that they developed antibodies (measured via fluorescent focal neutralization titer from serum samples) with neutralizing activity, and these antibodies were passively transferred to their piglets. The protocols of the invention are also applicable to the treatment of already seropositive sows and gilts, and also piglets and boars. Booster vaccinations can also be given, and these may be via a different route of administration. Although it is preferred to re-vaccinate a mother sow prior to any subsequent farrowings, the vaccine compositions of the invention nonetheless can still provide protection to piglets via ongoing passive transfer of antibodies, even if the mother sow was only vaccinated in association with a previous farrowing.

It should be noted that piglets may then be vaccinated as early as Day 1 of life. For example, piglets can be vaccinated at Day 1, with or without a booster dose at 3 weeks of age, particularly if the parent sow, although vaccinated pre-breeding, was not vaccinated pre-farrowing. Piglet vaccination may also be effective if the parent sow was previously not naïve either due to natural or planned infection. Vaccination of piglets when the mother has neither been previously exposed to the virus, nor vaccinated pre-farrowing may also effective. Boars (typically kept for breeding purposes) should be vaccinated once every 6 months. Variation of the dose amounts is well within the practice of the art. It should be noted that the vaccines of the present invention are safe for use in pregnant animals (all trimesters) and neonatal swine. The vaccines of the invention are attenuated to a level of safety (i.e. no mortality, only transient mild clinical signs or signs normal to neonatal swine) that is acceptable for even the most sensitive animals again including neonatal pigs. Of course, from a standpoint of protecting swine herds both from SVA epidemics and persistent low level SVA occurrence, programs of sustained sow vaccination are of great importance. It will be appreciated that sows or gilts immunized with SVA MLV will passively transfer immunity to piglets, including SVA-specific IgA, which will protect piglets from SVA associated disease and mortality. Additionally, generally, pigs that are immunized with SVA MLV will have a decrease in amount and/or duration or be protected from shedding SVA in their feces, and further, pigs that are immunized with SVA MLV will be protected from weight loss and failure to gain weight due to SVA, and further, SVA MLV will aid in stopping or controlling the SVA transmission cycle.

It should also be noted that animals vaccinated with the vaccines of the invention are also immediately safe for human consumption, without any significant slaughter withhold, such as 21 days or less.

When provided therapeutically, the vaccine is provided in an effective amount upon the detection of a sign of actual infection. Suitable dose amounts for treatment of an existing infection include between about 10 and about $10^6$ $\log_{10}$ $TCID_{50}$, or higher, of virus per dose (minimum immunizing dose to vaccine release). A composition is said to be "pharmacologically acceptable" if its administration can be tolerated by a recipient. Such a composition is said to be administered in a "therapeutically or prophylactically effective amount" if the amount administered is physiologically significant.

At least one vaccine or immunogenic composition of the present invention can be administered by any means that achieve the intended purpose, using a pharmaceutical composition as described herein. For example, route of administration of such a composition can be by parenteral, oral, oronasal, intranasal, intratracheal, topical, subcutaneous, intramuscular, transcutaneous, intradermal, intraperitoneal, intraocular, and intravenous administration. In one embodiment of the present invention, the composition is administered by intramuscularly. Parenteral administration can be by bolus injection or by gradual perfusion over time. Any suitable device may be used to administer the compositions, including syringes, droppers, needleless injection devices, patches, and the like. The route and device selected for use will depend on the composition of the adjuvant, the antigen, and the subject, and such are well known to the skilled artisan. Administration that is oral, or alternatively, subcutaneous, is preferred. Oral administration may be direct, via water, or via feed (solid or liquid feed). When provided in liquid form, the vaccine may be lyophilized with reconstitution, provided as a paste, for direct addition to feed (mix in or top dress) or otherwise added to water or liquid feed.

Generation of Vero Cells Suitable for Large Scale Virus Production

Viruses of the invention can be conveniently grown in Vero cell stocks that are approved for vaccine production. To generate safe and approved cell stock, a vial of Vero cells was subject to additional passaging. The cells were passed four times in PMEM w/wheat to produce Master Cell Stock (MCS) Lot "1834430". The MCS was tested in accordance with 9CFR & EP requirements in PGM-Biological Quality Control; Lincoln, NE. The MCS tested satisfactory for sterility, freedom from mycoplasmas, and extraneous agents. Therefore, PF-Vero MCS lot "1834430", is deemed eligible for submission to the Center for Veterinary Biologics Laboratories (CVB-L) for confirmatory testing.

Seed Origin and Passage History is as follows. A Pre-master Cell stock of global Vero cells was previously frozen. For production of the cell stock, the cells were grown in PMEM (Lincoln item #00-0779-00) containing 1% bovine serum (item #00-0710-00, BSE compliant) and 3 mM L-glutamine. They were derived from Vero WCS Pass #136, Lot #071700 MCS+3, 28 Jul. 2000. The new Pre-master cell stock was frozen at pass #166, which is MCS+33 from the original global Vero master cell stock. MCS "1833440" was produced from a pre-Master identified as Vero KZO pre-Master, Lot All cultures were grown in PMEM w/wheat, 1.0% L-glutamine and 1.0% Bovine Calf serum. Cells were planted (passage #167) in 150 cm2 T-Flasks on Aug. 14, 2008. The flasks were incubated in 5.0% CO2 at 36 1 C for 7 days then expanded. (passage #168) After flasks reached 100% confluency 4 days later, the cultures were passed (#169) into 850 cm2 roller bottles. Rollers were incubated at 36 1 C at 0.125-0.250 rpm without CO2. The final passage of rollers (#170) was done 4 days later. Cryopreservation was completed by adding 10.0% bovine calf serum and 10.0% dimethyl sulfoxide (DMSO) to the condensed cell suspension on 2 Sep. 2008. Vials were labeled as passage level #170. A total of 231 containers containing 4.2 ml were placed into a controlled rate freezer then transferred into liquid nitrogen tank for long term storage at vapor phase. The MCS was produced without the use of antibiotics. All reagents used in MCS production were sourced from Pfizer Global Manufacturing used for licensed antigen production in domestic and global markets. The MCS was produced by Pfizer's Master Seed Facility, Lincoln, Nebraska.

Sterility Testing was as follows. The Master Cell Stock was tested as per 9CFR (026-ST0) and EP 2.6.1 from 29 Sep. 2008 to 13 Oct. 2008. The MCS was found to be free of bacterial and fungal contamination.

*Mycoplasma* Testing and Extraneous Testing were accomplished as follows. The MCS was tested as per 9CFR (028-PU0) and EP 2.6.7. The MCS was found to be free of any *Mycoplasma* contamination. Extraneous testing was completed as per 9CFR 113.52 using NL-BT-2 (Bovine), Vero, NL-ED-5 (Equine), NL-ST-1 (Porcine), NL-DK (Canine), NL-FK (Feline) cells, The MCS was negative for MGG, CPE and HAd and tested negative by FA for BVD, BRSV, BPV, BAV-1, BAV-5, Rabies, Reo, BTV, ERV, Equine arteritis, PPV, TGE, PAV, HEV, CD, CPV, FPL and FIP. The MCS was tested by ELISA for FIV and was found to be satisfactory.

EP extraneous testing was as per 5.2.4 (52-2002). Extraneous testing using Bovine NL-BT-2 and EBK (Primary), Vero, NL-ED-5 (Equine), NL-ST-1 (Porcine), MARC MA 104, NL-DK (Canine) NL-FK (Feline) cells were negative for MGG, CPE, HAd and tested negative by FA for BVD, BPV, BAV-1, BAV-5, Bovine corona, Bovine rotavirus, BHV-3, PI3, IBR, BRSV and BEV-1, Reo, BTV, ERV, Equine arteritis, PPV, PRV, TGE, HEV, PAV, P. rota A1, rota A2, PRRSV, CD, CPI, CAV-2, Measles, C. rota, Rabies, CCV, FP, FCV, FVR, FIP and FeLV.

Polynucleotides of the Invention

Representative embodiments of the invention include an isolated polynucleotide sequence that comprises a polynucleotide of the invention and having a base other than Cat position 33, 36, and/or 37 of the 5' UTR or the equivalent; and/or base 947 of the VP4 coding region or the equivalent position with reference to SEQ ID NO:1 or a fragment thereof; (b) the complement of any sequence in (a); (c) a polynucleotide that hybridizes with a sequence of (a) or (b) under stringent conditions defined as hybridizing to filter bound DNA in 0.5M NaHPO$_4$, 7% SDS, 1 mM EDTA at 65° C., and washing in 0.1×SSC/0.1% SDS at 68° C.; (d) a polynucleotide that is at least 70% identical to the polynucleotide of (a) or (b); (e) a polynucleotide that is at least 80% identical to the polynucleotide of (a) or (b); (f) a polynucleotide that is at least 90% identical to the polynucleotide of (a) or (b); and (g) a polynucleotide that is at least 95% identical to the polynucleotide of (a) or (b). In a preferred embodiment the polynucleotide includes a second heterologous polynucleotide sequence.

The invention also provides any polypeptide changes which may be associated with these changes as well as conservative substitutions.

Further Genetic Manipulations

The polynucleotide and amino acid sequence information provided by the present invention also makes possible the systematic analysis of the structure and function of the viral genes and their encoded gene products. Knowledge of a polynucleotide encoding a viral gene product of the invention also makes available anti-sense polynucleotides which recognize and hybridize to polynucleotides encoding a polypeptide of the invention, or a fragment thereof. Full length and fragment anti-sense polynucleotides are useful in this respect. The worker of ordinary skill will appreciate that fragment anti-sense molecules of the invention include (i) those which specifically recognize and hybridize to a specific RNA (as determined by sequence comparison of DNA encoding a viral polypeptide of the invention as well as (ii) those which recognize and hybridize to RNA encoding variants of the encoded proteins. Antisense polynucleotides that hybridize to RNA/DNA encoding other SVA peptides are also identifiable through sequence comparison to identify characteristic, or signature sequences for the family of molecules, further of use in the study of antigenic domains in SVA polypeptides, and may also be used to distinguish between infection of a host animal with remotely related non-SVA members of the Circoviridae.

Guidance for effective codon optimization for enhanced expression in yeast and *E. coli* for the constructs of the invention is generally known to those of skill in the art.

Antibodies

Also contemplated by the present invention are anti-SVA antibodies (e.g., monoclonal and polyclonal antibodies, single chain antibodies, chimeric antibodies, humanized, human, porcine, and CDR-grafted antibodies, including compounds which include CDR sequences which specifically recognize an SVA polypeptide of the invention. The term "specific for" indicates that the variable regions of the antibodies of the invention recognize and bind a SVA polypeptide exclusively (i.e., are able to distinguish a single SVA polypeptide from related polypeptides despite sequence identity, homology, or similarity found in the family of polypeptides), and which are permitted (optionally) to interact with other proteins (for example, *S. aureus* protein A or other antibodies in ELISA techniques) through interactions with sequences outside the variable region of the antibodies, and in particular, in the constant region of the Ab molecule. Screening assays to determine binding specificity of an antibody of the invention are well known and routinely practiced in the art. For a comprehensive discussion of such assays, see Harlow et al. (Eds), Antibodies A Laboratory Manual; Cold Spring Harbor Laboratory; Cold Spring Harbor, N.Y. (1988), Chapter 6. Antibodies that recognize and bind fragments of the SVA polypeptides of the invention are also contemplated, provided that the antibodies are first and foremost specific for, as defined above, an SVA polypeptide of the invention from which the fragment was derived.

For the purposes of clarity, "antibody" refers to an immunoglobulin molecule that can bind to a specific antigen as the result of an immune response to that antigen. Immunoglobulins are serum proteins composed of "light" and "heavy" polypeptide chains having "constant" and "variable" regions and are divided into classes (e.g., IgA, IgD, IgE, IgG, and IgM) based on the composition of the constant regions. Antibodies can exist in a variety of forms including, for example, as, Fv, Fab', F(ab')$_2$, as well as in single chains, and include synthetic polypeptides that contain all or part of one or more antibody single chain polypeptide sequences.

Diagnostic Kits

The present invention also provides diagnostic kits. The kit can be valuable for differentiating between porcine animals naturally infected with a field strain of an SVA virus and porcine animals vaccinated with any of the SVA vaccines described herein. The kits can also be of value because animals potentially infected with field strains of SVA virus can be detected prior to the existence of clinical symptoms and removed from the herd or kept in isolation away from naive or vaccinated animals. The kits include reagents for analyzing a sample from a porcine animal for the presence of antibodies to a particular component of a specified SVA virus. Diagnostic kits of the present invention can include as a component a peptide or peptides from the variant SVA strain of the invention which is present in a field strain but not in a vaccine of interest, or vice versa, and selection of such suitable peptide domains is made possible by the extensive amino acid sequencing. As is known in the art, kits of the present invention can alternatively include as a component a peptide which is provided via a fusion protein. The term "fusion peptide" or "fusion protein" for purposes of the present invention means a single polypeptide chain consisting of at least a portion of an SVA virus protein.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

Example 1

Generation and in vitro characterization of recombinant SVA. To study the molecular mechanisms underlying SVA virulence and pathogenesis, we have recently developed a cDNA clone for SVA strain SD15-26. The rSVA was rescued by transfection of in vitro transcribed viral RNA into BHK-21 cells (data not shown), followed by amplification in the highly permissive H1299 cells (data not shown). A unique nt substitution (c→t) was introduced at the 5'UTR of the virus genome (position 33), to differentiate the recombinant from the parental virus.

Figure 1E:
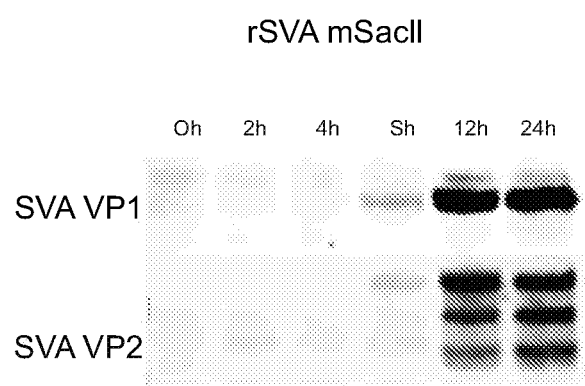

A second SVA cDNA clone was generated in our laboratory. To facilitate the differentiation of the rSVA virus from the parental wtSVA strain, in this clone, we introduced 3 additional nucleotide changes in the rSVA genome. Two of those changes are located in the 5'UTR (c→t, positions 36 and 37) and the third change consists of a silent nt change (c→a) at position 947 (VP4 coding region) of the rSVA genome (added to remove a SacII restriction endonuclease site) (FIG. 1). A synthetic DNA fragment containing those changes was cloned into the backbone of the rSVA plasmid (virus described above; pBrick-FLSVA-SD15-26) using unique restriction endonucleases (NheI and SfiI). The resultant recombinant SacII mutant virus (rSVASacIIm) was rescued by transfection of in vitro transcribed viral RNA into BHK-21 cells, followed by amplification in the highly permissive H1299 cells. The identity of the rSVA was confirmed by sequencing and restriction digestion with SacII (FIG. 1) and the replication properties of the rSVASacIIm were compared to the wtSVA virus in vitro. Notably, multi-step growth curves revealed an impaired replication of rSVASacIIm when compared to wtSVA, as evidenced by significantly lower viral yields in rSVASacIIm-inoculated cells (~1 log after 8 h post-inoculation) (FIGS. 1A and B).

Figures 2C, 2D:
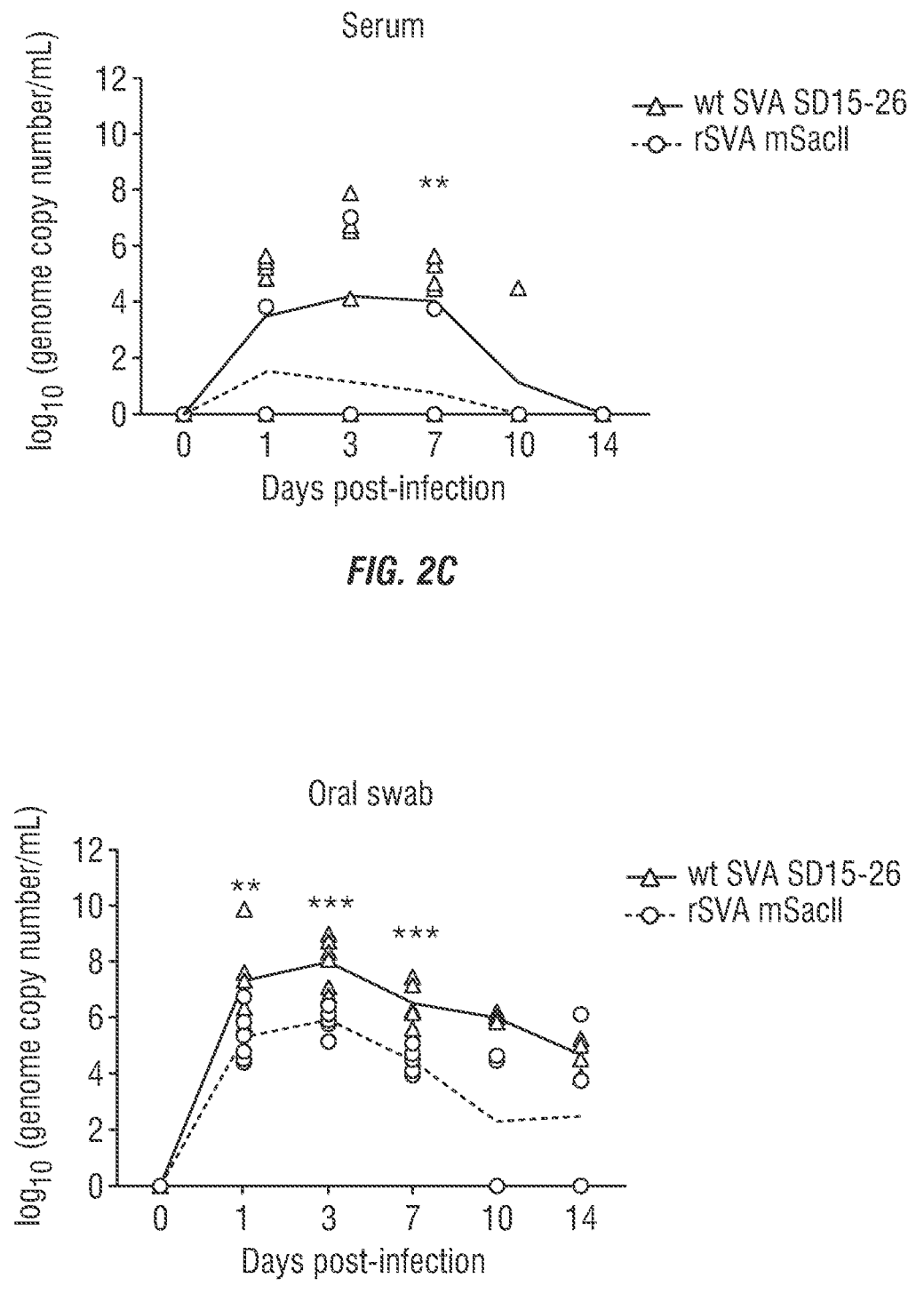
Figure 2E:
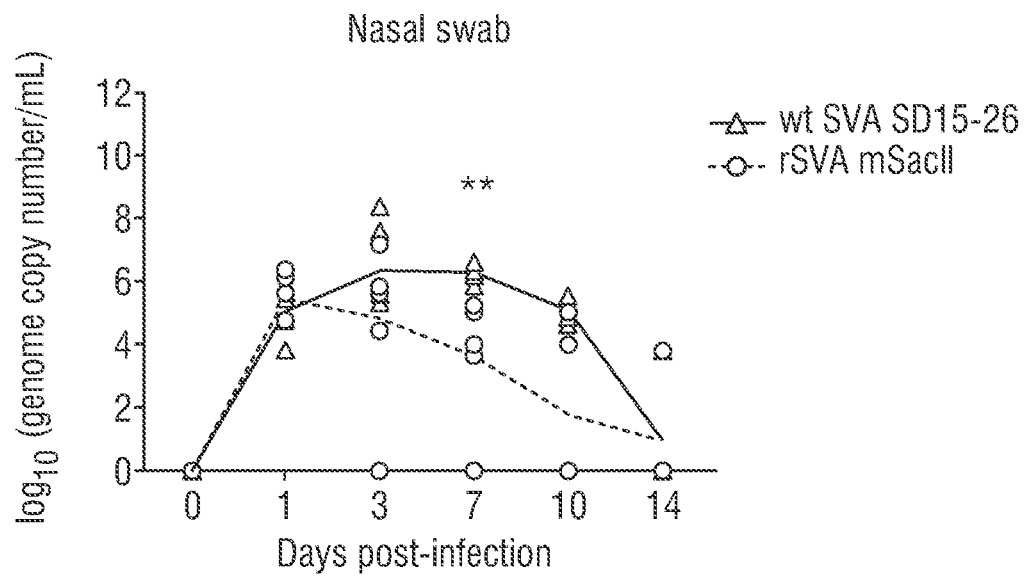
FIGS. 2 (A)-(F) show attenuation of rSVA mSacII in swine. (A) Presence of lesion on snout and feet when infected with wt SVA SD15-26 but not when infected with rSVA mSacII. (B) Total clinical score in pig's post-infection. (C) Viremia and virus shedding in (D) oral secretion (E) nasal secretion and (F) rectal swab.
Figure 2F:
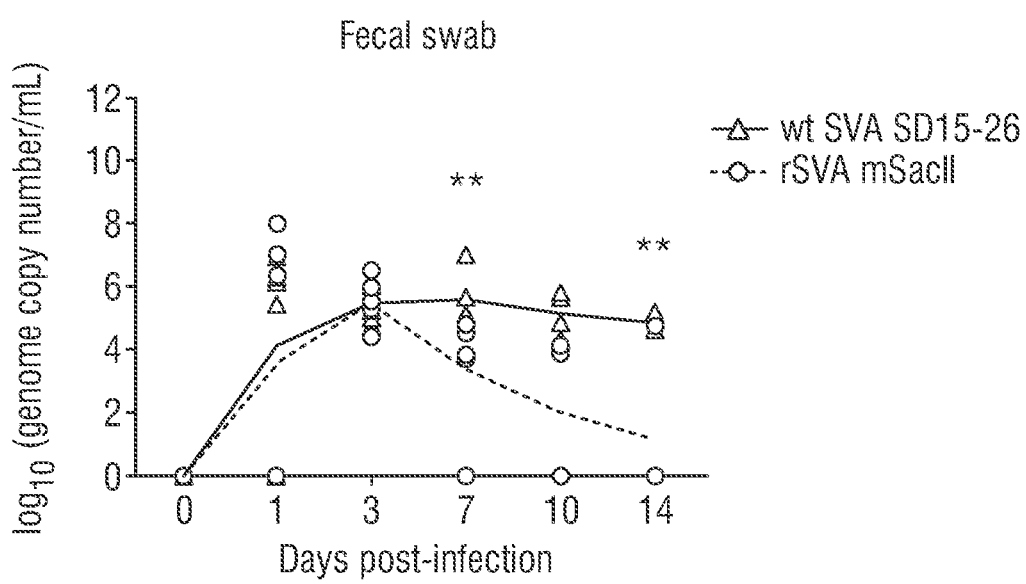

The pathogenicity of the rSVASacIIm was compared to that of the parental wtSVA strain in pigs. For this, twelve SVA-negative 15-week old finishing pigs (~60 kg) were randomly allocated into two groups (G1: wtSVA, n=6; and G2: rSVASacIIm, n=6), inoculated oronasally ($5 \times 10^8$ TCID$_{50}$ in 10 ml; ½ orally and ½ intranasal), and monitored for clinical signs and vesicular lesions for 14 days. Notably, while all pigs inoculated with the wtSVA presented characteristic clinical signs (lethargy, lameness) and lesions (vesicles on the snout and/or foot), none of the rSVASacIIm-inoculated developed overt clinical disease (FIG. 2A, B).

The levels of viremia, virus shedding and viral load in tissues were also evaluated. Levels of viremia and virus shedding were significantly lower in rSVASacIIm-inoculated animals than in wtSVA-inoculated animals (data not shown). Additionally, viral load in tissues was markedly reduced in rSVASacIIm inoculated animals when compared to wtSVA-inoculated animals (FIG. 2C-F; FIG. 3). Notably, NA responses were similar in rSVASacIIm and wtSVA-inoculated animals, indicating successful infection of all inoculated pigs (FIG. 3B). Together these results indicate that, while attenuated the rSVASacIIm is highly immunogenic in pigs, thus, representing a promising platform for recombinant live attenuated or inactivated SVA vaccine development.

rSVA mSaII is Attenuated in Swine.

rSVA mSacII Retains its Immunogenicity in Swine.

Clinical Outcome, Viremia and Virus Shedding Post-Immunization with rSVA mSacII.

Figure 4:
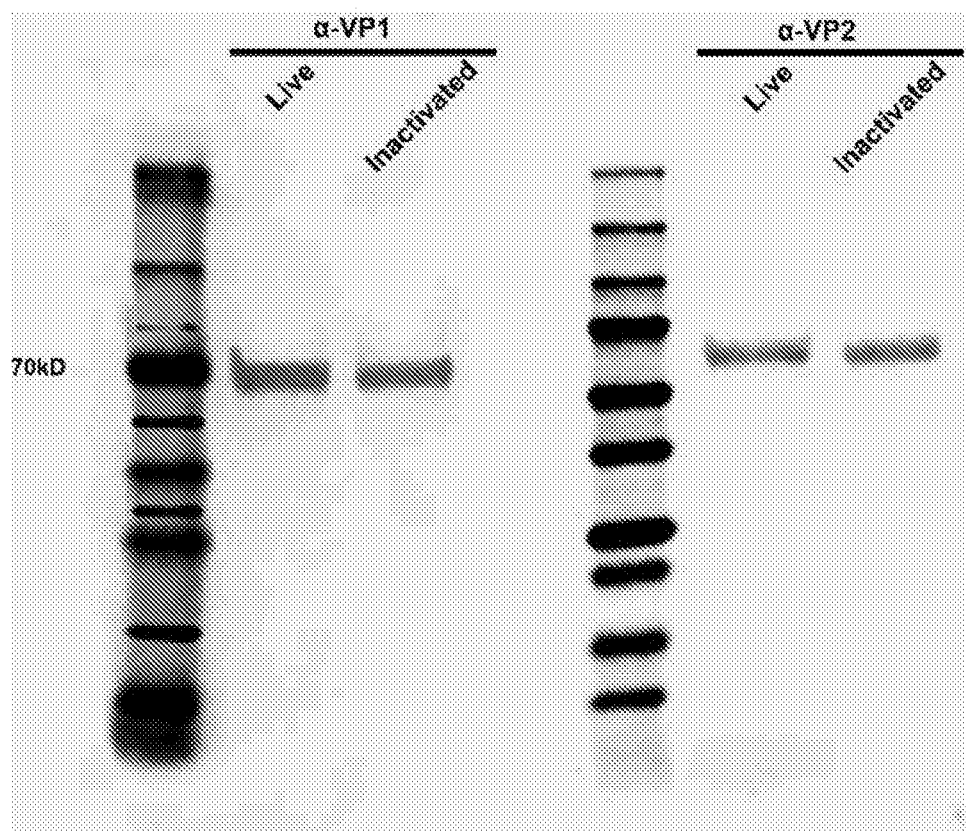
FIG. 4 shows Virus protein level in live and inactivated vaccine. Western blot of both live and inactivated vaccine was done, protein in both vaccines compared.

The immunogenicity of live recombinant/attenuated vaccine by two routes and BEI inactivated vaccine were compared in pigs. To ascertain the similar protein content of Live and BEI inactivated vaccine, western blot was done and similar level of VP1 and VP2 proteins were observed (FIG. 4).

Figure 5A:
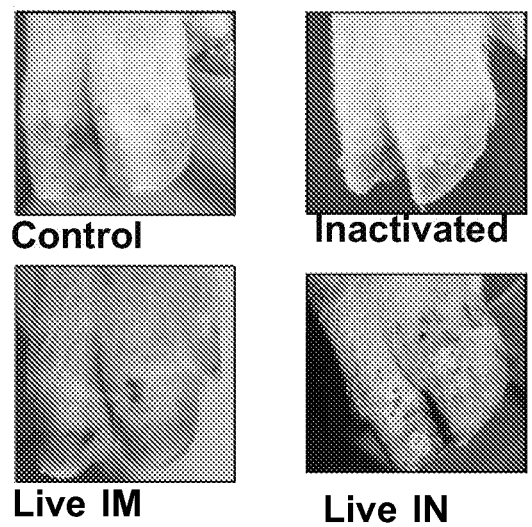
FIGS. 5 (A)-(F) demonstrate clinical outcome, viremia and shedding in pigs after immunization. Animals were immunized with vaccine or RPMI-1640 (control). (A) Clinical outcome. (B) Total clinical score. (C) Viremia. Virus shedding in (D) oral secretion (E) Nasal secretion and (F) Rectal swab. *a, b, c, d, e, f indicates significant difference between groups Control vs. Inactivated, Control vs. Live IM, Control vs. Live IN, Inactivated vs. Live IM, Inactivated vs. Live IN and Live IM vs. Live IN respectively at $p<0.05$ (Tukey's multiple comparison).
Figure 5B:
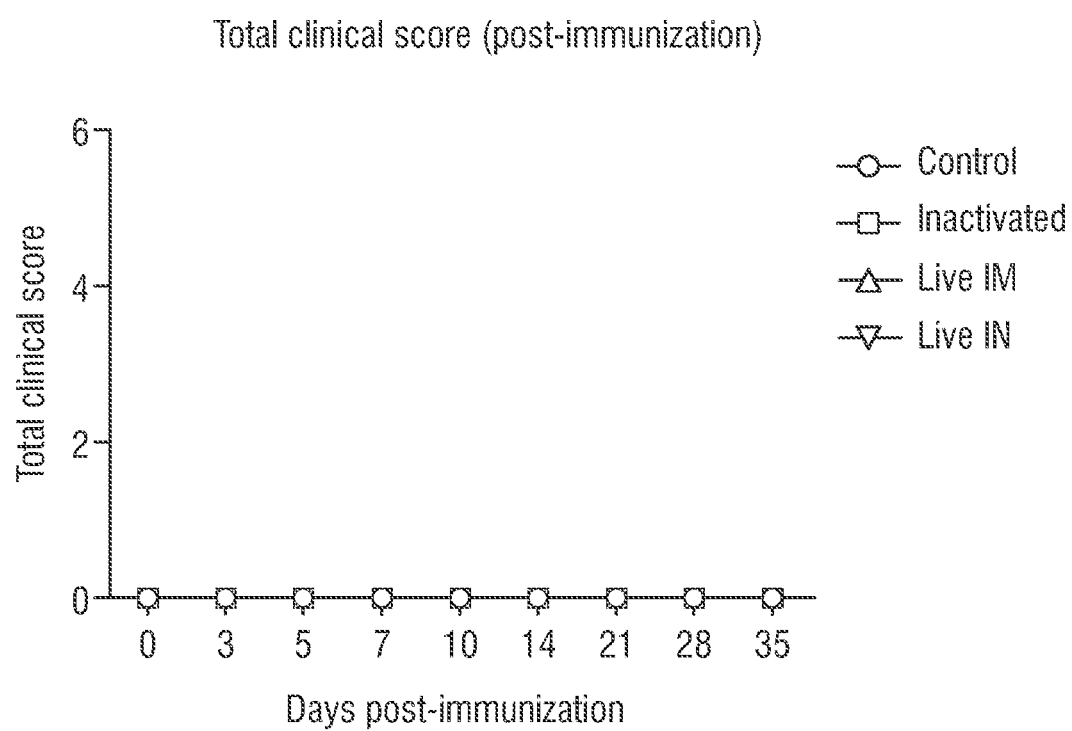
Figure 5C:
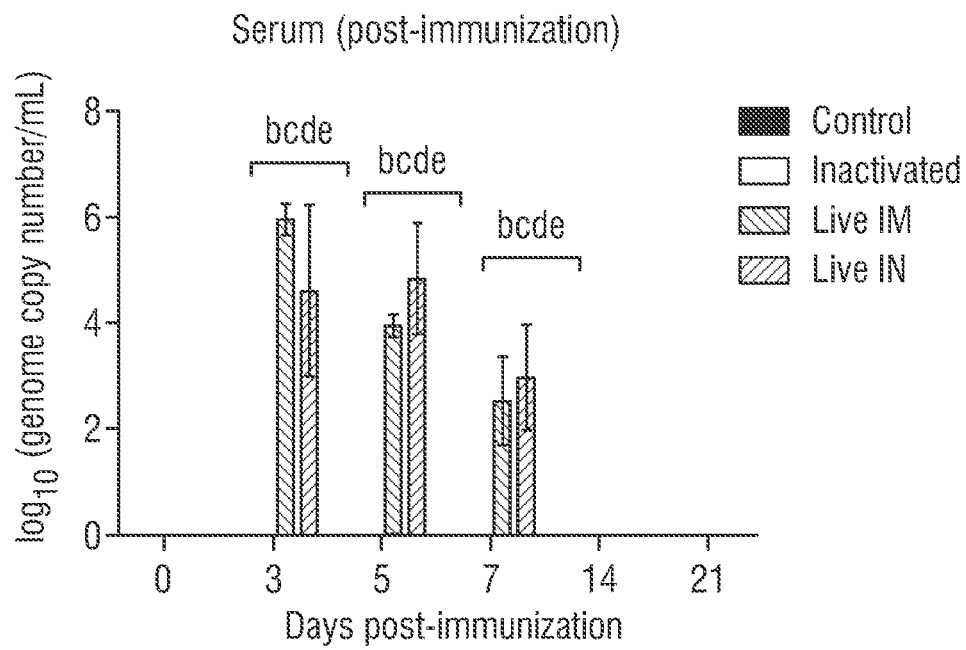
Figure 5D:
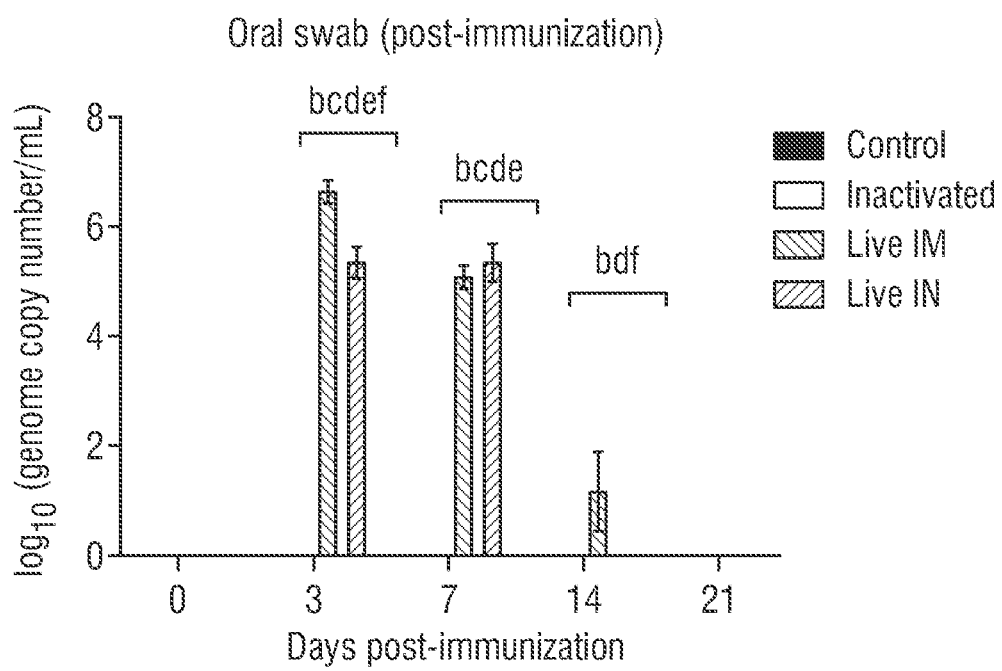
Figure 5E:
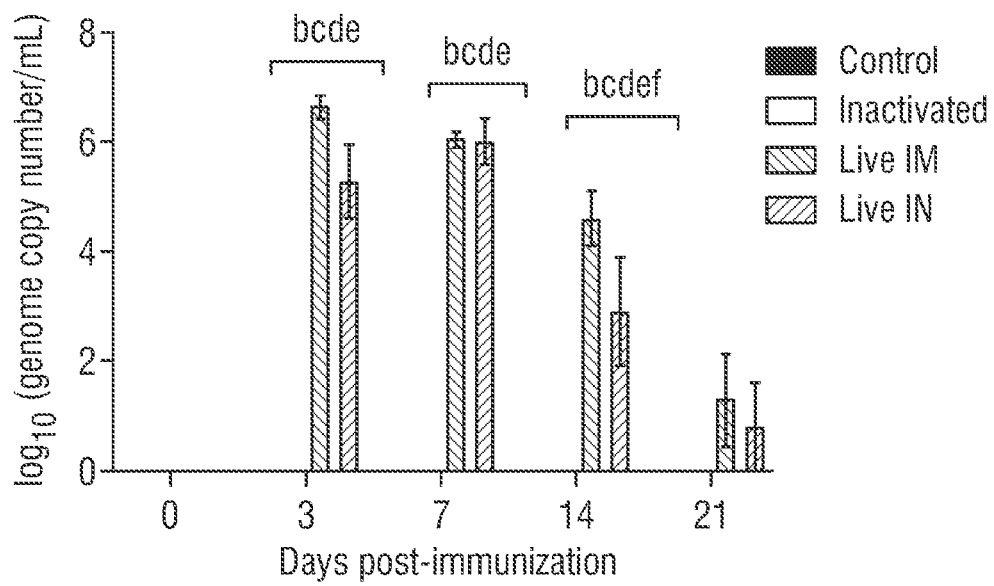
Figure 5F:
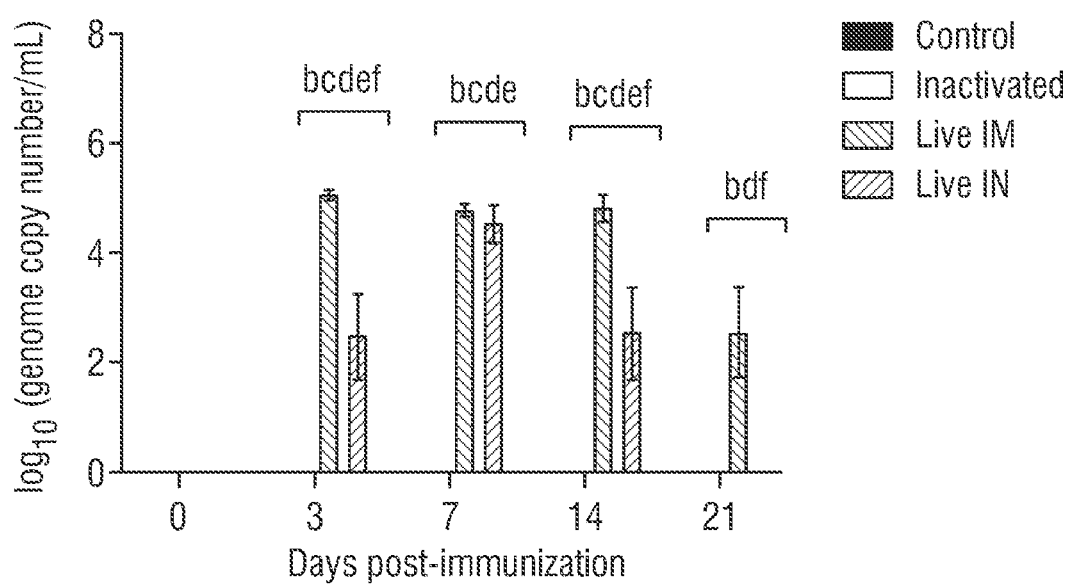
Figure 6A:
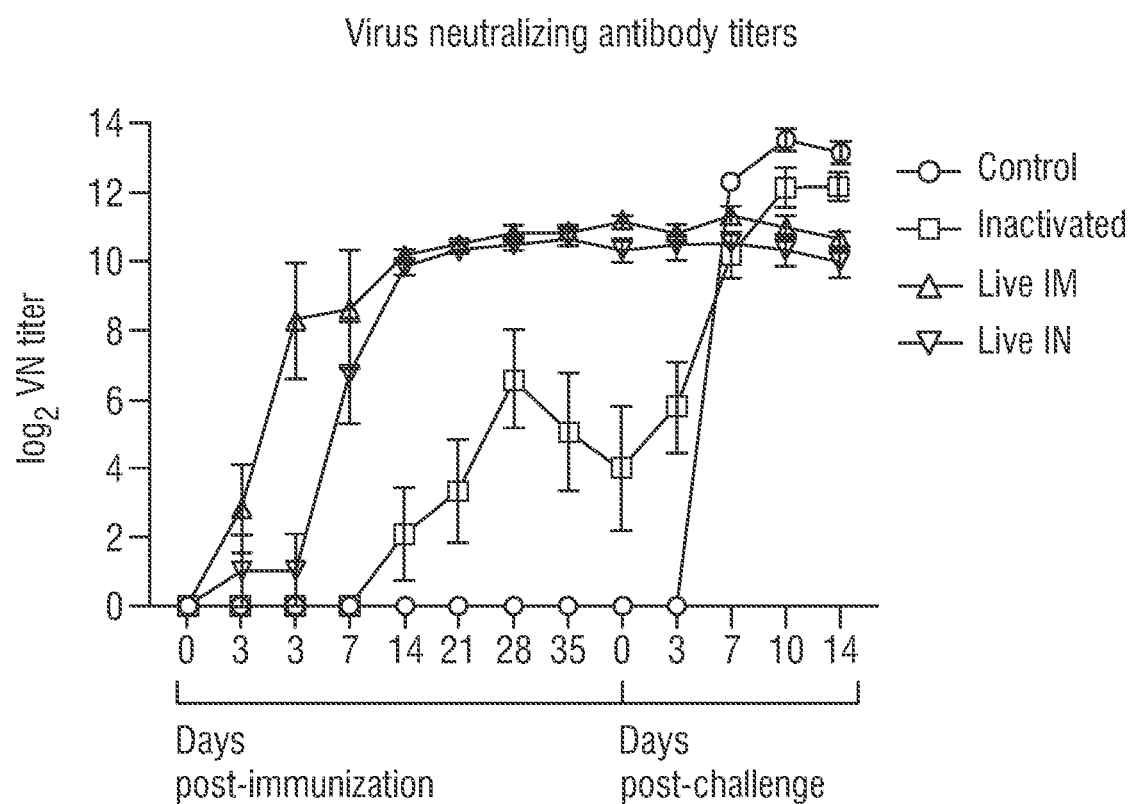
FIGS. 6 (A)-(C) show neutralizing antibody titer post immunization and post challenge. Virus neutralizing antibody titer were measured in various time points post-immunization and post-challenge.
Figure 6B:
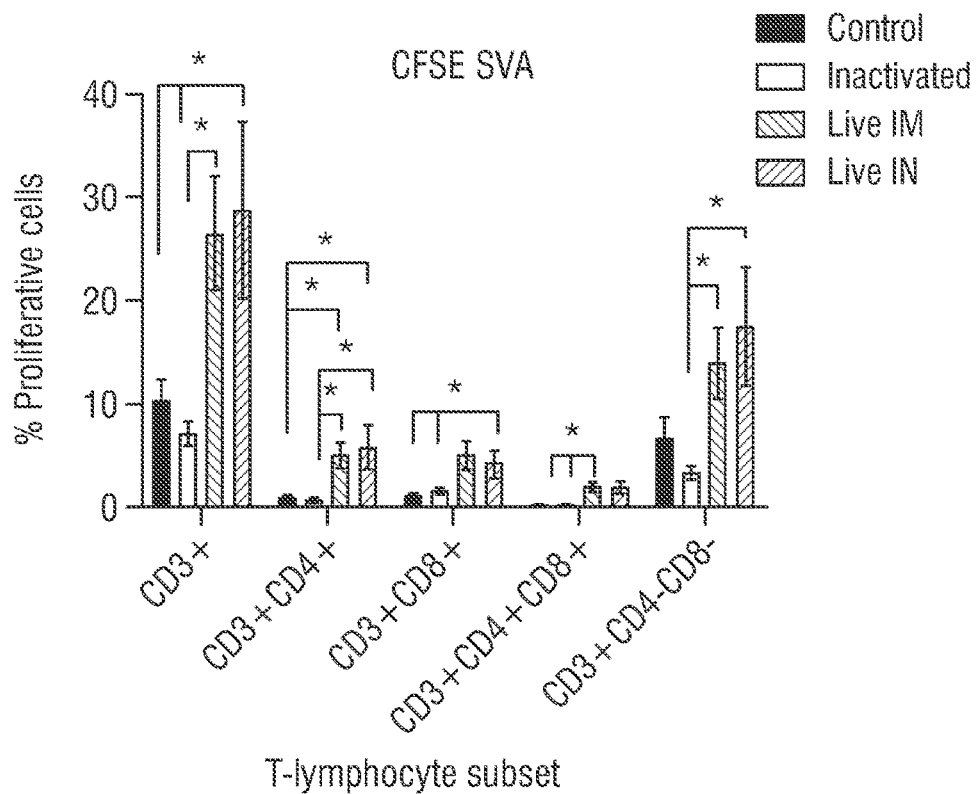
Figure 6C:
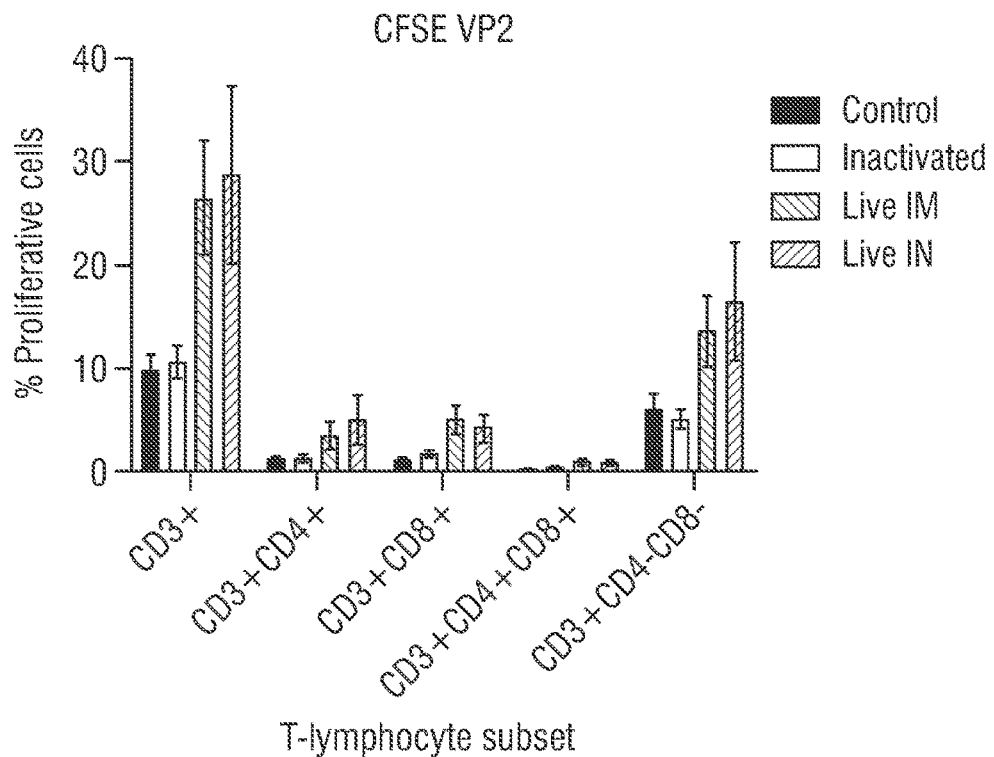
Figure 7A:
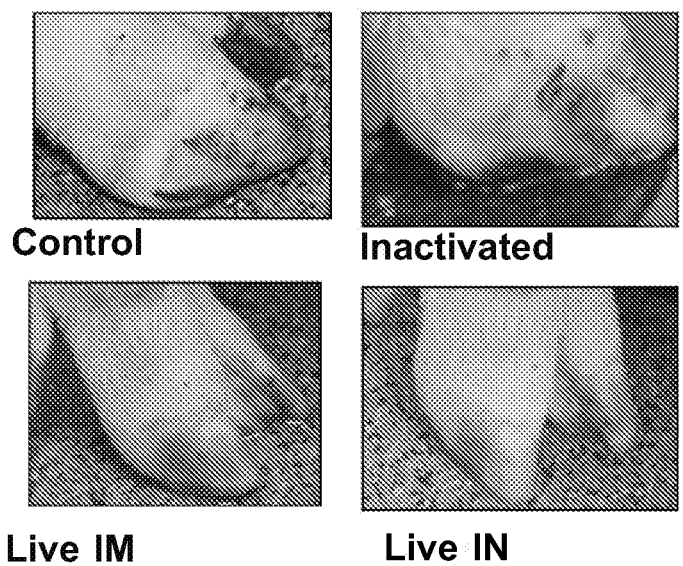
FIGS. 7 (A)-(F) demonstrates Clinical outcome, viremia and shedding in pigs after heterologous SVA challenge. Animals in all groups were challenged with SVA MN15-84-22. (A) Clinical outcome. (B) Total clinical score. (C) Viremia. Virus shedding in (D) oral secretion (E) Nasal secretion and (F) Rectal swab. *a, b, c, d, e, f indicates significant difference between groups Control vs. Inactivated, Control vs. Live IM, Control vs. Live IN, Inactivated vs. Live IM, Inactivated vs. Live IN and Live IM vs. Live IN respectively at $p<0.05$ (Tukey's multiple comparison).
Figure 7B:
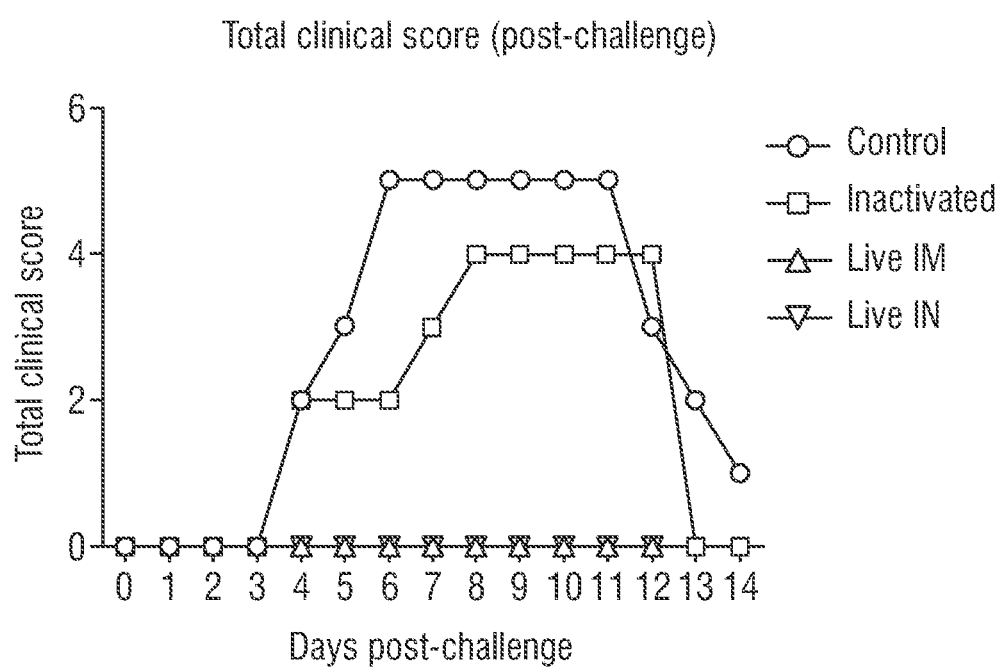
Figure 7C:
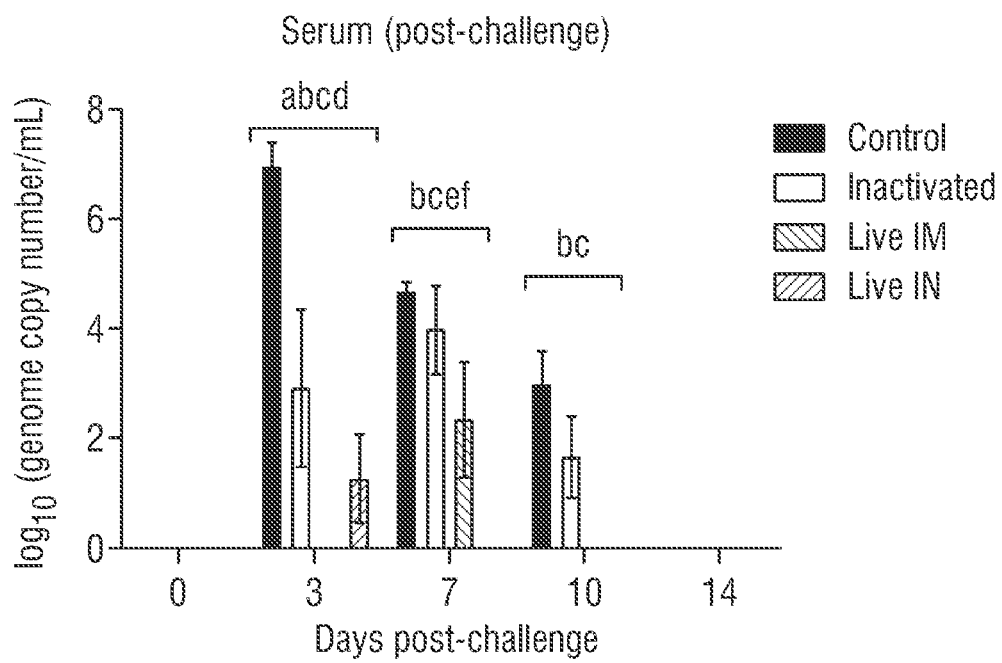
Figure 7D:
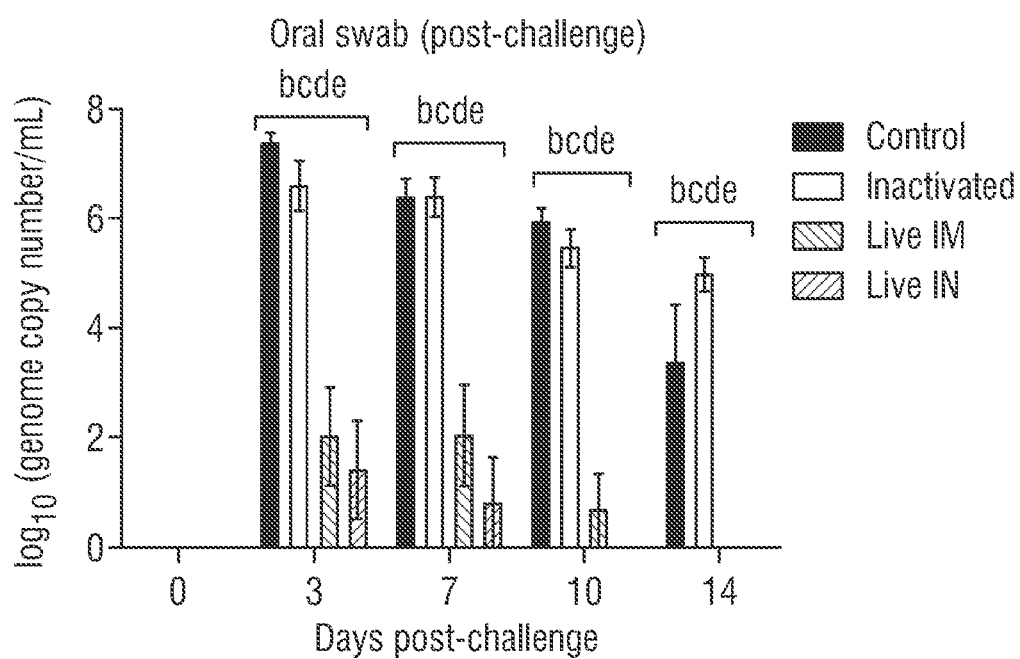
Figure 7E:
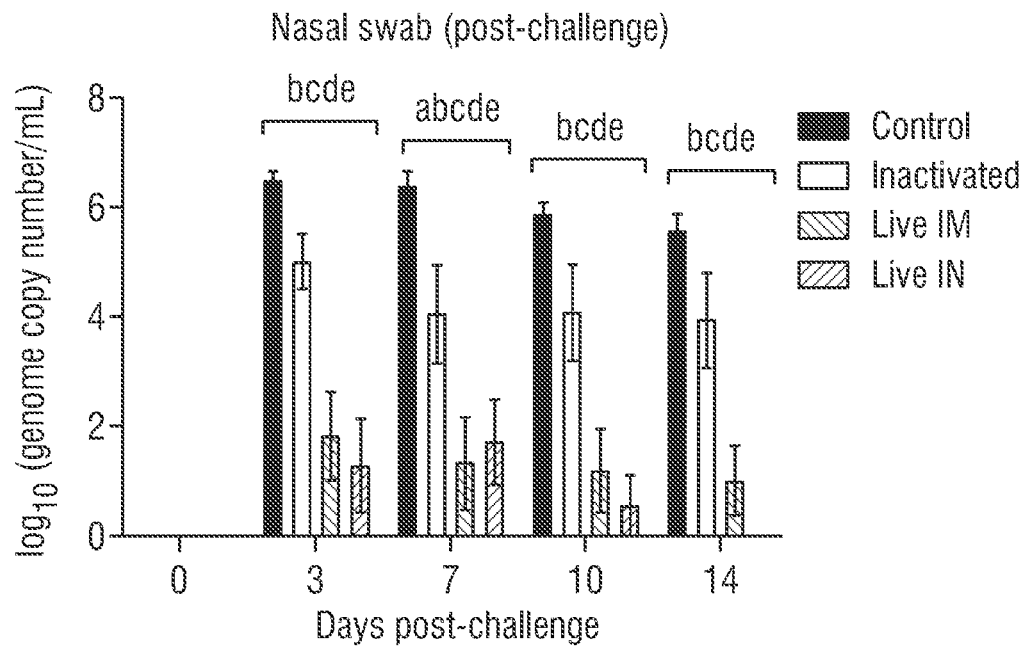
Figure 7F:
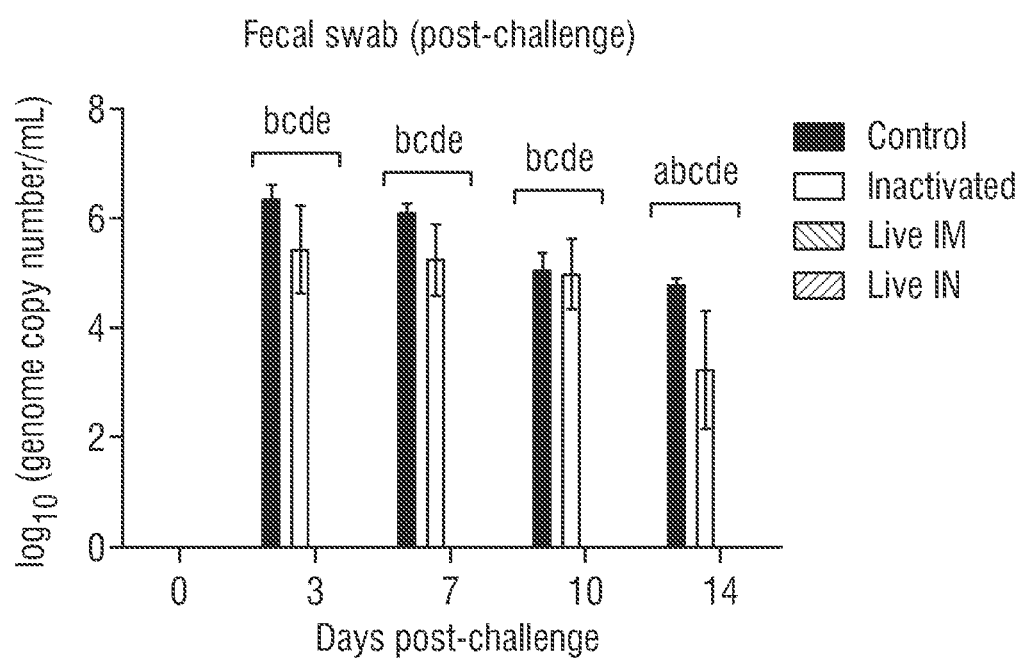
Figure 8A:
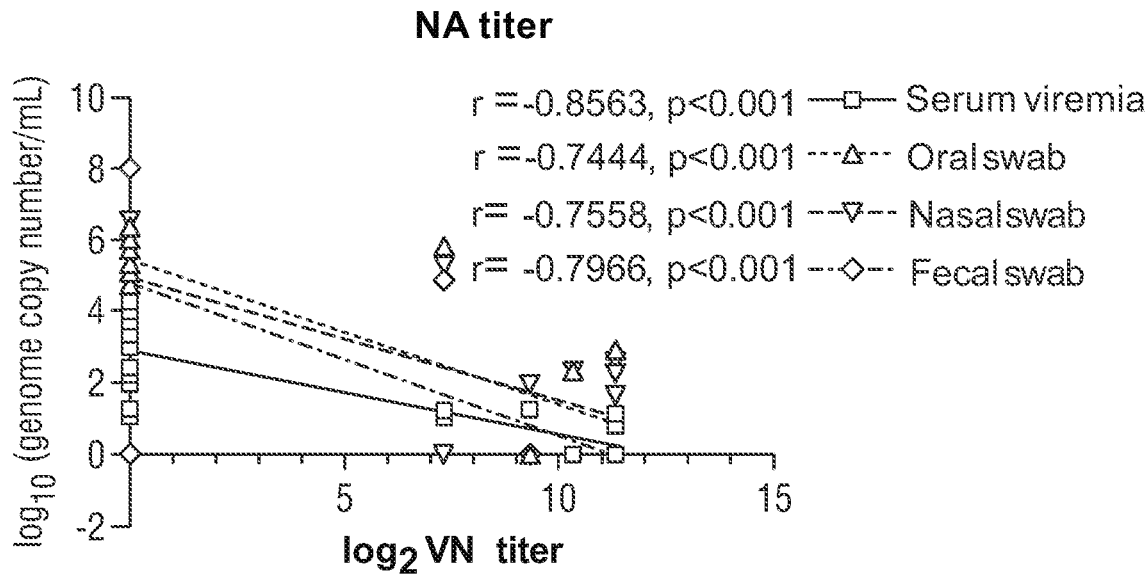
FIGS. 8 (A)-(D) show titers in various tissues
Figure 8B:
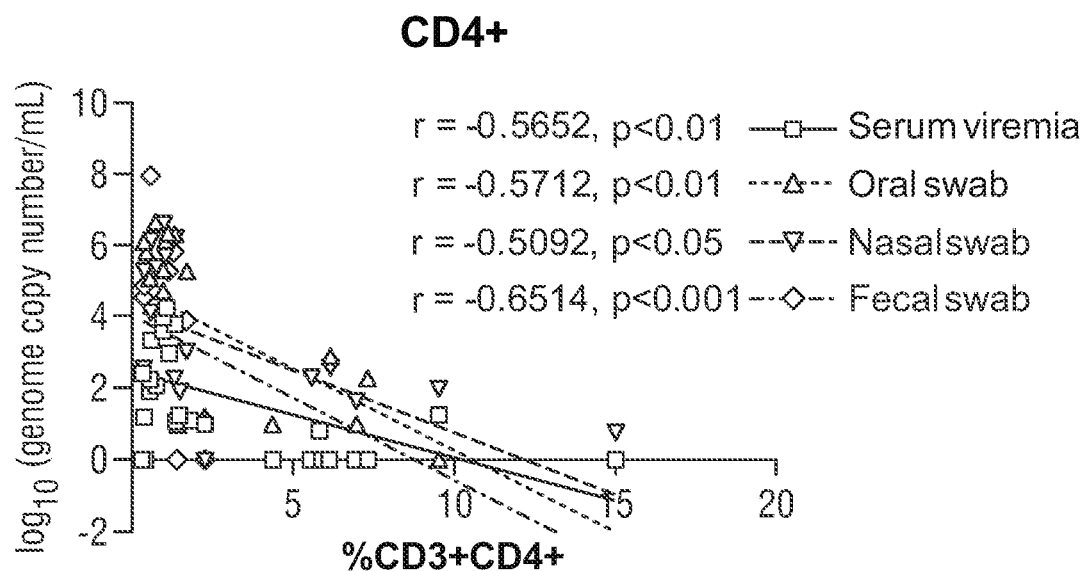
Figure 8C:
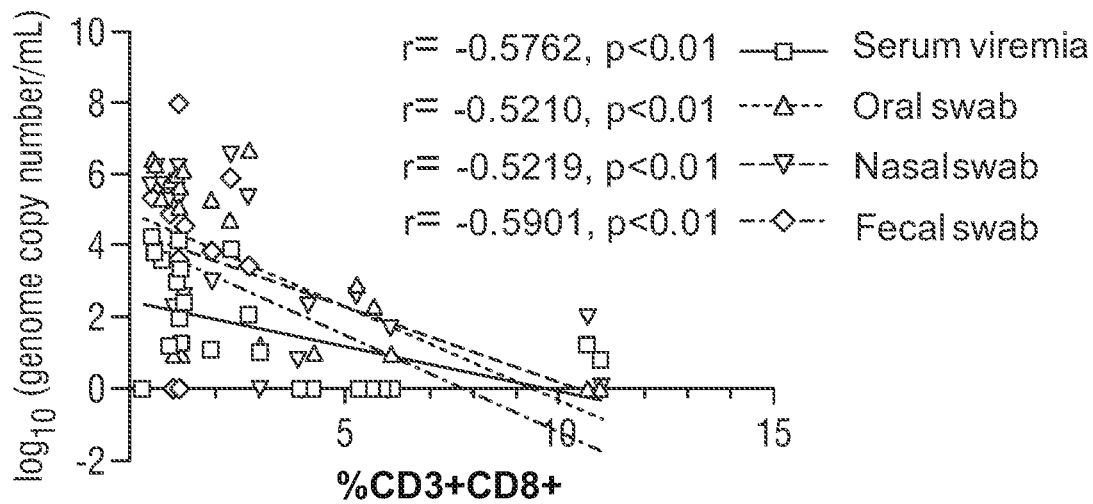
Figure 8D:
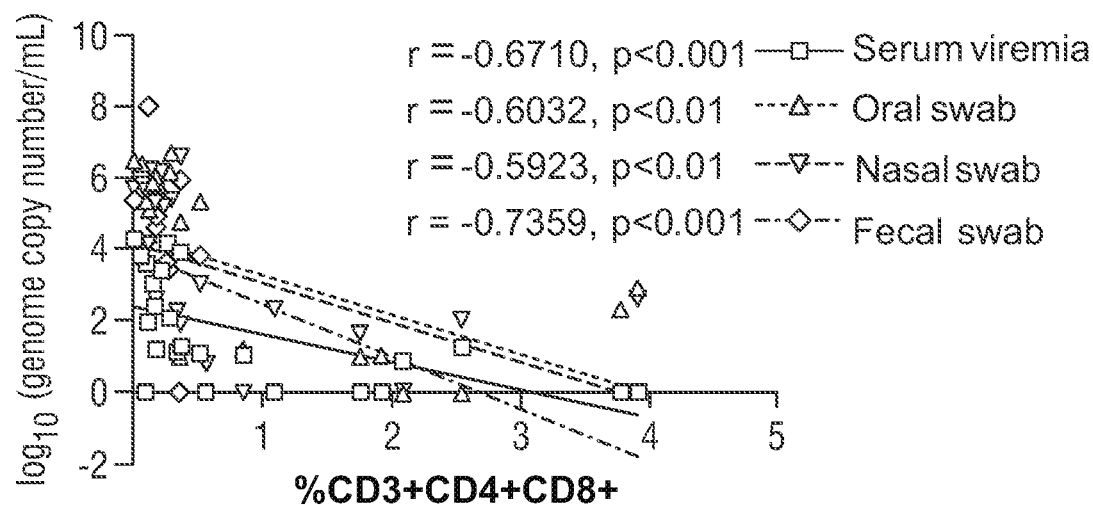
Figure 9A:
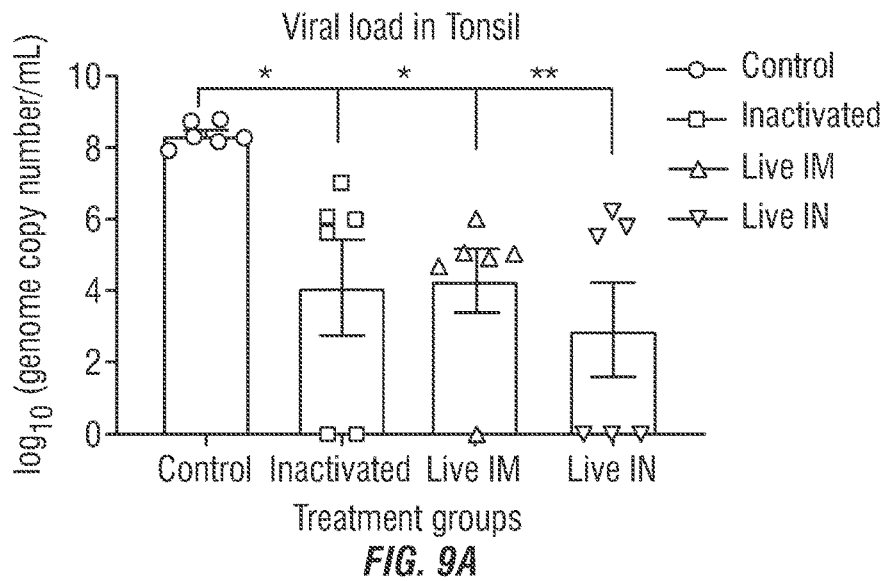
FIGS. 9 (A)-(C) show Viral load in tissues. Virus load post-challenge in (9A) Tonsil, (9B) Mediastinal lymph node, and (9C) Mesenteric lymph node.
Figure 9B:
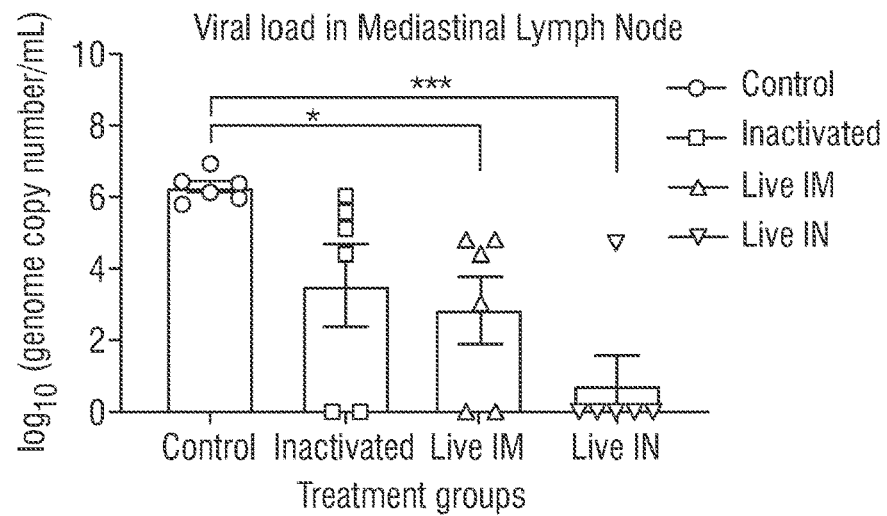
Figure 9C:
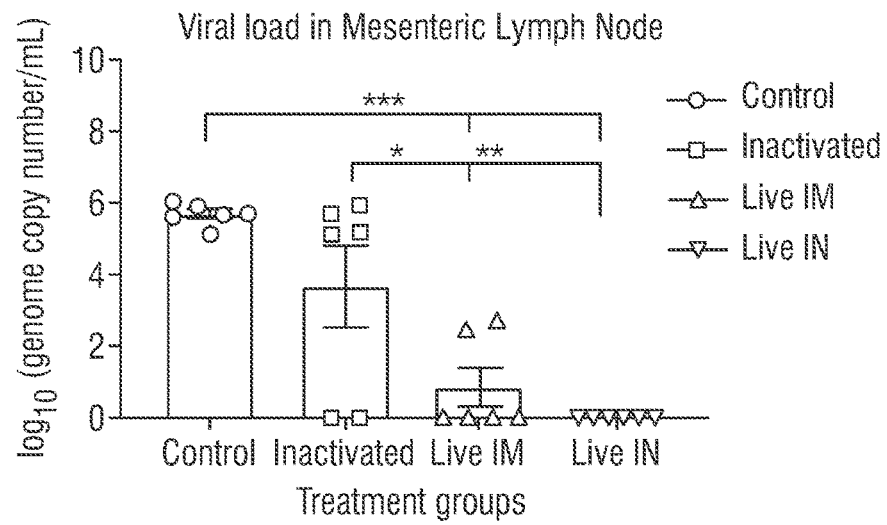
Figure 10A:
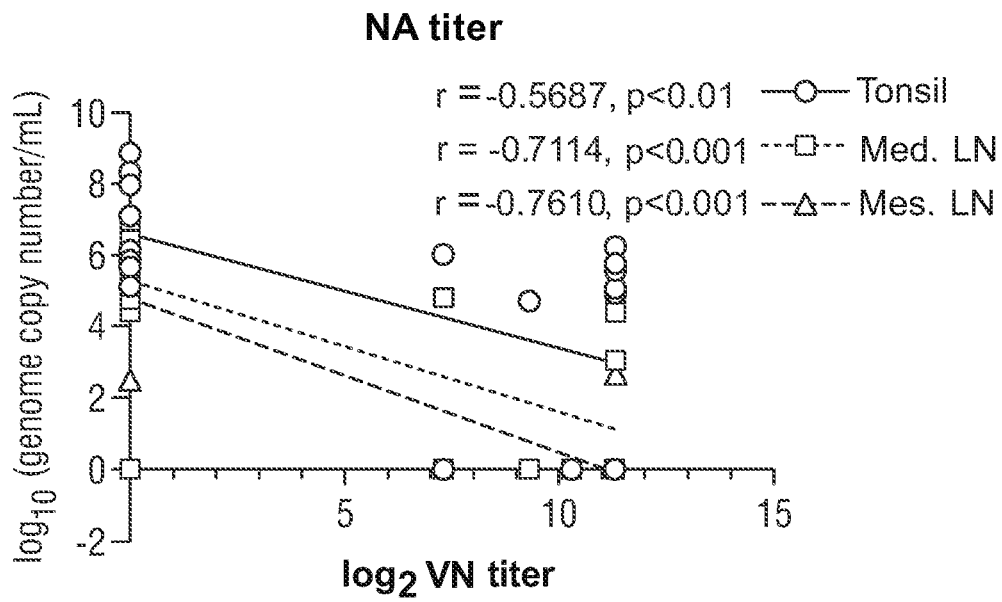
FIGS. 10 (A)-(C) show titers in various tissues.
Figure 10B:
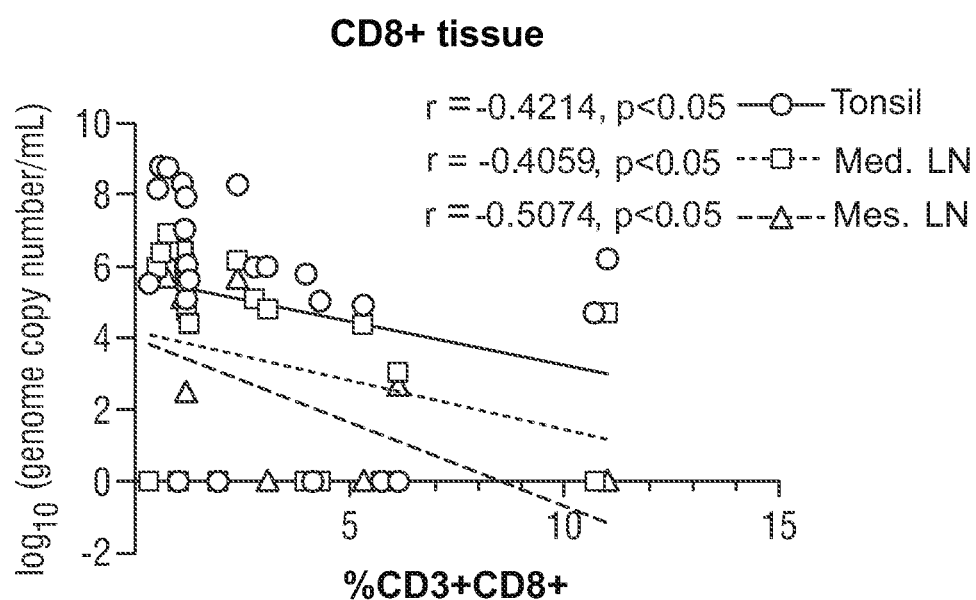
Figure 10C:
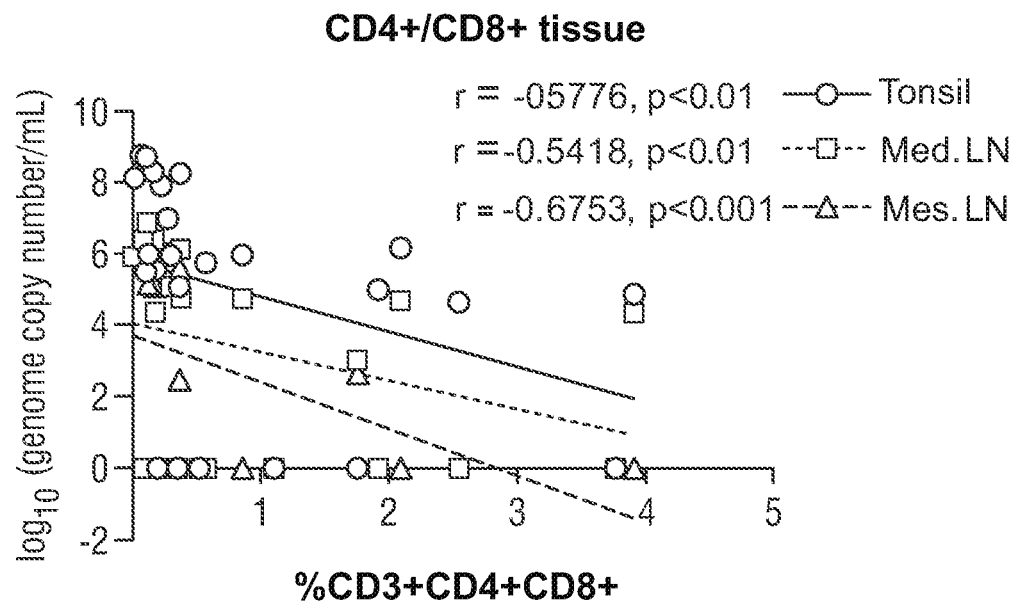
Figure 12A:
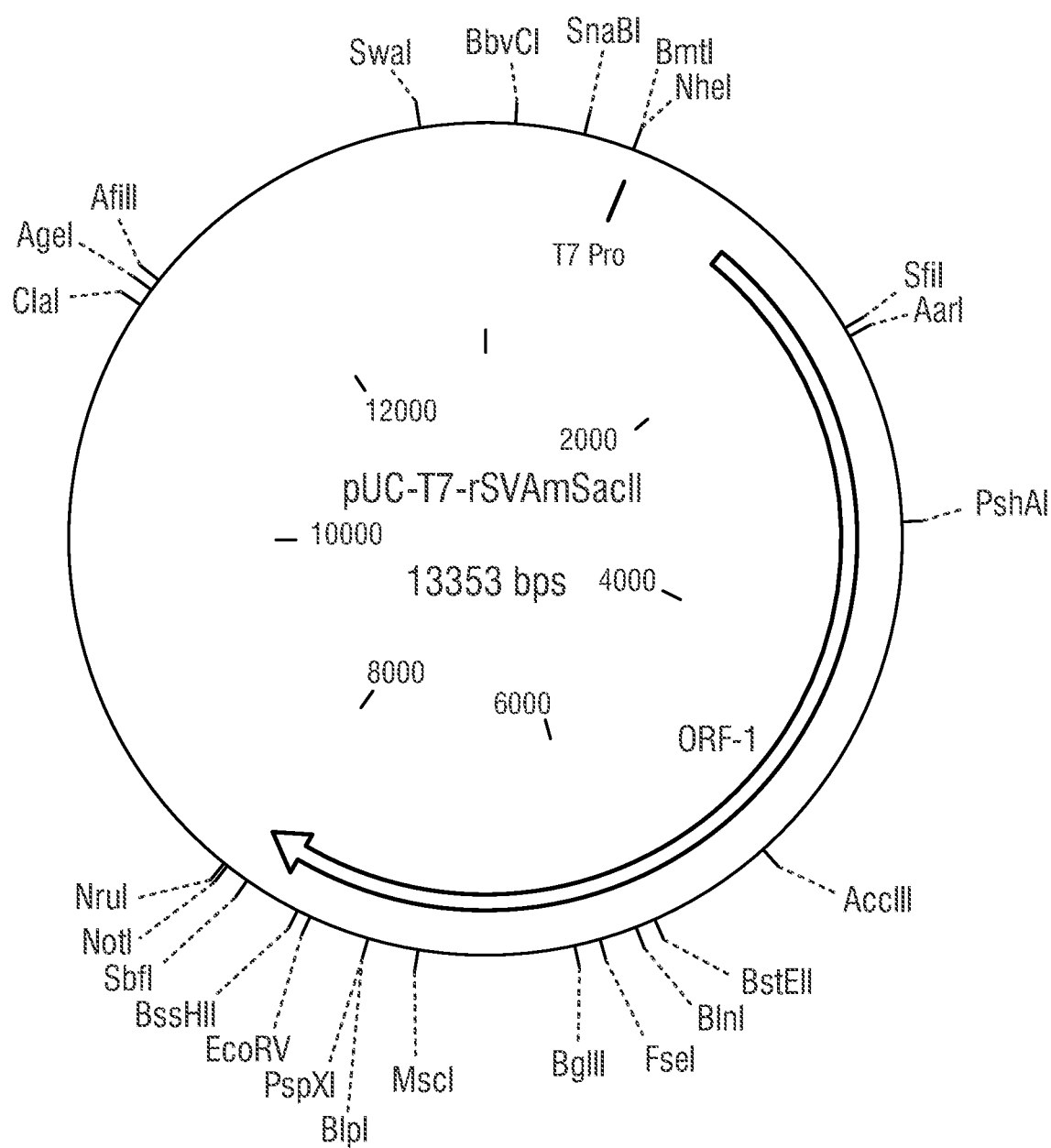
FIGS. 12 (A) and (B) are maps of rSVA_mSacII (A) is circular and (B) is linear.
Figure 12B:
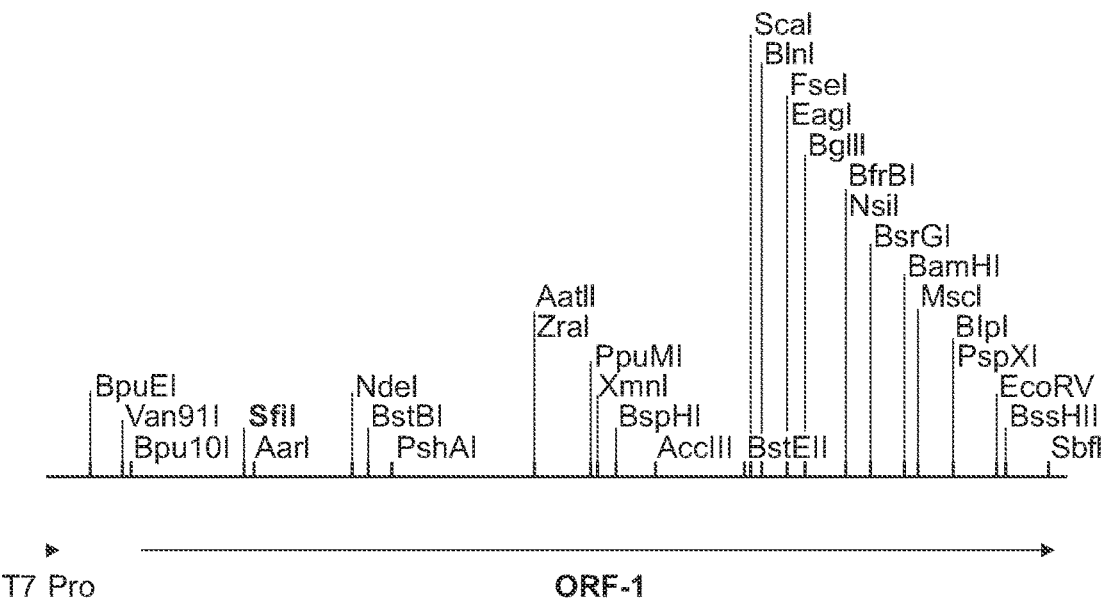

Twenty-four SVA-negative 28 days old piglets were immunized with vaccine or plain RPMI in case of control as shown in Table 1 and were monitored for clinical signs and vesicular lesions for 35 days. None of the animals presented lesions or any clinical signs (FIG. 5A). Clinical scores based on lesion were calculated as previously described (23). As no gross lesions were observed in all animals, clinical scores remained 0 throughout post-immunization (i) period (FIG. 5B)

TABLE 1

| Experimental design | | | | | | |
|---|---|---|---|---|---|---|
| Group (n) | Treatment | Dose | Route | Immunization | Challenge | Note |
| 1 (n = 6) | Control | 2 mL RPMI | IM | 0 and 21 dpi | 42 dpi SVA MN15-84-21 $10^{7.5}$ $TCID_{50}$/mL | |
| 2 (n = 6) | Inactivated (BEI) SVA | 1 mL $10^6$ $TCID_{50}$/mL with 1 ml of Adjuvant | IM | 0 and 21 dpi | | Adjuvant: Seppic Montanide ISA200 |

The levels of viremia in animals of all four groups were assessed in serum: Serum samples collected on days 0, 3, 5, 7, 14 and 21 pi were tested for the presence of SVA RNA using RT-qPCR. SVA was detected in day 3 pi in live IM and live IN groups till day 7 pi. The level of viremia was significantly high ($p<0.01$) in live vaccine group compared to control and inactivated but there no significant difference ($p>0.05$) between live IM and live IN group. The viremia was not present in day 14 pi and onward on all groups (FIG. 5C).

Virus shedding was assessed in the oral and nasal secretions and feces on animals of all groups. Oral, nasal and rectal swabs collected on days 0, 3, 5, 7, 14 and 21 pi were examined'ed by RT-qPCR. Virus shedding was detected until day 14 pi on oral swab and day 21 pi on nasal and rectal swab from live IM and live IN groups. No viral genome was detected on control and inactivated group. Live IN group had significantly higher amount of SVA RNA in certain days pi in all secretions (FIGS. 5D, 5E and 5F).

Immunization with rSVA mSacII Provides Protection Against Heterologous SVA Strain.

Animals in all groups were challenged with virulent SVA strain SVA MN15-84-22 on day 42 post-immunization (Table 1). They were monitored daily for characteristics clinical signs and clinical scores were calculated. All animals of control group succumbed to illness by day 4 pc. Animals were lame (data not shown) and 4/6 displayed characteristic SVA lesion on feet (FIG. 7A). Only 3/6 animals developed lameness (data not shown) and clinical lesion (FIG. 7A) in inactivated group. It is interesting to note that none of the animal developed lesion on snout and lesions were mostly confined on coronary band and sole. In both groups, lesion developed on day 4 post-challenge (pc), however, no lameness or lesion were observed on live vaccine group. Peak clinical score was detected in day 6 pc in control and day 9 pc in inactivated group (FIG. 7B). Lesions resolved after 13 days pc in inactivated group but was still present in 14 days pc in control. As no gross lesions were observed in both live vaccine groups, clinical scores for these groups remained 0 throughout the remaining experiment (FIG. 7B).

The level of viremia was also assessed post-challenge in serum collected on days 0, 3, 7, 10 and 14 pc by RT-qPCR. SVA RNA was detected on day 3 pc on control, inactivated and live IN groups only, where control had significantly higher ($p<0.01$) genome copy than other two groups (FIG. 7C). SVA genome of live IN was detected only on day 3 pc and live IM group only on day 7 pc (FIG. 7C). Viremia on control and inactivated group was observed on day 10 pc and not observed afterwards (FIG. 7C).

Virus shedding was assessed in oral and nasal secretions and feces in all group on oral, nasal and rectal swabs collected on days 0, 3, 7, 10 and 14 pc by RT-qPCR. Virus shedding was detected until the end of the experiment on day 14 pi in animals of control and inactivated group (FIGS. 7D, E and F). Virus shedding on Live IM and IN group was significantly less ($p<0.01$) compared to control and inactivated in both oral and nasal secretion (FIGS. 7D and E) and no virus shedding was detected in these two live groups in fecal swabs.

Virus load was also investigated in lymphoid tissues using RT-qPCR. Viral load in tonsil, mediastinal and mesenteric lymph nodes are presented in FIGS. 8 A, B and C. The tonsil presented the highest viral load compared to other tissues. SVA RNA was significantly high ($p<0.01$) in control compared to other three groups (FIG. 8A). No significant difference ($p>0.05$) in SVA RNA copy number was observed among other three groups (FIG. 8A). In mediastinal lymph node, SVA RNA was significantly high ($p<0.01$) in control compared to Live IM and IN groups (FIG. 8B). Similar result was observed in Mesenteric lymph node (FIG. 8C). Moreover, SVA RNA was not detected in any animal of Live IN group in mediastinal lymph node (FIG. 8C).

The serological responses post-immunization and post-challenge were evaluated by virus neutralization assay (VN). All immunized animal seroconverted and high level of neutralizing antibodies (NA) were observed starting day 3 pi on live IM and IN group and day 14 on inactivated group. Live IM had significantly higher ($p<0.01$) NA on day 3 and 5 compared to all groups but after day 7 pi Live IN also showed similar NA as IM group (FIG. 6). NA in inactivated was lower compared to live vaccinated group post-immunization. There was slight increase in NA in inactivated group on day 28 pi due to booster immunization on day 21 pi. After 7 days post-challenge, there was sharp increase in NA on inactivated and control group, however, NA level on live vaccine group was consistent till the end of experiment. This consistent level of NA in live group probably explains the absence of clinical sign, transient viremia and negligible virus shedding in these groups.

SVA not only causes economic losses but its similarity to FMD which is OIE-listed disease (world wide web at http://oie.int) is of major concern for swine industry. The notification of OIE-listed disease can be deleterious to pig production for any country including investigation, restriction of animal movement, culling of animals, export restriction on animal products (24). Use of SVA as oncolytic agent in human may be beneficial but its association with swine vesicular disease is detrimental. The use of vaccine can help limit the spread of SVA in current endemic population.

Viruses and Cells

H1299 cells were purchased from the American Type Culture Collection (ATCC-CRL 5803). Cells were maintained at 37° C. with 5% $CO_2$ in RPMI-1640 medium (Corning, NY) supplemented with 10% fetal bovine serum (VWR, Chicago, IL) and 2 mM L-Glutamine (Corning, NY). Penicillin (100 U/mL) and streptomycin (100 µg/mL) were also added to culture media.

SVA strain SD15-26 was isolated from swine presenting vesicular disease and has been previously characterized in our laboratory (19, 20). SVA strain MN15-84-21 was also isolated from swine presenting vesicular disease and characterized in our laboratory (11). For both virus strain low-passage (passage 4) stocks were prepared, titrated and used in experiments described below.

Generation of rSVA mSacII.

Growth Curves

Replication kinetics of wt SVA SD15-26 and rSVA mSacII were assessed in vitro. H1299 and PK-15 cells were cultured in six-well plates, inoculated with both virus at a multiplicity of infection (MOI) of 0.1 (multi-step growth curve) or 10 (single-step growth curve), and har-vested at various time points post-infection (2, 4, 8, 12 and 24 h post-infection). Virus titres were determined for each time point using Spearman and Karber's method and expressed as $TCID_{50}$/ml.

Western Blots

Western blot was done to see any variation in protein level of live and inactivated virus. For both live and inactivated virus, 20 µL of sample was taken and mixed with 4× Lamelli Buffer (Bio-Rad, Hercules, CA) containing 5% β-mercaptoethanol and denatured at 95° C. for 10 minutes then loaded onto 10% SDS-PAGE gel. Gel was run at 90 volts for 90 minutes and was transferred to nitrocellulose paper and blocked on 5% skim-milk on 1× phosphate-buffered saline (PBS) overnight at 4° C. Nitrocellulose paper was washed 3 times in 1×PBS supplemented with 0.05% Tween 20 (PBST) and incubated with anti-VP1 and anti-VP2 anti-mouse antibody (1:1000) in 0.05% PBST for 2 hours at RT. They were washed again 3 times with 0.05% PBST. IRDye® 800CW Goat anti-Mouse IgG (H+L) (LI-COR Biosciences, Lincoln, NE) was used as secondary antibody (1:15000 on 1% skim-milk on 0.05% PBST) and incubated for 1 hour at RT. It was washed 3 times with PBST 0.05% and observed in LI-COR® Odyssey® Fc Imaging system (LI-COR Biosciences, Lincoln, NE).

Animal Studies.

Pathogenesis Experiment

Immunization-Challenge Experiment

Immunization of SVA vaccines were evaluated in 28 days old 24 pigs at SDSU Animal Resource Wing (ARW). Six animals were kept in each room corresponding to treatment groups, viz: control (non-immunized and receiving plain RPMI 1640), inactivated (receiving BEI inactivated vaccine), Live IM (receiving rSVA mSacII by intramuscular route) and Live IN (receiving rSVA mSacII by intranasal route), and received food and water ad libitum. Strict biosecurity protocols were followed to avoid cross contamination. After one week of acclimatization, immunization was done as presented in Table 1. Inactivation of virus by binary ethylenimine (BEI) was done as previously described (25). The water in oil in water (W/O/W) vaccine was produced by shear-mixing equal volume of oil adjuvant Seppic MONTANIDE™ ISA 201 VG (Seppic SA, Paris) with BEI inactivated virus at 31° C. in syringes joined by coupler. Animals were monitored daily for signs and lesions throughout the experiment. Oral, nasal and rectal swabs were collected on days 0, 3, 7, 14, 21, 28- and 35-days post-immunization. Blood was collected on days 0, 3, 5, 7, 14, 21, 28- and 35-days post-immunization. Serum separation by centrifugation and PBMCs isolation by density gradient centrifugation were done as previously described (19, 20).

A heterologous SVA strain (SVA MN15-84-22) was used as challenge virus and animals in all groups were challenged on day 42 post-immunization. Blood and swabs were collected on days 3, 7, 10 and 14 post-challenge and processed and stored as above. All animals were euthanized on day 14 post-challenge at Animal Disease Research and Diagnostic Laboratory (ADRDL), SDSU. Tissues (tonsil, mediastinal and mesenteric lymph nodes) were collected and stored at −80° C. or fixed in 10% formalin. Animal experiments were revised and approved by the SDSU Institutional Animal Care and Use Committee (approval number 18-032A).

Real-Time PCR.

Nucleic acid was extracted from serum, swabs and tissue samples using Cador® Pathogen 96 QIAcube® HT kit (Qiagen). For tissue, approximately 0.5 g of each tissue was minced using sterile scalpel, re-suspended in RPMI 1640 medium (10% w/v) and homogenized using stomacher (2 cycles of 60 s). Homogenized samples were then centrifuged at 14,000×g for 2 minutes at room temperature and 200 µL of cleared supernatant was used for nucleic acid extraction using automated QIAcube HT (Qiagen). Swab samples were vortexed and cleared by centrifugation and 200 µL of supernatant was used for nucleic acid extraction as above. Two hundred uL of serum was also used for nucleic acid extraction. RNA extraction control (Bioline, MA, USA) was also added during nucleic acid extraction for all samples. The presence of SVA RNA in samples were assessed using commercial RT-qPCR reagents (Bioline, MA, USA). Primers and a probe targeting the conserved portion of SVA 3D gene were designed using PrimerQuest Tool (Integrated DNA Technologies Inc., USA). The probe and primers sequence are 5'-/56-FAM/CAGGAACAC/ZEN/TACTCGAGAAGCTGCAA/3IABkFQ/-3', 5'-GAAGC-CATGCTCTCCTACTTC-3' and 5'-GGGTGCATCAATC-TATCATATTCTTC-3' respectively. RT-qPCR was performed using a SensiFast™ Probe Lo-ROX One-Step Kit (Bioline, MA, USA) following manufacturer's instructions. Amplification and detection were performed with an Applied Biosystems 7500 real time PCR system under following conditions: 10 minutes at 45° C. for reverse transcription, 2 minutes at 95° C. for polymerase activation and 40 cycles of 5 seconds at 95° C. for denaturation and 30 seconds at 60° C. for annealing and extension. A standard curve was established by using SVA SD15-26 virus of titer $10^{7.88}$ TCID50/ml and preparing 10-fold serial dilutions from $10^{-1}$ to $10^{-10}$. Viral genome copy number equivalent to TCID50/ml was calculated based on the standard curve determined using the four-parameter logistic regression model function within MasterPlex Readerfit 2010 software (Hitachi Software Engineering America, Ltd., San Francisco, CA). The amount of viral RNA detected in samples were expressed as $\log_{10}$ (genome copy number)/mL Neutralization Assays Neutralizing antibody (NA) response by vaccine and challenge virus were assessed using a virus neutralization assay as previously described (19). NA titers were expressed as $\log_2$ (reciprocal of highest serum dilution capable of completely inhibiting SVA infection). All assays were performed in triplicate including positive and negative control in all test plates.

Flow Cytometry

Statistical Analysis

Statistical analysis was performed by analysis of variance (ANOVA) followed by Tukey's multiple comparison test. Normality were checked before performing any tests. Statistical analysis and data visualization were performed using GraphPAD Prism 8.0.1(244) software (GraphPAD Software Inc., La Jolla, CA).

REFERENCES

1. ICTV. 2018. Virus Taxonomy: 2018 Release. Washington, DC.
2. Hales L M, Knowles N J, Reddy P S, Xu L, Hay C, Hallenbeck P L. 2008. Complete genome sequence analysis of Seneca Valley virus-001, a novel oncolytic picornavirus. J. Gen. Virol. 89:1265-75.
3. Knowles N J, Hales L M, Jones B H, Landgraf J G, House J A, Skele K L, Burroughs K D, Hallenbeck P L. 2006. Epidemiology of Seneca Valley Virus: Identification and Characterization of Isolates from Pigs in the United States.
4. Rudin C M, Poirier J T, Senzer N N, Stephenson J, Loesch D, Burroughs K D, Reddy P S, Hann C L, Hallenbeck P L. 2011. Phase I clinical study of Seneca Valley Virus (SVV-001), a replication-competent picornavirus, in advanced solid tumors with neuroendocrine features. Clin. Cancer Res. 17:888-95.
5. Liu Z, Zhao X, Mao H, Baxter P A, Huang Y, Yu L, Wadhwa L, Su J M, Adesina A, Perlaky L, Hurwitz M, Idamakanti N, Police S R, Hallenbeck P L, Hurwitz R L, Lau C C, Chintagumpala M, Blaney S M, Li X N. 2013. Intravenous injection of oncolytic picornavirus SVV-001 prolongs animal survival in a panel of primary tumor-based orthotopic xenograft mouse models of pediatric glioma. Neuro. Oncol. 15:1173-1185.
6. Poirier J T, Dobromilskaya I, Moriarty W F, Peacock C D, Hann C L, Rudin C M. 2013. Selective tropism of Seneca Valley virus for variant subtype small cell lung cancer. J. Natl. Cancer Inst. 105:1059-65.
7. Pasma T, Davidson S, Shaw S L. 2008. Idiopathic vesicular disease in swine in Manitoba. Can. Vet. J. 49:84-5.
8. Corner S S K. 2012. Seneca Valley Virus and Vesicular Lesions in a Pig with Idiopathic Vesicular Disease. J. Vet. Sci. Technol. 03:3-5.
9. Vannucci F A, Linhares D C L, Barcellos D E S N, Lam H C, Collins J, Marthaler D. 2015. Identification and Complete Genome of Seneca Valley Virus in Vesicular Fluid and Sera of Pigs Affected with Idiopathic Vesicular Disease, Brazil. Transbound. Emerg. Dis. 62:589-593.
10. Wu Q, Zhao X, Bai Y, Sun B, Xie Q, Ma J. 2017. The First Identification and Complete Genome of Senecavirus A Affecting Pig with Idiopathic Vesicular Disease in China. Transbound. Emerg. Dis. 64:1633-1640.
11. Joshi L R, Mohr K A, Clement T, Hain K S, Myers B, Yaros J, Nelson E A, Christopher-Hennings J, Gava D, Schaefer R, Caron L, Dee S, Diel D G. 2016. Detection of the Emerging Picornavirus Senecavirus A in Pigs, Mice, and Houseflies. J. Clin. Microbiol. 54:1536-45.
12. Leme R A, Zotti E, Alcântara B K, Oliveira M V, Freitas L A, Alfieri A F, Alfieri A A. 2015. Senecavirus A: An Emerging Vesicular Infection in Brazilian Pig Herds. Transbound. Emerg. Dis. 62:603-611.
13. Laguardia-Nascimento M, Gasparini M R, Sales É B, Rivetti A V., Sousa N M, Oliveira A M, Camargos M F, Pinheiro de Oliveira T F, Gonçalves J P M, Madureira M C, Ribeiro D P, Marcondes I V., Barbosa-Stancioli E F, Fonseca A A. 2016. Molecular epidemiology of senecavirus A associated with vesicular disease in pigs in Brazil. Vet. J. 216:207-209.
14. Simão G M R. 2018. SHIC Notes New Outbreak of SVA in Brazil—Swine Health Information Center.
15. Zhang X, Xiao J, Ba L, Wang F, Gao D, Zhang J, Pan C, Qi P. 2018. Identification and genomic characterization of the emerging Senecavirus A in southeast China, 2017. Transbound. Emerg. Dis. 65:297-302.
16. Sun D, Vannucci F, Knutson T P, Corzo C, Marthaler D G. 2017. Emergence and whole-genome sequence of Senecavirus A in Colombia. Transbound. Emerg. Dis. 64:1346-1349.
17. Saeng-chuto K, Rodtian P, Temeeyasen G, Wegner M, Nilubol D. 2018. The first detection of Senecavirus A in pigs in Thailand, 2016. Transbound. Emerg. Dis. 65:285-288.
18. Guo B, Piñeyro P E, Rademacher C J, Zheng Y, Li G, Yuan J, Hoang H, Gauger P C, Madson D M, Schwartz K J, Canning P E, Arruda B L, Cooper V L, Baum D H, Linhares D C, Main R G, Yoon K-J. 2016. Novel Senecavirus A in Swine with Vesicular Disease, United States, July 2015. Emerg. Infect. Dis. 22:1325-7.
19. Joshi L R, Fernandes M H V., Clement T, Lawson S, Pillatzki A, Resende T P, Vannucci F A, Kutish G F, Nelson E A, Diel D G. 2016. Pathogenesis of Senecavirus A infection in finishing pigs. J. Gen. Virol. 97:3267-3279.
20. Maggioli M F, Lawson S, de Lima M, Joshi L R, Faccin T C, Bauermann F V, Diel D G. 2018. Adaptive Immune Responses following Senecavirus A Infection in Pigs. J. Virol. 92.
21. Yang F, Zhu Z, Cao W, Liu H, Zhang K, Tian H, Liu X, Zheng H. 2018. Immunogenicity and protective efficacy of an inactivated cell culture-derived Seneca Valley virus vaccine in pigs. Vaccine 36:841-846.
22. Rodriguez L L, Grubman M J. 2009. Foot and mouth disease virus vaccines. Vaccine 27:D90-D94.
23. Fernandes M H V, Maggioli M F, Joshi L R, Clement T, Faccin T C, Rauh R, Bauermann F V., Diel D G. 2018. Pathogenicity and cross-reactive immune responses of a historical and a contemporary Senecavirus A strains in pigs. Virology 522:147-157.
24. Segalés J, Barcellos D, Alfieri A, Burrough E, Marthaler D. 2016. Senecavirus A: An Emerging Pathogen Causing Vesicular Disease and Mortality in Pigs? Vet. Pathol.
25. Bahnemann H G. 1990. Inactivation of viral antigens for vaccine preparation with particular reference to the application of binary ethylenimine. Vaccine 8:299-303.

Example 2

```
SEQUENCES
>pUCBrick-rSVAmSacII
TCTTCATTCCGTAACTCTTCTACCTTCTTTATTTACTTTCTAAAATCCAAATACA

AAACATAAAAATAAATAAACACAGAGTAAATTCCCAAATTATTCCATCATTAA

AAGATACGAGGCGCGTGTAAGTTACAGGCAAGCGATCCGTCCCCTCAGCCTAT
```

-continued

```
GCGGATCCGATTAGTTATTAATAGTAATCAATTACGGGGTCATTAGTTCATAGC
CCATATATGGAGTTCCGCGTTACATAACTTACGGTAAATGGCCCGCCTGGCTG
ACCGCCCAACGACCCCCGCCCATTGACGTCAATAATGACGTATGTTCCCATAG
TAACGCCAATAGGGACTTTCCATTGACGTCAATGGGTGGAGTATTTACGGTAA
ACTGCCCACTTGGCAGTACATCAAGTGTATCATATGCCAAGTACGCCCCCTATT
GACGTCAATGACGGTAAATGGCCCGCCTGGCATTATGCCCAGTACATGACCTT
ATGGGACTTTCCTACTTGGCAGTACATCTACGTATTAGTCATCGCTATTACCAT
GGTGATGCGGTTTTGGCAGTACATCAATGGGCGTGGATAGCGGTTTGACTCAC
GGGGATTTCCAAGTCTCCACCCCATTGACGTCAATGGGAGTTTGTTTTGGCACC
AAAATCAACGGGACTTTCCAAAATGTCGTAACAACTCCGCCCCATTGACGCAA
ATGGGCGGTAGGCGTGTACGGTGGGAGGTCTATATAAGCAGAGCTGGTTTAGT
GAACCGTCAGATCGCTAGCTAATACGACTCACTATAGGGTTTGAAAGGAAGGA
CTGGGCATGAGGGCCCAGTCCTTCCTTTCCCCTTCCGGGGGGTAAACCGGCTGT
GTTTGCTAGAGGCACAGAGGAGCAACATCCAACCTGCTTTTGTGGGGAACGGT
GCGGCTCCAATTCCTGCGTCGCCAAAGGTGTTAGCGCACCCAAACGGCGCATC
TACCAATGCTATTGGTGTGGTCTGCGAGTTCTAGCCTACTCGTTTCTCCCCTACT
CACTCATTCACACACAAAAACTGTGTTGTAACTACAAGATTTGGCCCTCGCAC
GGGATGTGCGATAACCGCAAGATTGACTCAAGCGCGGAAAGCGCTGTAACCA
CATGCTGTTAGTCCCTTTATGGCTGCGAGATGGCTATCCACCTCGGATCACTGA
ACTGGAGCTCGACCCTCCTTAGTAAGGGAACCGAGAGGCCTTCCTGCAACAAG
CTCCGACACAGAGTCCACGTGATTGCTACCACCATGAGTACATGGTTCTCCCCT
CTCGACCCAGGACTTCTTTTTGAATATCCACGGCTCGATCCAGAGGGTGGGGC
ATGATCCCCCTAGCATAGCGAGCTACAGCGGGAACTGTAGCTAGGCCTTAGCG
TGCCTTGGATACTGCCTGATAGGGCGACGGCCTAGTCGTGTCGGTTCTATAGGT
AGCACATACAAATATGCAGAACTCTCATTTTTCTTTCGATACAGCCTCTGGCAC
CTTTGAAGACGTAACCGGAACAAAAGTCAAGATCGTTGAATACCCCAGATCGG
TGAACAATGGTGTTTACGATTCGTCCACTCATTTAGAGATACTGAACCTACAGG
GTGAAATTGAAATTTTAAAGTCTTTCAACGAATACCAAATTCGCGCCGCCAAA
CAACAACTTGGACTGGACATCGTATACGAACTACAGGGTAATGTTCAGACAAC
CTCAAAGAATGATTTTGATTCCCGAGGCAATAATGGTAACATGACCTTCAATT
ACTACGCAAACACTTACCAGAATTCAGTAGACTTCTCGACCTCCTCGTCGGCGT
CAGGCGCCGGACCCGGGAACTCCCGGGGCGGATTAGCGGGTCTCCTCACAAAT
TTCAGTGGAATCTTGAACCCTCTTGGCTACCTCAAAGATCACAATACCGAAGA
AATGGAAAACTCTGCTGATCGAGTCATAACGCAAACGGCGGGCAACACTGCCA
TAAACACGCAATCATCACTGGGTGTGTTGTGTGCCTACGTTGAAGACCCGACC
AAATCTGACCCTCCGTCCAGCAGCACAGATCAACCCACCACCACTTTTACTGCC
ATCGACAGGTGGTACACTGGACGCCTCAATTCTTGGACAAAAGCTGTAAAAAC
CTTCTCTTTTCAGGCCGTCCCGCTCCCTGGAGCCTTCCTGTCTAGACAGGGAGG
CCTCAACGGAGGGGCCTTCACGGCCACCCTACATAGACATTTCTTAATGAAGT
GCGGGTGGCAGGTGCAGGTTCAATGCAATTTGACGCAATTCCACCAAGGTGCT
CTTCTTGTTGCCATGGTCCCCGAAACCACCCTTGATGTCAAACCTGACGGCAAG
```

-continued

```
GCAAAGAGCTTACAGGAGCTGAATGAAGAGCAGTGGGTGGAAATGTCTGACG
ACTACCGGACCGGGAAAAACATGCCTTTTCAGTCTCTTGGTACATACTACCGA
CCCCCTAACTGGACTTGGGGCCCCAATTTCATCAACCCCTATCAAGTAACAGTT
TTCCCACACCAAATTCTGAACGCGAGAACCTCTACCTCGGTAGACATAAGTGT
CCCGTACATCGGGGAGACTCCTACACAATCCTCAGAGACACAGAACTCCTGGA
CCCTCCTTGTTATGGTGCTTGTCCCCCTGGACTACAAGGAGGGAGCCACAACTG
ACCCAGAAATTACATTTTCTGTAAGGCCTACAAGTCCCTACTTCAATGGGCTTC
GTAACCGTTTCACGACCGGGACGGACGAGGAACAGGGGCCCATTCCCACAGC
ACCCAGAGAAAATTCGCTTATGTTTCTCTCAACCATCCCTGATGACACTGTTCC
TGCTTACGGGAATGTGCGTACCCCTCCCGTCAATTACCTCCCCGGTGAAATAAC
CGACCTCTTACAACTGGCCCGTATACCCACTCTCATGGCGTTTGGGCGGCGTC
CGAACCCGAGCCTGCCTCAGACGCATATGTGCCCTACGTTGCCGTTCCTGCCCA
GTTCGACGACAAGCCTCTCATCTCCTTCCCGATCACCCTTTCAGATCCTGTCTA
CCAGAACACTCTGGTAGGCGCCATCAGTTCGAACTTCGCCAACTACCGGGGGT
GTATCCAAATCACTTTGACATTTTGTGGACCCATGATGGCAAGAGGGAAATTC
CTGCTCTCGTATTCTCCCCCAAATGGAGCACAACCACAGACCCTTTCTGAAGCT
ATGCAGTGCACATACTCTATTTGGGATATAGGCTTGAACTCTAGTTGGACCTTT
GTCATCCCCTACATCTCGCCCAGTGATTACCGTGAAACTCGGGCTATTACCAAC
TCAGTTTATTCTGCTGATGGTTGGTTTAGCTTGCACAAGCTGACCAAAATTACT
CTACCACCTGACTGCCCGCAGAGTCCCTGTATTCTCTTTTTCGCCTCTGCTGGTG
AGGATTACACCCTCCGTCTCCCTGTTGATTGTAATCCTTCCTACGTGTTCCACTC
CACCGACAACGCCGAGACTGGGGTTATTGAGGCAGGTAACACTGACACCGATT
TTTCTGGTGAACTGGCGGCTCCTGGCTCTAACCATACTAATGTCAAATTCCTGT
TTGACCGATCTCGACTACTGAATGTAATTAAGGTACTGGAGAAGGACGCCGTC
TTCCCCCGTCCTTTCCCCACAGCAACAGGTGCACAGCAGGACGATGGTTACTTT
TGTCTTCTAACACCCCGCCCAACAGTCGCTTCCCGACCCGCCACTCGTTTCGGC
CTGTACGTCAACCCGTCTGACAGTGGCGTTCTCGCTAACACTTCACTGGATTTC
AATTTTTACAGTTTGGCCTGTTTCACTTACTTTAGATCAGACCTTGAAGTCACG
GTGGTCTCACTGGAGCCAGATTTGGAATTCGCCGTGGGGTGGTTCCCCTCTGGC
AGTGAGTACCAGGCTTCTAGCTTTGTTTACGACCAACTGCATGTACCCTACCAC
TTTACTGGGCGCACTCCCCGCGCTTTCACCAGCAAGGGTGGAAAGGTATCTTTC
GTGCTCCCTTGGAACTCTGTCTCTTCCGTGCTTCCCGTGCGCTGGGGGGCGCC
TCCAAGCTTTCTTCTGCCACGCGGGGTCTGCCGGCTCATGCTGACTGGGGGACC
ATTTACGCCTTTATCCCCCGTCCTAACGAGAAGAAAAGCACCGCTGTAAAGCA
CGTGGCGGTGTACGTTCGGTACAAGAACGCGCGTGCCTGGTGCCCCAGCATGC
TTCCCTTTCGCAGCTACAAGCAGAAGATGCTGATGCAATCAGGCGACGTCGAG
ACCAACCCTGGCCCTGCTTCTGACAACCCGATCTTGGAGTTTCTTGAAGCGGAA
AACGATCTAGTCACTCTGGCCTCTCTCTGGAAGATGGTACACTCTGTTCAACAG
ACCTGGAGAAAGTATGTGAAGAACGACAATTTTTGGCCCAACTTGCTCAGTGA
GCTAGTGGGGAAGGCTCCATCGCCTTGGCCGCCACGCTATCTAACCAAGCTT
```

-continued

```
CAGTGAAAGCTCTCTTGGGCCTGCATTTTCTCTCTCGAGGGCTCAATTACACAG
ATTTTTACTCTTTACTGATAGAGAAATGCTCTAGTTTCTTTACTGTAGAACCGC
CTCCTCCACCAGCTGAAAATCTGATGACCAAGCCCTCCGTGAAGTCGAAATTC
CGAAAGCTGTTTAAGATGCAAGGACCCATGGACACAGTCAAAGACTGGAACC
AAATAGCCGCCGGCTTGAAGAATTTCCAATTTGTTCGTGACCTAGTCAAAGAG
GTGGTCGACTGGCTCCAGGCCTGGATCAATAAAGAGAAAGCCAGCCCTGTCCT
CCAGTACCAGCTGGAGATGAAGAAGCTCGGGCCCGTGGCTTTGGCTCATGATG
CCTTCATGGCCGGTTCCGGGCCCCTCTTGGTGACGACCAGATTGAATACCTCC
AGAACCTCAAATCTCTTGCCCTAACACTGGGAAAGACTAATTTGGCCCAAAGT
CTCACCACTATGATCAATGCCAAGCAGAGCTCCGCCCAACGAGTCGAACCCGT
TGTGGTGGTCCTCAGAGGCAAGCCGGGATGCGGCAAAAGCTTGGCCTCCACGT
TGATTGCCCAGGCTGTGTCCAAGCGTCTCTACGGCTCGCAAAGTGTGTATTCTC
TTCCTCCGGACCCAGACTTCTTCGACGGATATAAAGGACAGTTTGTAACCTTGA
TGGACGATCTGGGACAAAACCCGGATGGGCAAGATTTCTCCACCTTTTGTCAG
ATGGTGTCGACCGCCCAATTTCTTCCCAACATGGCGGACCTTGCAGAGAAGGG
GCGTCCCTTCACCTCCAATCTTATCATTGCAACTACAAACCTCCCTCACTTTAG
CCCTGTCACCATTGCTGATCCTTCTGCAGTCTCTCGGCGTATCAACTACGACCT
GACTCTAGAAGTATCTGAGGCCTACAAGAAGCACACACGGCTGAATTTCGACC
TGGCTTTCAGACGCACTGACGCCCCCCCCATTTATCCTTTTGCTGCCCATGTGC
CCTTCGTGGACGTGGCTGTGCGCTTCAAAAATGGTCATCAAAGCTTCAATCTCC
TAGAGTTGGTCGACTCCATTTGTGCAGACATTCGGGCCAAGCAACAAGGTGCC
CGAAATATGCAGACTCTGGTTCTACAGAATCCTAACGAGAACGACGACACCCC
CGTCGACGAGGCGTTGGGTAGAGTTCTCACCCCCGCTGCGGTCGACGAGGCGC
TTGTCGACCTCGCTCCAGATGCCGACCCGGTTGGCCGCTTGGCTATTCTCGCCA
AGCTAGGTCTTGCCCTAGCTGCGGTCACCCCTGGTTTGATAATCTTGGCAGTGG
GACTCTACAAGTACTTCTCTGGCTCTGATACAGACCAAGAAGAAACAGAAAGT
GAGGAGCCTGCTAAAGCGCCTAGGAGCGAGAATGCTTATGATGGCCCGAAGA
AAAACTCCAAGCCCCTGGAGCGCTCTCTCTTATGGAAATGCAACAGCCCAAC
GTGGACATGGGCTTTGAGGCTGCAGTTGCTAAGAAAGTGGTCGTCCCCATTAC
CTTCATGGTTCCCAACAGACCTTCTGGACTTACACAGTCCGCTCTTCTTGTGGC
CGGCCGGACCTTCCTAATCAATGAGCATACATGGTCCAACCCCTCCTGGACCA
GCTTCACAATCCGTGGTGAGGTGCACACTCGTGATGAGCCTTTCCAAACGGTTC
ATTTTACTCACCATGGTCTTCCCACAGATCTGATGATGGTACGTCTCGGACCGG
GCAACTCTTTCCCTAACAATCTAGACAAGTTTGGACTTGACCAGATGCCGGCA
CGTAACTCCCGTGTGGTTGGCGTTTCGGCTAGTTACGGTAACTTCTTCTTCTCTG
GGAACTTCCTCGGGTTTGTTGACTCCATCACCTCTGACCAAGGAACCTATGCGA
GACTTTTCAGGTACAGGGTGACGACTTACAAGGGATGGTGCGGTTCGGCCCTG
GTCTGTGAGGCCGGTGGTGTCCGACGCATCATTGGCATGCATTCTGCTGGTGCC
GCTGGTATCGGCGCCGGGACTTACATCTCAAAATTAGGACTGATCAAAGCCCT
TAAACACCTCGGTGAGCCTCTGGCTACAATGCAAGGACTGATGACTGAGCTAG
AGCCTGGAGTCACCGTACATGTACCCCGAAAATCTAAATTGAGAAAGACGACC
```

-continued

```
GCACACGCGGTGTACAAACCGGAGTTTGAACCTGCTGTGTTGTCAAAATTTGA

TCCCAGACTGAACAAGGATGTTGACCTAGATGAGGTAATTTGGTCTAAACACA

CCGCCAACGTCCCTTATCAACCTCCTTTGTTCTACACATACATGTCAGAGTACG

CTCATCGGTTTTCTCCTTTTTGGGAAAAGACAATGACATTCTGACCGTCAAAG

AAGCAATCCTGGGCATCCCTGGACTAGACCCTATGGATCCCCACACAGCTCCG

GGTTTGCCCTACGCCATTAGCGGTCTTCGACGTACTGATCTCGTCGATTTTGCG

AACGGCACGGTAGACCCGGCACTGGCCATGCAGATCCAGAAATTCTTAGACGG

TGACTACTCTGATCATGTCTTCCAAACTTTTCTAAAAGATGAAATCAGACCCTC

AGAGAAGGTCCGGGCGGGAAAAACCCGCATTGTCGATGTGCCCTCCCTGGCGC

ACTGCATTGTGGGCAGAATGCTGCTTGGGCGCTTTGCCGCCAAGTTTCAATCCC

ATCCTGGCTTTCTCCTTGGCTCCGCTATCGGGTCTGACCCCGATGTCTTCTGGA

CCGTCATAGGGGCTCAGCTCGAGGGAAGAAAGAACACGTATGACGTGGACTA

CAGTGCCTTTGACTCTTCACACGGCACTGGCTCCTTCGAGGCTCTCATCTCTCA

CTTTTTCACCGTGGACAATGGTTTCAGCCCTGCGCTGGGACCGTATCTCAGATC

CCTGGCTGTCTCGGTGCACGCTTACGGCGAGCGTCGCATCAAGATTACCGGAG

GCCTCCCCTCTGGTTGTGCCGCGACCAGCCTGCTGAACACAGTGCTCAACAAT

GTGATCATCAGGACTGCTCTGGCATTGACCTACAAGGAATTTGAATATGACAT

GGTTGATATCATCGCCTACGGTGACGACCTTCTGGTTGGTACGGATTACGATCT

GGACTTCAATGAGGTGGCGCGGCGCGCTGCCAAACTGGGGTATAAGATGACTC

CTGCCAACAAGGGTTCTGTCTTCCCTCCGACTTCCTCTCTCTCCGATGCTGTTTT

TCTAAAACGCAAATTCGTCCAAAACAATGACGGCTTATATAAACCAGTTATGG

ATTTAAAGAATTTGGAAGCCATGCTCTCCTACTTCAAACCAGGAACACTACTC

GAGAAGCTGCAATCTGTTTCTATGTTGGCTCAACATTCTGGAAAAGAAGAATA

TGATAGATTGATGCACCCCTTCGCTGACTACGGTGCCGTACCGAGTCACGAGT

ACCTGCAGGCAAGATGGAGGGCCTTGTTCGACTGACCTGGATAGCCCAACGCG

CTTCGGTGCTGCCGGCGATTCTGGGAGAACCCAGTCGGAAAAAAAAAAAAAA

AAAAAAAAAAAAAAAAACTCGTGCGGCCGCATCTAGATGCATTCGCGAGGTA

CCGAGCTCGAATTCACTGGCCGTCGTTTTACAACGTCGTGACTGGGAAAACCC

TGGCGTTACCCAACTTAATCGCCTTGCAGCACATCCCCCTTTCGCCAGCTGGCG

TAATAGCGAAGAGGCCCGCACCGATCGCCCTTCCCAACAGTTGCGCAGCCTGA

ATGGCGAATGGCGCCTGATGCGGTATTTTCTCCTTACGCATCTGTGCGGTATTT

CACACCGCATATGGTGCACTCTCAGTACAATCTGCTCTGATGCCGCATAGTTAA

GCCAGCCCCGACACCCGCCAACACCCGCTGACGCGCCCTGACGGGCTTGTCTG

CTCCCGGCATCCGCTTACAGACAAGCTGTGACCGTCTCCGGGAGCTGCATGTG

TCAGAGGTTTTCACCGTCATCACCGAAACGCGCGAGACGAAAGGGCCTCGTGA

TACGCCTATTTTTATAGGTTAATGTCATGATAATAATGGTTTCTTAGACGTCAG

GTGGCACTTTTCGGGGAAATGTGCGCGGAACCCCTATTTGTTTATTTTTCTAAA

TACATTCAAATATGTATCCGCTCATGAGACAATAACCCTGATAAATGCTTCAAT

AATATTGAAAAAGGAAGAGTATGAGTATTCAACATTTCCGTGTCGCCCTTATTC

CCTTTTTTGCGGCATTTTGCCTTCCTGTTTTTGCTCACCCAGAAACGCTGGTGAA
```

-continued

```
AGTAAAAGATGCTGAAGATCAGTTGGGTGCACGAGTGGGTTACATCGAACTGG

ATCTCAACAGCGGTAAGATCCTTGAGAGTTTTCGCCCCGAAGAACGTTTTCCA

ATGATGAGCACTTTTAAAGTTCTGCTATGTGGCGCGGTATTATCCCGTATTGAC

GCCGGGCAAGAGCAACTCGGTCGCCGCATACACTATTCTCAGAATGACTTGGT

TGAGTACTCACCAGTCACAGAAAAGCATCTTACGGATGGCATGACAGTAAGAG

AATTATGCAGTGCTGCCATAACCATGAGTGATAACACTGCGGCCAACTTACTT

CTGACAACGATCGGAGGACCGAAGGAGCTAACCGCTTTTTTGCACAACATGGG

GGATCATGTAACTCGCCTTGATCGTTGGGAACCGGAGCTGAATGAAGCCATAC

CAAACGACGAGCGTGACACCACGATGCCTGTAGCAATGGCAACAACGTTGCGC

AAACTATTAACTGGCGAACTACTTACTCTAGCTTCCCGGCAACAATTAATAGA

CTGGATGGAGGCGGATAAAGTTGCAGGACCACTTCTGCGCTCGGCCCTTCCGG

CTGGCTGGTTTATTGCTGATAAATCTGGAGCCGGTGAGCGTGGGTCTCGCGGT

ATCATTGCAGCACTGGGGCCAGATGGTAAGCCCTCCCGTATCGTAGTTATCTAC

ACGACGGGGAGTCAGGCAACTATGGATGAACGAAATAGACAGATCGCTGAGA

TAGGTGCCTCACTGATTAAGCATTGGTAACTGTCAGACCAAGTTTACTCATATA

TACTTTAGATTGATTTAAAACTTCATTTTTAATTTAAAAGGATCTAGGTGAAGA

TCCTTTTTGATAATCTCATGACCAAAATCCCTTAACGTGAGTTTTCGTTCCACTG

AGCGTCAGACCCCGTAGAAAAGATCAAAGGATCTTCTTGAGATCCTTTTTTTCT

GCGCGTAATCTGCTGCTTGCAAACAAAAAAACCACCGCTACCAGCGGTGGTTT

GTTTGCCGGATCAAGAGCTACCAACTCTTTTTCCGAAGGTAACTGGCTTCAGCA

GAGCGCAGATACCAAATACTGTTCTTCTAGTGTAGCCGTAGTTAGGCCACCAC

TTCAAGAACTCTGTAGCACCGCCTACATACCTCGCTCTGCTAATCCTGTTACCA

GTGGCTGCTGCCAGTGGCGATAAGTCGTGTCTTACCGGGTTGGACTCAAGACG

ATAGTTACCGGATAAGGCGCAGCGGTCGGGCTGAACGGGGGGTTCGTGCACAC

AGCCCAGCTTGGAGCGAACGACCTACACCGAACTGAGATACCTACAGCGTGAG

CTATGAGAAAGCGCCACGCTTCCCGAAGGGAGAAAGGCGGACAGGTATCCGG

TAAGCGGCAGGGTCGGAACAGGAGAGCGCACGAGGGAGCTTCCAGGGGGAAA

CGCCTGGTATCTTTATAGTCCTGTCGGGTTTCGCCACCTCTGACTTGAGCGTCG

ATTTTTGTGATGCTCGTCAGGGGGCGGAGCCTATGGAAAAACGCCAGCAACG

CGGCCTTTTTACGGTTCCTGGCCTTTTGCTGGCCTTTTGCTCACATGTTCTTTCC

TGCGTTATCCCCTGATTCTGTGGATAACCGTATTACCGCCTTTGAGTGAGCTGA

TACCGCTCGCCGCAGCCGAACGACCGAGCGCAGCGAGTCAGTGAGCGAGGAA

GCGGAAGAGCGCCCAATACGCAAACCGCCTCTCCCCGCGCGTTGGCCGATTCA

TTAATGCAGCTGGCACGACAGGTTTCCCGACTGGAAAGCGGGCAGTGAGCGCA

ACGCAATTAATGTGAGTTAGCTCACTCATTAGGCACCCCAGGCTTTACACTTTA

TGCTTCCGGCTCGTATGTTGTGTGGAATTGTGAGCGGATAACAATTTCACACAG

GAAACAGCTATGACCATGATTACGCCAAGCTTGCATGCTATTTTTTTCCTCAAC

ATAACGAGAACACACAGGGGCGCTATCGCACAGAATCAAATTCGATGACTGG

AAATTTTTTGTTAATTTCAGAGGTCGCCTGACGCATATACCTTTTTCAACTGAA

AAATTGGGAGAAAAAGGAAAGGTGAGAGGCCGGAACCGGCTTTTCATATAGA

ATAGAGAAGCGTTCATGACTAAATGCTTGCATCACAATACTTGAAGTTGACAA
```

-continued

```
TATTATTTAAGGACCTATTGTTTTTTCCAATAGGTGGTTAGCAATCGTCTTACTT

TCTAACTTTTCTTACCTTTTACATTTCAGCAATATATATATATATTTCAAGGATA

TACCATTCTAATGTCTGCCCCTATGTCTGCCCCTAAGAAGATCGTCGTTTTGCC

AGGAGACCACGTTGGTCAAGAAATCACAGCCGAAGCCATTAAGGTTCTTAAAG

CTATTTCTGATGTTCGTTCCAATGTCAAGTTCGATTTCGAAAATCATTTAATTGG

TGGTGCTGCTATCGATGCTACAGGTGTCCCACTTCCAGATGAGGCGCTGGAAG

CCTCCAAGAAGGTTGATGCCGTTTTGTTAGGTGCTGTGGGTGGTCCTAAATGGG

GTACCGGTAGTGTTAGACCTGAACAAGGTTTACTAAAAATCCGTAAAGAACTT

CAATTGTACGCCAACTTAAGACCATGTAACTTTGCATCCGACTCTCTTTTAGAC

TTATCTCCAATCAAGCCACAATTTGCTAAAGGTACTGACTTCGTTGTTGTCAGA

GAATTAGTGGGAGGTATTTACTTTGGTAAGAGAAAGGAAGACGATGGTGATGG

TGTCGCTTGGGATAGTGAACAATACACCGTTCCAGAAGTGCAAAGAATCACAA

GAATGGCCGCTTTCATGGCCCTACAACATGAGCCACCATTGCCTATTTGGTCCT

TGGATAAAGCTAATGTTTTGGCCTCTTCAAGATTATGGAGAAAAACTGTGGAG

GAAACCATCAAGAACGAATTCCCTACATTGAAGGTTCAACATCAATTGATTGA

TTCTGCCGCCATGATCCTAGTTAAGAACCCAACCCACCTAAATGGTATTATAAT

CACCAGCAACATGTTTGGTGATATTATCTCCGATGAAGCCTCCGTTATCCCAGG

TTCCTTGGGTTTGTTGCCATCTGCGTCCTTGGCCTCTTTGCCAGACAAGAACAC

CGCATTTGGTTTGTACGAACCATGTCACGGTTCTGCTCCAGATTTGCCAAAGAA

TAAGGTTGACCCTATCGCCACTATCTTGTCTGCTGCAATGATGTTGAAATTGTC

ATTGAACTTGCCTGAAGAAGGTAAGGCCATTGAAGATGCAGTTAAAAAGGTTT

TGGATGCAGGTATCAGAACTGGTGATTTAGGTGGTTCCAACAGTACCACCGAA

GTCGGTGATGCTGTCGCCGAAGAAGTTAAGAAAATCCTTGCTTAAAAAGATTC

TCTTTTTTATGATATTTGTACATAAACTTTATAAATGAAATTCATAATAGAAA

CGACACGAAATTACAAAATGGAATATGTTCATAGGGTAGACGAAACTATATAC

GCAATCTACATACATTTATCAAGAAGGAGAAAAAGGAGGATAGTAAAGGAAT

ACAGGTAAGCAAATTGATACTAATGGCTCAACGTGATAAGGAAAAAGAATTG

CACTTTAACATTAATATTGACAAGGAGGAGGGCACCACACAAAAAGTTAGGTG

TAACAGAAAATCATGAAACTACGATTCCTAATTTGATATTGGAGGATTTTCTCT

AAAAAAAAAAAAATACGACGTCTAAGAAACCATTATTATCATGACATTAACCT

ATAAAAATAGGCGTATCACGAGGCCCTTTCGTCTCGCGCGTTTCGGTGATGAC

GGTGAAAACCTCTGACACATGCAGCTCCCGGAGACGGTCACAGCTTGTCTGTA

AGCGGATGCCGGGAGCAGACAAGCCCGTCAGGGCGCGTCAGCGGGTGTTGGC

GGGTGTCGGGGCTGGCTTAAAGCTGTTTCCTGTGTGAAATTGTTATCCGCTCAC

AATTCCACACAACATACGAGCCGGAAGCATAAAGTGTAAAGCCTGGGGTGCCT

AATGAGTGAGCTAACTCACATTAATTGCGTTGCGCTCACTGCCCGCTTTCCAGT

CGGGAAACCTGTCGTGCCAGCTGCATTAATGAATCGGCCAACGCGCGGGGAGA

GGGTCCTTTTCATCACGTGCTATAAAAATAATTATAATTTAAATTTTTTAATAT

AAATATATAAATTAAAAATAGAAAGTAAAAAAAGAAATTAAAGAAAAAATAG

TTTTTGTTTTCCGAAGATGTAAAAGACTCTAGGGGGATCGCCAACAAATACTA
```

-continued
CCTTTTATCTTGCTCTTCCTGCTCTCAGGTATTAATGCCGAATTGTTTCATCTTG

TCTGTGTAGAAGACCACACACGAAAATCCTGTGATTTTACATTTTACTTATCGT

TAATCGAATGTATATCTATTTAATCTGCTTTTCTTGTCTAATAAATATATATGTA

AAGTACGCTTTTTGTTGAAATTTTTTAAACCTTTGTTTATTTTTTTT

>rSVAmSacII

TTTGAAAGGAAGGACTGGGCATGAGGGCCCAGTCCTTCCTTTCCCCTTCCGGG

GGGTAAACCGGCTGTGTTTGCTAGAGGCACAGAGGAGCAACATCCAACCTGCT

TTTGTGGGGAACGGTGCGGCTCCAATTCCTGCGTCGCCAAAGGTGTTAGCGCA

CCCAAACGGCGCATCTACCAATGCTATTGGTGTGGTCTGCGAGTTCTAGCCTAC

TCGTTTCTCCCCTACTCACTCATTCACACACAAAAACTGTGTTGTAACTACAAG

ATTTGGCCCTCGCACGGGATGTGCGATAACCGCAAGATTGACTCAAGCGCGGA

AAGCGCTGTAACCACATGCTGTTAGTCCCTTTATGGCTGCGAGATGGCTATCCA

CCTCGGATCACTGAACTGGAGCTCGACCCTCCTTAGTAAGGGAACCGAGAGGC

CTTCCTGCAACAAGCTCCGACACAGAGTCCACGTGATTGCTACCACCATGAGT

ACATGGTTCTCCCCTCTCGACCCAGGACTTCTTTTTGAATATCCACGGCTCGAT

CCAGAGGGTGGGGCATGATCCCCCTAGCATAGCGAGCTACAGCGGGAACTGTA

GCTAGGCCTTAGCGTGCCTTGGATACTGCCTGATAGGGCGACGGCCTAGTCGT

GTCGGTTCTATAGGTAGCACATACAAATATGCAGAACTCTCATTTTTCTTTCGA

TACAGCCTCTGGCACCTTTGAAGACGTAACCGGAACAAAAGTCAAGATCGTTG

AATACCCCAGATCGGTGAACAATGGTGTTTACGATTCGTCCACTCATTTAGAG

ATACTGAACCTACAGGGTGAAATTGAAATTTTAAAGTCTTTCAACGAATACCA

AATTCGCGCCGCCAAACAACAACTTGGACTGGACATCGTATACGAACTACAGG

GTAATGTTCAGACAACCTCAAAGAATGATTTTGATTCCCGAGGCAATAATGGT

AACATGACCTTCAATTACTACGCAAACACTTACCAGAATTCAGTAGACTTCTCG

ACCTCCTCGTCGGCGTCAGGCGCCGGACCCGGGAACTCCCGGGGCGGATTAGC

GGGTCTCCTCACAAATTTCAGTGGAATCTTGAACCCTCTTGGCTACCTCAAAGA

TCACAATACCGAAGAAATGGAAAACTCTGCTGATCGAGTCATAACGCAAACGG

CGGGCAACACTGCCATAAACACGCAATCATCACTGGGTGTGTTGTGTGCCTAC

GTTGAAGACCCGACCAAATCTGACCCTCCGTCCAGCAGCACAGATCAACCCAC

CACCACTTTTACTGCCATCGACAGGTGGTACACTGGACGCCTCAATTCTTGGAC

AAAAGCTGTAAAAACCTTCTCTTTTCAGGCCGTCCCGCTCCCTGGAGCCTTCCT

GTCTAGACAGGGAGGCCTCAACGGAGGGGCCTTCACGGCCACCCTACATAGAC

ATTTCTTAATGAAGTGCGGGTGGCAGGTGCAGGTTCAATGCAATTTGACGCAA

TTCCACCAAGGTGCTCTTCTTGTTGCCATGGTCCCCGAAACCACCCTTGATGTC

AAACCTGACGGCAAGGCAAAGAGCTTACAGGAGCTGAATGAAGAGCAGTGGG

TGGAAATGTCTGACGACTACCGGACCGGGAAAAACATGCCTTTTCAGTCTCTT

GGTACATACTACCGACCCCCTAACTGGACTTGGGGCCCCAATTTCATCAACCCC

TATCAAGTAACAGTTTTCCCACACCAAATTCTGAACGCGAGAACCTCTACCTCG

GTAGACATAAGTGTCCCGTACATCGGGGAGACTCCTACACAATCCTCAGAGAC

ACAGAACTCCTGGACCCTCCTTGTTATGGTGCTTGTCCCCCTGGACTACAAGGA

GGGAGCCACAACTGACCCAGAAATTACATTTTCTGTAAGGCCTACAAGTCCCT

-continued

```
ACTTCAATGGGCTTCGTAACCGTTTCACGACCGGGACGGACGAGGAACAGGGG

CCCATTCCCACAGCACCCAGAGAAAATTCGCTTATGTTTCTCTCAACCATCCCT

GATGACACTGTTCCTGCTTACGGGAATGTGCGTACCCCTCCCGTCAATTACCTC

CCCGGTGAAATAACCGACCTCTTACAACTGGCCCGTATACCCACTCTCATGGC

GTTTGGGCGGGCGTCCGAACCCGAGCCTGCCTCAGACGCATATGTGCCCTACG

TTGCCGTTCCTGCCCAGTTCGACGACAAGCCTCTCATCTCCTTCCCGATCACCC

TTTCAGATCCTGTCTACCAGAACACTCTGGTAGGCGCCATCAGTTCGAACTTCG

CCAACTACCGGGGGTGTATCCAAATCACTTTGACATTTTGTGGACCCATGATGG

CAAGAGGGAAATTCCTGCTCTCGTATTCTCCCCCAAATGGAGCACAACCACAG

ACCCTTTCTGAAGCTATGCAGTGCACATACTCTATTTGGGATATAGGCTTGAAC

TCTAGTTGGACCTTTGTCATCCCCTACATCTCGCCCAGTGATTACCGTGAAACT

CGGGCTATTACCAACTCAGTTTATTCTGCTGATGGTTGGTTTAGCTTGCACAAG

CTGACCAAAATTACTCTACCACCTGACTGCCCGCAGAGTCCCTGTATTCTCTTT

TTCGCCTCTGCTGGTGAGGATTACACCCTCCGTCTCCCTGTTGATTGTAATCCTT

CCTACGTGTTCCACTCCACCGACAACGCCGAGACTGGGGTTATTGAGGCAGGT

AACACTGACACCGATTTTTCTGGTGAACTGGCGGCTCCTGGCTCTAACCATACT

AATGTCAAATTCCTGTTTGACCGATCTCGACTACTGAATGTAATTAAGGTACTG

GAGAAGGACGCCGTCTTCCCCCGTCCTTTCCCCACAGCAACAGGTGCACAGCA

GGACGATGGTTACTTTTGTCTTCTAACACCCCGCCCAACAGTCGCTTCCCGACC

CGCCACTCGTTTCGGCCTGTACGTCAACCCGTCTGACAGTGGCGTTCTCGCTAA

CACTTCACTGGATTTCAATTTTTACAGTTTGGCCTGTTTCACTTACTTTAGATCA

GACCTTGAAGTCACGGTGGTCTCACTGGAGCCAGATTTGGAATTCGCCGTGGG

GTGGTTCCCCTCTGGCAGTGAGTACCAGGCTTCTAGCTTTGTTTACGACCAACT

GCATGTACCCTACCACTTTACTGGGCGCACTCCCCGCGCTTTCACCAGCAAGGG

TGGAAAGGTATCTTTCGTGCTCCCTTGGAACTCTGTCTCTTCCGTGCTTCCCGTG

CGCTGGGGGGCGCCTCCAAGCTTTCTTCTGCCACGCGGGGTCTGCCGGCTCAT

GCTGACTGGGGACCATTTACGCCTTTATCCCCCGTCCTAACGAGAAGAAAAG

CACCGCTGTAAAGCACGTGGCGGTGTACGTTCGGTACAAGAACGCGCGTGCCT

GGTGCCCCAGCATGCTTCCCTTTCGCAGCTACAAGCAGAAGATGCTGATGCAA

TCAGGCGACGTCGAGACCAACCCTGGCCCTGCTTCTGACAACCCGATCTTGGA

GTTTCTTGAAGCGGAAAACGATCTAGTCACTCTGGCCTCTCTCTGGAAGATGGT

ACACTCTGTTCAACAGACCTGGAGAAAGTATGTGAAGAACGACAATTTTTGGC

CCAACTTGCTCAGTGAGCTAGTGGGGAAGGCTCCATCGCCTTGGCCGCCACG

CTATCTAACCAAGCTTCAGTGAAAGCTCTCTTGGGCCTGCATTTTCTCTCTCGA

GGGCTCAATTACACAGATTTTTACTCTTTACTGATAGAGAAATGCTCTAGTTTC

TTTACTGTAGAACCGCCTCCTCCACCAGCTGAAAATCTGATGACCAAGCCCTCC

GTGAAGTCGAAATTCCGAAAGCTGTTTAAGATGCAAGGACCCATGGACACAGT

CAAAGACTGGAACCAAATAGCCGCCGGCTTGAAGAATTTCCAATTTGTTCGTG

ACCTAGTCAAAGAGGTGGTCGACTGGCTCCAGGCCTGGATCAATAAAGAGAA

AGCCAGCCCTGTCCTCCAGTACCAGCTGGAGATGAAGAAGCTCGGGCCCGTGG

CTTTGGCTCATGATGCCTTCATGGCCGGTTCCGGGCCCCCTCTTGGTGACGACC
```

-continued

```
AGATTGAATACCTCCAGAACCTCAAATCTCTTGCCCTAACACTGGGAAAGACT

AATTTGGCCCAAAGTCTCACCACTATGATCAATGCCAAGCAGAGCTCCGCCCA

ACGAGTCGAACCCGTTGTGGTGGTCCTCAGAGGCAAGCCGGGATGCGGCAAA

AGCTTGGCCTCCACGTTGATTGCCCAGGCTGTGTCCAAGCGTCTCTACGGCTCG

CAAAGTGTGTATTCTCTTCCTCCGGACCCAGACTTCTTCGACGGATATAAAGGA

CAGTTTGTAACCTTGATGGACGATCTGGGACAAAACCCGGATGGGCAAGATTT

CTCCACCTTTTGTCAGATGGTGTCGACCGCCCAATTTCTTCCCAACATGGCGGA

CCTTGCAGAGAAGGGGCGTCCCTTCACCTCCAATCTTATCATTGCAACTACAAA

CCTCCCTCACTTTAGCCCTGTCACCATTGCTGATCCTTCTGCAGTCTCTCGGCGT

ATCAACTACGACCTGACTCTAGAAGTATCTGAGGCCTACAAGAAGCACACACG

GCTGAATTTCGACCTGGCTTTCAGACGCACTGACGCCCCCCCCATTTATCCTTT

TGCTGCCCATGTGCCCTTCGTGGACGTGGCTGTGCGCTTCAAAAATGGTCATCA

AAGCTTCAATCTCCTAGAGTTGGTCGACTCCATTTGTGCAGACATTCGGGCCAA

GCAACAAGGTGCCCGAAATATGCAGACTCTGGTTCTACAGAATCCTAACGAGA

ACGACGACACCCCCGTCGACGAGGCGTTGGGTAGAGTTCTCACCCCCGCTGCG

GTCGACGAGGCGCTTGTCGACCTCGCTCCAGATGCCGACCCGGTTGGCCGCTT

GGCTATTCTCGCCAAGCTAGGTCTTGCCCTAGCTGCGGTCACCCCTGGTTTGAT

AATCTTGGCAGTGGGACTCTACAAGTACTTCTCTGGCTCTGATACAGACCAAG

AAGAAACAGAAAGTGAGGAGCCTGCTAAAGCGCCTAGGAGCGAGAATGCTTA

TGATGGCCCGAAGAAAAACTCCAAGCCCCCTGGAGCGCTCTCTCTTATGGAAA

TGCAACAGCCCAACGTGGACATGGGCTTTGAGGCTGCAGTTGCTAAGAAAGTG

GTCGTCCCCATTACCTTCATGGTTCCCAACAGACCTTCTGGACTTACACAGTCC

GCTCTTCTTGTGGCCGGCCGGACCTTCCTAATCAATGAGCATACATGGTCCAAC

CCCTCCTGGACCAGCTTCACAATCCGTGGTGAGGTGCACACTCGTGATGAGCC

TTTCCAAACGGTTCATTTTACTCACCATGGTCTTCCCACAGATCTGATGATGGT

ACGTCTCGGACCGGGCAACTCTTTCCCTAACAATCTAGACAAGTTTGGACTTGA

CCAGATGCCGGCACGTAACTCCCGTGTGGTTGGCGTTTCGGCTAGTTACGGTA

ACTTCTTCTTCTCTGGGAACTTCCTCGGGTTTGTTGACTCCATCACCTCTGACCA

AGGAACCTATGCGAGACTTTTCAGGTACAGGGTGACGACTTACAAGGGATGGT

GCGGTTCGGCCCTGGTCTGTGAGGCCGGTGGTGTCCGACGCATCATTGGCATG

CATTCTGCTGGTGCCGCTGGTATCGGCGCCGGGACTTACATCTCAAAATTAGG

ACTGATCAAAGCCCTTAAACACCTCGGTGAGCCTCTGGCTACAATGCAAGGAC

TGATGACTGAGCTAGAGCCTGGAGTCACCGTACATGTACCCCGAAAATCTAAA

TTGAGAAAGACGACCGCACACGCGGTGTACAAACCGGAGTTTGAACCTGCTGT

GTTGTCAAAATTTGATCCCAGACTGAACAAGGATGTTGACCTAGATGAGGTAA

TTTGGTCTAAACACACCGCCAACGTCCCTTATCAACCTCCTTTGTTCTACACAT

ACATGTCAGAGTACGCTCATCGGGTTTTCTCCTTTTTGGGAAAAGACAATGACA

TTCTGACCGTCAAAGAAGCAATCCTGGGCATCCCTGGACTAGACCCTATGGAT

CCCCACACAGCTCCGGGTTTGCCCTACGCCATTAGCGGTCTTCGACGTACTGAT

CTCGTCGATTTTGCGAACGGCACGGTAGACCCGGCACTGGCCATGCAGATCCA
```

-continued

GAAATTCTTAGACGGTGACTACTCTGATCATGTCTTCCAAACTTTTCTAAAAGA

TGAAATCAGACCCTCAGAGAAGGTCCGGGCGGGAAAAACCCGCATTGTCGAT

GTGCCCTCCCTGGCGCACTGCATTGTGGGCAGAATGCTGCTTGGGCGCTTTGCC

GCCAAGTTTCAATCCCATCCTGGCTTTCTCCTTGGCTCCGCTATCGGGTCTGAC

CCCGATGTCTTCTGGACCGTCATAGGGGCTCAGCTCGAGGGAAGAAAGAACAC

GTATGACGTGGACTACAGTGCCTTTGACTCTTCACACGGCACTGGCTCCTTCGA

GGCTCTCATCTCTCACTTTTTCACCGTGGACAATGGTTTCAGCCCTGCGCTGGG

ACCGTATCTCAGATCCCTGGCTGTCTCGGTGCACGCTTACGGCGAGCGTCGCAT

CAAGATTACCGGAGGCCTCCCCTCTGGTTGTGCCGCGACCAGCCTGCTGAACA

CAGTGCTCAACAATGTGATCATCAGGACTGCTCTGGCATTGACCTACAAGGAA

TTTGAATATGACATGGTTGATATCATCGCCTACGGTGACGACCTTCTGGTTGGT

ACGGATTACGATCTGGACTTCAATGAGGTGGCGCGGCGCGCTGCCAAACTGGG

GTATAAGATGACTCCTGCCAACAAGGGTTCTGTCTTCCCTCCGACTTCCTCTCT

CTCCGATGCTGTTTTTCTAAAACGCAAATTCGTCCAAAACAATGACGGCTTATA

TAAACCAGTTATGGATTTAAAGAATTTGGAAGCCATGCTCTCCTACTTCAAACC

AGGAACACTACTCGAGAAGCTGCAATCTGTTTCTATGTTGGCTCAACATTCTGG

AAAAGAAGAATATGATAGATTGATGCACCCCTTCGCTGACTACGGTGCCGTAC

CGAGTCACGAGTACCTGCAGGCAAGATGGAGGGCCTTGTTCGACTGACCTGGA

TAGCCCAACGCGCTTCGGTGCTGCCGGCGATTCTGGGAGAACCCAGTCGG

>rSVA-SD15-26
TTTGAAAGGAAGGACTGGGCATGAGGGCCCAGCCCCCCCTTTCCCCTTCCGGG

GGGTAAACCGGCTGTGTTTGCTAGAGGCACAGAGGAGCAACATCCAACCTGCT

TTTGTGGGGAACGGTGCGGCTCCAATTCCTGCGTCGCCAAAGGTGTTAGCGCA

CCCAAACGGCGCATCTACCAATGCTATTGGTGTGGTCTGCGAGTTCTAGCCTAC

TCGTTTCTCCCCTACTCACTCATTCACACACAAAAACTGTGTTGTAACTACAAG

ATTTGGCCCTCGCACGGGATGTGCGATAACCGCAAGATTGACTCAAGCGCGGA

AAGCGCTGTAACCACATGCTGTTAGTCCCTTTATGGCTGCGAGATGGCTATCCA

CCTCGGATCACTGAACTGGAGCTCGACCCTCCTTAGTAAGGGAACCGAGAGGC

CTTCCTGCAACAAGCTCCGACACAGAGTCCACGTGATTGCTACCACCATGAGT

ACATGGTTCTCCCCTCTCGACCCAGGACTTCTTTTTGAATATCCACGGCTCGAT

CCAGAGGGTGGGGCATGATCCCCCTAGCATAGCGAGCTACAGCGGGAACTGTA

GCTAGGCCTTAGCGTGCCTTGGATACTGCCTGATAGGGCGACGGCCTAGTCGT

GTCGGTTCTATAGGTAGCACATACAAATATGCAGAACTCTCATTTTTCTTTCGA

TACAGCCTCTGGCACCTTTGAAGACGTAACCGGAACAAAAGTCAAGATCGTTG

AATACCCCAGATCGGTGAACAATGGTGTTTACGATTCGTCCACTCATTTAGAG

ATACTGAACCTACAGGGTGAAATTGAAATTTTAAAGTCTTTCAACGAATACCA

AATTCGCGCCGCCAAACAACAACTTGGACTGGACATCGTATACGAACTACAGG

GTAATGTTCAGACAACCTCAAAGAATGATTTTGATTCCCGCGGCAATAATGGT

AACATGACCTTCAATTACTACGCAAACACTTACCAGAATTCAGTAGACTTCTCG

-continued

```
ACCTCCTCGTCGGCGTCAGGCGCCGGACCCGGGAACTCCCGGGGCGGATTAGC

GGGTCTCCTCACAAATTTCAGTGGAATCTTGAACCCTCTTGGCTACCTCAAAGA

TCACAATACCGAAGAAATGGAAAACTCTGCTGATCGAGTCATAACGCAAACGG

CGGGCAACACTGCCATAAACACGCAATCATCACTGGGTGTGTTGTGTGCCTAC

GTTGAAGACCCGACCAAATCTGACCCTCCGTCCAGCAGCACAGATCAACCCAC

CACCACTTTTACTGCCATCGACAGGTGGTACACTGGACGCCTCAATTCTTGGAC

AAAAGCTGTAAAAACCTTCTCTTTTCAGGCCGTCCCGCTCCCTGGAGCCTTCCT

GTCTAGACAGGGAGGCCTCAACGGAGGGGCCTTCACGGCCACCCTACATAGAC

ATTTCTTAATGAAGTGCGGGTGGCAGGTGCAGGTTCAATGCAATTTGACGCAA

TTCCACCAAGGTGCTCTTCTTGTTGCCATGGTCCCCGAAACCACCCTTGATGTC

AAACCTGACGGCAAGGCAAAGAGCTTACAGGAGCTGAATGAAGAGCAGTGGG

TGGAAATGTCTGACGACTACCGGACCGGGAAAAACATGCCTTTTCAGTCTCTT

GGTACATACTACCGACCCCCTAACTGGACTTGGGGCCCCAATTTCATCAACCCC

TATCAAGTAACAGTTTTCCCACACCAAATTCTGAACGCGAGAACCTCTACCTCG

GTAGACATAAGTGTCCCGTACATCGGGGAGACTCCTACACAATCCTCAGAGAC

ACAGAACTCCTGGACCCTCCTTGTTATGGTGCTTGTCCCCCTGGACTACAAGGA

GGGAGCCACAACTGACCCAGAAATTACATTTTCTGTAAGGCCTACAAGTCCCT

ACTTCAATGGGCTTCGTAACCGTTTCACGACCGGGACGGACGAGGAACAGGGG

CCCATTCCCACAGCACCCAGAGAAAATTCGCTTATGTTTCTCTCAACCATCCCT

GATGACACTGTTCCTGCTTACGGGAATGTGCGTACCCCTCCCGTCAATTACCTC

CCCGGTGAAATAACCGACCTCTTACAACTGGCCCGTATACCCACTCTCATGGC

GTTTGGGCGGGCGTCCGAACCCGAGCCTGCCTCAGACGCATATGTGCCCTACG

TTGCCGTTCCTGCCCAGTTCGACGACAAGCCTCTCATCTCCTTCCCGATCACCC

TTTCAGATCCTGTCTACCAGAACACTCTGGTAGGCGCCATCAGTTCGAACTTCG

CCAACTACCGGGGGTGTATCCAAATCACTTTGACATTTTGTGGACCCATGATGG

CAAGAGGGAAATTCCTGCTCTCGTATTCTCCCCCAAATGGAGCACAACCACAG

ACCCTTTCTGAAGCTATGCAGTGCACATACTCTATTTGGGATATAGGCTTGAAC

TCTAGTTGGACCTTTGTCATCCCCTACATCTCGCCCAGTGATTACCGTGAAACT

CGGGCTATTACCAACTCAGTTTATTCTGCTGATGGTTGGTTTAGCTTGCACAAG

CTGACCAAAATTACTCTACCACCTGACTGCCCGCAGAGTCCCTGTATTCTCTTT

TTCGCCTCTGCTGGTGAGGATTACACCCTCCGTCTCCCTGTTGATTGTAATCCTT

CCTACGTGTTCCACTCCACCGACAACGCCGAGACTGGGGTTATTGAGGCAGGT

AACACTGACACCGATTTTTCTGGTGAACTGGCGGCTCCTGGCTCTAACCATACT

AATGTCAAATTCCTGTTTGACCGATCTCGACTACTGAATGTAATTAAGGTACTG

GAGAAGGACGCCGTCTTCCCCCGTCCTTTCCCCACAGCAACAGGTGCACAGCA

GGACGATGGTTACTTTTGTCTTCTAACACCCCGCCCAACAGTCGCTTCCCGACC

CGCCACTCGTTTCGGCCTGTACGTCAACCCGTCTGACAGTGGCGTTCTCGCTAA
```

-continued

```
CACTTCACTGGATTTCAATTTTTACAGTTTGGCCTGTTTCACTTACTTTAGATCA
GACCTTGAAGTCACGGTGGTCTCACTGGAGCCAGATTTGGAATTCGCCGTGGG
GTGGTTCCCCTCTGGCAGTGAGTACCAGGCTTCTAGCTTTGTTTACGACCAACT
GCATGTACCCTACCACTTTACTGGGCGCACTCCCCGCGCTTTCACCAGCAAGGG
TGGAAAGGTATCTTTCGTGCTCCCTTGGAACTCTGTCTCTTCCGTGCTTCCCGTG
CGCTGGGGGGCGCCTCCAAGCTTTCTTCTGCCACGCGGGGTCTGCCGGCTCAT
GCTGACTGGGGACCATTTACGCCTTTATCCCCCGTCCTAACGAGAAGAAAAG
CACCGCTGTAAAGCACGTGGCGGTGTACGTTCGGTACAAGAACGCGCGTGCCT
GGTGCCCCAGCATGCTTCCCTTTCGCAGCTACAAGCAGAAGATGCTGATGCAA
TCAGGCGACGTCGAGACCAACCCTGGCCCTGCTTCTGACAACCCGATCTTGGA
GTTTCTTGAAGCGGAAAACGATCTAGTCACTCTGGCCTCTCTCTGGAAGATGGT
ACACTCTGTTCAACAGACCTGGAGAAAGTATGTGAAGAACGACAATTTTTGGC
CCAACTTGCTCAGTGAGCTAGTGGGGAAGGCTCCATCGCCTTGGCCGCCACG
CTATCTAACCAAGCTTCAGTGAAAGCTCTCTTGGGCCTGCATTTTCTCTCTCGA
GGGCTCAATTACACAGATTTTTACTCTTTACTGATAGAGAAATGCTCTAGTTTC
TTTACTGTAGAACCGCCTCCTCCACCAGCTGAAAATCTGATGACCAAGCCCTCC
GTGAAGTCGAAATTCCGAAAGCTGTTTAAGATGCAAGGACCCATGGACACAGT
CAAAGACTGGAACCAAATAGCCGCCGGCTTGAAGAATTTCCAATTTGTTCGTG
ACCTAGTCAAAGAGGTGGTCGACTGGCTCCAGGCCTGGATCAATAAAGAGAA
AGCCAGCCCTGTCCTCCAGTACCAGCTGGAGATGAAGAAGCTCGGGCCCGTGG
CTTTGGCTCATGATGCCTTCATGGCCGGTTCCGGGCCCCCTCTTGGTGACGACC
AGATTGAATACCTCCAGAACCTCAAATCTCTTGCCCTAACACTGGGAAAGACT
AATTTGGCCCAAAGTCTCACCACTATGATCAATGCCAAGCAGAGCTCCGCCCA
ACGAGTCGAACCCGTTGTGGTGGTCCTCAGAGGCAAGCCGGGATGCGGCAAA
AGCTTGGCCTCCACGTTGATTGCCCAGGCTGTGTCCAAGCGTCTCTACGGCTCG
CAAAGTGTGTATTCTCTTCCTCCGGACCCAGACTTCTTCGACGGATATAAAGGA
CAGTTTGTAACCTTGATGGACGATCTGGGACAAAACCCGGATGGGCAAGATTT
CTCCACCTTTTGTCAGATGGTGTCGACCGCCCAATTTCTTCCCAACATGGCGGA
CCTTGCAGAGAAGGGGCGTCCCTTCACCTCCAATCTTATCATTGCAACTACAAA
CCTCCCTCACTTTAGCCCTGTCACCATTGCTGATCCTTCTGCAGTCTCTCGGCGT
ATCAACTACGACCTGACTCTAGAAGTATCTGAGGCCTACAAGAAGCACACACG
GCTGAATTTCGACCTGGCTTTCAGACGCACTGACGCCCCCCCCATTTATCCTTT
TGCTGCCCATGTGCCCTTCGTGGACGTGGCTGTGCGCTTCAAAAATGGTCATCA
AAGCTTCAATCTCCTAGAGTTGGTCGACTCCATTTGTGCAGACATTCGGGCCAA
GCAACAAGGTGCCCGAAATATGCAGACTCTGGTTCTACAGAATCCTAACGAGA
ACGACGACACCCCCGTCGACGAGGCGTTGGGTAGAGTTCTCACCCCCGCTGCG
GTCGACGAGGCGCTTGTCGACCTCGCTCCAGATGCCGACCCGGTTGGCCGCTT
GGCTATTCTCGCCAAGCTAGGTCTTGCCCTAGCTGCGGTCACCCCTGGTTTGAT
AATCTTGGCAGTGGGACTCTACAAGTACTTCTCTGGCTCTGATACAGACCAAG
AAGAAACAGAAAGTGAGGAGCCTGCTAAAGCGCCTAGGAGCGAGAATGCTTA
```

-continued
```
TGATGGCCCGAAGAAAAACTCCAAGCCCCCTGGAGCGCTCTCTCTTATGGAAA
TGCAACAGCCCAACGTGGACATGGGCTTTGAGGCTGCAGTTGCTAAGAAAGTG
GTCGTCCCCATTACCTTCATGGTTCCCAACAGACCTTCTGGACTTACACAGTCC
GCTCTTCTTGTGGCCGGCCGGACCTTCCTAATCAATGAGCATACATGGTCCAAC
CCCTCCTGGACCAGCTTCACAATCCGTGGTGAGGTGCACACTCGTGATGAGCC
TTTCCAAACGGTTCATTTTACTCACCATGGTCTTCCCACAGATCTGATGATGGT
ACGTCTCGGACCGGGCAACTCTTTCCCTAACAATCTAGACAAGTTTGGACTTGA
CCAGATGCCGGCACGTAACTCCCGTGTGGTTGGCGTTTCGGCTAGTTACGGTA
ACTTCTTCTTCTCTGGGAACTTCCTCGGGTTTGTTGACTCCATCACCTCTGACCA
AGGAACCTATGCGAGACTTTTCAGGTACAGGGTGACGACTTACAAGGGATGGT
GCGGTTCGGCCCTGGTCTGTGAGGCCGGTGGTGTCCGACGCATCATTGGCATG
CATTCTGCTGGTGCCGCTGGTATCGGCGCCGGGACTTACATCTCAAAATTAGG
ACTGATCAAAGCCCTTAAACACCTCGGTGAGCCTCTGGCTACAATGCAAGGAC
TGATGACTGAGCTAGAGCCTGGAGTCACCGTACATGTACCCCGAAAATCTAAA
TTGAGAAAGACGACCGCACACGCGGTGTACAAACCGGAGTTTGAACCTGCTGT
GTTGTCAAAATTTGATCCCAGACTGAACAAGGATGTTGACCTAGATGAGGTAA
TTTGGTCTAAACACACCGCCAACGTCCCTTATCAACCTCCTTTGTTCTACACAT
ACATGTCAGAGTACGCTCATCGGGTTTTCTCCTTTTTGGGAAAAGACAATGACA
TTCTGACCGTCAAAGAAGCAATCCTGGGCATCCCTGGACTAGACCCTATGGAT
CCCCACACAGCTCCGGGTTTGCCCTACGCCATTAGCGGTCTTCGACGTACTGAT
CTCGTCGATTTTGCGAACGGCACGGTAGACCCGGCACTGGCCATGCAGATCCA
GAAATTCTTAGACGGTGACTACTCTGATCATGTCTTCCAAACTTTTCTAAAAGA
TGAAATCAGACCCTCAGAGAAGGTCCGGGCGGGAAAAACCCGCATTGTCGAT
GTGCCCTCCCTGGCGCACTGCATTGTGGGCAGAATGCTGCTTGGGCGCTTTGCC
GCCAAGTTTCAATCCCATCCTGGCTTTCTCCTTGGCTCCGCTATCGGGTCTGAC
CCCGATGTCTTCTGGACCGTCATAGGGGCTCAGCTCGAGGGAAGAAAGAACAC
GTATGACGTGGACTACAGTGCCTTTGACTCTTCACACGGCACTGGCTCCTTCGA
GGCTCTCATCTCTCACTTTTTCACCGTGGACAATGGTTTCAGCCCTGCGCTGGG
ACCGTATCTCAGATCCCTGGCTGTCTCGGTGCACGCTTACGGCGAGCGTCGCAT
CAAGATTACCGGAGGCCTCCCCTCTGGTTGTGCCGCGACCAGCCTGCTGAACA
CAGTGCTCAACAATGTGATCATCAGGACTGCTCTGGCATTGACCTACAAGGAA
TTTGAATATGACATGGTTGATATCATCGCCTACGGTGACGACCTTCTGGTTGGT
ACGGATTACGATCTGGACTTCAATGAGGTGGCGCGGCGCGCTGCCAAACTGGG
GTATAAGATGACTCCTGCCAACAAGGGTTCTGTCTTCCCTCCGACTTCCTCTCT
CTCCGATGCTGTTTTTCTAAAACGCAAATTCGTCCAAAACAATGACGGCTTATA
TAAACCAGTTATGGATTTAAAGAATTTGGAAGCCATGCTCTCCTACTTCAAACC
AGGAACACTACTCGAGAAGCTGCAATCTGTTTCTATGTTGGCTCAACATTCTGG
AAAAGAAGAATATGATAGATTGATGCACCCCTTCGCTGACTACGGTGCCGTAC
CGAGTCACGAGTACCTGCAGGCAAGATGGAGGGCCTTGTTCGACTGACCTGGA
TAGCCCAACGCGCTTCGGTGCTGCCGGCGATTCTGGGAGAACCCAGTCGG
```

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

The inventions being thus described, it will be obvious that the same may be varied in many ways. Such variations are not to be regarded as a departure from the spirit and scope of the inventions.

TABLE OF SEQUENCES

| | | |
|---|---|---|
| SEQ ID NO: 1 | DNA | SD 15-26 full length sequence |
| SEQ ID NO: 2 | DNA | rSVAS asIIm rescued virus |
| SEQ ID NO: 3 | DNA | virus section introduced to plasmid |
| SEQ ID NO: 4 | DNA | pBRICK-FLSVA-SD-26 plasmid |

We claim:

1. An attenuated Senecavirus A (SVA) encoded by a DNA polynucleotide that is at least 95% identical, at a full-length nucleotide level, to SEQ ID NO: 1 or 2, and that includes:
   (a) a thymine at position 33 in the 5' UTR;
   (b) a thymine at position 36 in the 5' UTR;
   (c) a thymine at position 37 in the 5' UTR; and
   (d) an adenine at position 947 in the VP4 coding region with reference to SEQ ID NO: 1.

2. The virus of claim 1, wherein said DNA polynucleotide encoding said virus is at least 98% identical, at a full-length nucleotide level, to SEQ ID NO: 1 or 2.

3. The virus of claim 1, wherein said DNA polynucleotide encoding said virus is at least 99% identical, at a full-length nucleotide level, to SEQ ID NO: 1 or 2.

4. The virus of claim 1, wherein said DNA polynucleotide encoding said virus is at least 99.5% identical, at a full-length nucleotide level, to SEQ ID NO: 1 or 2.

5. The virus of claim 1, wherein said DNA polynucleotide encoding said virus has the nucleotide sequence set forth in SEQ ID NO: 2.

6. A vaccine composition comprising an attenuated Senecavirus A (SVA) according to claim 1, and a carrier, wherein said composition is capable of protecting swine from challenge by SVA and preventing or treating one or more symptoms associated with SVA infection, and wherein achievement of protection is determined by an endpoint selected from the group consisting of prevention or control of any of the SVA infection symptoms of vesicles or lesions on snouts and feet (dewclaw, coronary band and sole), anorexia, cutaneous hyperemia, fever, lethargy and lameness.

7. The vaccine composition of claim 6 wherein the virus is live or killed.

8. The vaccine composition of claim 6 wherein said carrier is a diluent.

9. The vaccine composition of claim 8 further comprising an adjuvant.

10. The vaccine composition of claim 6 wherein said protected swine include any of sows, gilts, boars, hogs, and piglets.

11. The vaccine composition of claim 6 wherein said vaccine is effective in a single dose program.

12. The vaccine composition of claim 7 wherein said vaccine is effective in a two-dose program.

13. The vaccine composition of claim 9 wherein the adjuvant is de-oiled lecithin dissolved in an oil, usually light liquid paraffin and aluminum hydroxide.

14. The vaccine composition of claim 9, wherein said adjuvant is CpG/DEAE-dextran/mineral oil (TXO).

15. A full-length RNA polynucleotide that corresponds to the encoding DNA polynucleotide of claim 1, or the complement thereof.

16. The RNA polynucleotide of claim 15 that is an infectious clone.

17. A plasmid or bacterial artificial chromosome that comprises the encoding DNA polynucleotide of claim 1.

18. A method of treating or preventing disease in a piglet caused by SVA, comprising administering to said piglet a dose of the vaccine composition of claim 6.

19. The method of claim 18, wherein a dose is administered to the piglet, and the parent sow, although vaccinated pre-breeding, was not vaccinated pre-farrowing.

20. The method of claim 19, wherein a dose is administered to the piglet, and the parent sow is vaccinated pre-farrowing.

21. A method of treating or preventing disease in a piglet caused by SVA, comprising administering to said piglet a single effective dose of the vaccine composition of claim 6 when said piglet is about 1-7 days old, wherein the mother sow is naïve to SVA, and is not, at any time, vaccinated.

* * * * *